US012600107B2

(12) United States Patent
Rymer et al.

(10) Patent No.: US 12,600,107 B2
(45) Date of Patent: Apr. 14, 2026

(54) BAG MAKING MACHINES AND METHODS THEREOF

(71) Applicant: CMD Corporation, Appleton, WI (US)

(72) Inventors: Timothy J. Rymer, Neenah, WI (US); Paul A. Johnson, Menasha, WI (US); Thomas J. Daul, Appleton, WI (US); Scott Beinema, Little Chute, WI (US); Randal C. Wied, Green Bay, WI (US); Thomas Jansen, Appleton, WI (US)

(73) Assignee: CMD Corporation, Appleton, WI (US)

( * ) Notice: Subject to any disclaimer, the term of this patent is extended or adjusted under 35 U.S.C. 154(b) by 0 days.

(21) Appl. No.: 18/463,518

(22) Filed: Sep. 8, 2023

(65) Prior Publication Data

US 2023/0415443 A1 Dec. 28, 2023

Related U.S. Application Data

(63) Continuation of application No. 18/199,482, filed on May 19, 2023, now Pat. No. 12,280,560.

(Continued)

(51) Int. Cl.

*B31B 70/94* (2017.01)
*B31B 70/00* (2017.01)

(Continued)

(52) U.S. Cl.

CPC .......... *B31B 70/942* (2017.08); *B31B 70/006* (2017.08); *B31B 70/024* (2017.08);

(Continued)

(58) Field of Classification Search

CPC ... B31B 70/942; B31B 70/024; B31B 70/642; B31B 70/96; B31B 70/006; B31B 70/645

See application file for complete search history.

(56) References Cited

U.S. PATENT DOCUMENTS

| | | | | |
|---|---|---|---|---|
| 1,847,904 A | 3/1932 | Frederick | | |
| 1,893,891 A * | 1/1933 | Halliwell | B65H 23/08 | 242/422.6 |

(Continued)

FOREIGN PATENT DOCUMENTS

| | | |
|---|---|---|
| AU | 733667 B2 | 5/2001 |
| EP | 0837020 B1 | 5/2003 |
| EP | 1580155 B1 | 5/2009 |
| EP | 0996533 B1 | 9/2010 |
| WO | 1999003672 A1 | 1/1999 |

(Continued)

OTHER PUBLICATIONS

PCT/US2023/022842, International Search Report and Written Opinion dated Sep. 29, 2023, 18 pages.

(Continued)

*Primary Examiner* — Lucas E. A. Palmer

(74) *Attorney, Agent, or Firm* — Andrus Intellectual Property Law, LLP

(57) ABSTRACT

A machine for processing a web of material into bags includes several sections for processing the web of material into bags. An input section is configured to receive a roll of the web of material, a sealing section is configured to form seals in the web of material, and a winder section configured to wind the bags into rolls of bags may be included. A bander section configured to band each roll of bags may be included. A hem forming section configured to form a hem in the web of material may be included. A draw tape unwind station for unwinding draw tape for bags may be included. Related methods are further disclosed.

12 Claims, 28 Drawing Sheets

Related U.S. Application Data

(60) Provisional application No. 63/344,135, filed on May 20, 2022.

(51) Int. Cl.
*B31B 70/02* (2017.01)
*B31B 70/64* (2017.01)
*B31B 70/96* (2017.01)
*B31B 155/00* (2017.01)

(52) U.S. Cl.
CPC ............ *B31B 70/642* (2017.08); *B31B 70/96* (2017.08); *B31B 70/645* (2017.08); *B31B 2155/00* (2017.08)

(56) References Cited

U.S. PATENT DOCUMENTS 2,158,755 A * 5/1939 Hodgdon ................ B32B 29/06 493/332
2,670,907 A * 3/1954 Huck ................. B65H 23/1825 242/420.3
2,897,729 A 8/1959 Ashton
3,058,402 A 10/1962 Kugler
3,250,187 A * 5/1966 Kasting ............. B29C 66/81815 493/200
3,399,096 A * 8/1968 Ranger ................ B31D 1/0075 156/244.18
3,509,799 A * 5/1970 Hartbauer ......... B29C 66/91641 53/553
3,611,883 A * 10/1971 Grob ......................... B31F 5/04 383/26
3,650,873 A * 3/1972 Smith ................... B31B 70/645 156/367
3,663,338 A * 5/1972 Wech ...................... B31B 70/00 156/364
3,678,812 A * 7/1972 Wech ...................... B31B 70/36 493/27
3,722,773 A * 3/1973 Plate ....................... B31B 70/00 226/25
3,779,139 A 12/1973 White
3,866,500 A 2/1975 Wolfberg
3,924,521 A * 12/1975 Hanson ................... B31B 70/00 493/239
3,988,970 A * 11/1976 Hanson ................... B31B 70/00 493/203
4,055,109 A 10/1977 Kan
4,199,919 A * 4/1980 Moscatelli ............ B29C 65/224 53/374.6
4,317,656 A 3/1982 Schulze et al.
4,355,494 A * 10/1982 Tilman .............. B29C 66/81465 53/139.2
4,563,862 A * 1/1986 McElvy .............. B29C 65/7451 53/511
4,597,750 A 7/1986 Boyd
4,617,008 A 10/1986 Boyd
4,624,654 A 11/1986 Boyd
4,663,917 A * 5/1987 Taylor ................. B29C 66/4312 53/374.6
4,714,455 A 12/1987 Herrington
4,717,373 A 1/1988 Catchman
4,721,502 A 1/1988 Herrington
4,757,668 A * 7/1988 Klinkel ................... B65B 51/32 53/374.6
4,832,677 A 5/1989 Hudgens
4,881,931 A 11/1989 Buchman
4,893,763 A * 1/1990 Wales .................... B65H 75/08 242/534
4,913,013 A 4/1990 Osborn
4,914,995 A 4/1990 Osborn
5,347,795 A * 9/1994 Fukuda ............. B29C 66/93451 53/552
5,362,013 A 11/1994 Gietman, Jr. et al.
5,473,866 A * 12/1995 Maglecic .................. B65B 1/32 53/511
5,768,852 A * 6/1998 Terminella ............ B65B 61/188 53/139.2
5,782,733 A * 7/1998 Yeager ............... B65D 33/2575 493/213
5,797,828 A 8/1998 Selle
5,823,933 A * 10/1998 Yeager ............... B65D 33/2575 493/213
5,857,953 A 1/1999 Selle et al.
5,862,652 A * 1/1999 Schoeler ............... B31B 70/008 493/308
5,881,539 A * 3/1999 Fukuda ................... B65B 9/213 53/526
6,003,582 A 12/1999 Blohowiak
6,050,061 A * 4/2000 Todd ....................... B65B 5/022 53/562
6,117,058 A 9/2000 Sauder
6,195,967 B1 * 3/2001 Todd ....................... B65B 43/04 53/329.2
6,295,790 B1 * 10/2001 McGregor ................ B65B 1/28 53/374.3
6,357,349 B1 * 3/2002 Tomberlin ............. B65H 23/10 101/DIG. 42
6,364,241 B1 4/2002 Bartels
6,516,850 B1 2/2003 Blohowiak
6,519,922 B1 2/2003 Matheyka et al.
6,520,080 B1 * 2/2003 Fried .................... B65H 16/106 101/484
6,602,174 B1 * 8/2003 Haverfield .............. B29C 66/43 493/191
6,635,139 B2 * 10/2003 Bohn ................ B29C 66/83511 493/203
6,648,044 B2 11/2003 Bohn
6,679,034 B2 1/2004 Kohl et al.
6,691,491 B2 2/2004 Terminella et al.
7,108,219 B2 9/2006 Fiedler
7,191,575 B2 3/2007 Frievalt et al.
7,275,354 B2 10/2007 Frievalt et al.
7,458,538 B2 * 12/2008 Betti ...................... B65H 16/10 242/420.5
7,578,779 B2 8/2009 Selle
8,029,428 B2 10/2011 Selle et al.
10,946,591 B2 3/2021 White et al.
11,618,177 B1 * 4/2023 Boesel ................. B26D 1/1475 83/476
11,807,478 B2 * 11/2023 Guidi ................... B65H 19/126
2001/0009089 A1 * 7/2001 Todd ....................... B29C 65/18 53/64
2002/0030135 A1 3/2002 Bartels et al.
2003/0042352 A1 * 3/2003 St. Germain ........ B65H 19/126 242/559
2004/0026008 A1 * 2/2004 Delisle .................. B29C 66/932 156/66
2004/0047524 A1 * 3/2004 Stolmeier ............ B65B 61/188 383/203
2004/0162205 A1 8/2004 Baker
2004/0226645 A1 * 11/2004 Owen ............... B29C 66/81611 156/580.2
2005/0056719 A1 * 3/2005 Tafel .................... B65H 19/181 242/555.3
2006/0162290 A1 * 7/2006 Kakita .................. B65B 31/045 53/511
2006/0211559 A1 * 9/2006 Howell ..................... B65B 9/20 493/394
2006/0236659 A1 * 10/2006 Miyazawa .......... B29C 66/4312 53/551
2007/0084142 A1 * 4/2007 Matthews ................. B65B 9/20 53/139.2
2007/0271874 A1 * 11/2007 Leighton ................ A44B 19/42 53/412
2008/0067279 A1 * 3/2008 Selle .................. B65H 19/2276 242/526
2008/0076652 A1 3/2008 Tindoll
2009/0019817 A1 * 1/2009 Selle .................. B65H 19/2276 53/399

(56) References Cited

U.S. PATENT DOCUMENTS

| | | | | |
|---|---|---|---|---|
| 2009/0197750 | A1* | 8/2009 | Beckmann | B65B 57/04 493/190 |
| 2009/0250544 | A1 | 10/2009 | Pasquale | |
| 2011/0039675 | A1 | 2/2011 | Sung | |
| 2011/0152051 | A1* | 6/2011 | Murray | B29C 66/723 493/213 |
| 2011/0164834 | A1* | 7/2011 | Stiglic | B31B 70/8135 383/75 |
| 2013/0126097 | A1* | 5/2013 | Murray | B29C 66/81431 156/538 |
| 2018/0056599 | A1 | 3/2018 | Selle et al. | |
| 2020/0391895 | A1* | 12/2020 | Pearson | B65B 61/28 |
| 2021/0031463 | A1 | 2/2021 | White et al. | |
| 2021/0094717 | A1* | 4/2021 | Ferrarini | B65B 9/12 |
| 2021/0197495 | A1 | 7/2021 | Calmes et al. | |
| 2023/0398761 | A1* | 12/2023 | Rymer | B31B 70/96 |

FOREIGN PATENT DOCUMENTS

| | | | |
|---|---|---|---|
| WO | 2002100722 | A1 | 12/2002 |
| WO | 2017175127 | A1 | 10/2017 |

OTHER PUBLICATIONS

CMD Global Drawtape System and Gloval Overlasp Winder at K2016, https://www.facebook.com/HighPerformanceBagandPouchEquipment/videos/cmd-global-drawtape-system-and-global-overlasp-winder-at-k2016/1315587245131997/, accessed Oct. 25, 2023.

CMD 1270GDS at K2016, https://www.facebook.com/HighPerformanceBagandPouchEquipment/videos/cmd-1270gds-at-k2016/1315530731804315/, accessed Oct. 25, 2023.

Partial Eurpean Search Report in European Patent Application No. 25189122.2, dated Nov. 28, 2025.

* cited by examiner

BAG MAKING MACHINES AND METHODS THEREOF

CROSS-REFERENCE TO RELATED APPLICATION

The present application is a continuation of U.S. application Ser. No. 18/199,482, filed May 19, 2023, which claims priority to U.S. Provisional Patent Application No. 63/344,135 filed May 20, 2022, the disclosure of which is incorporated herein by reference.

FIELD

The present disclosure relates to machines that convert a web of material, and more specifically to machines that convert a web of material into pouches or bags

BACKGROUND

The following U.S. Patents and U.S. Patent Application Publications are incorporated herein by reference in entirety.

U.S. Pat. No. 5,362,013 discloses methods and apparatuses for winding bags.

U.S. Pat. No. 5,857,953 discloses draw tape equipment and methods for incorporating draw tapes into plastic and bags.

U.S. Pat. No. 7,191,575 discloses vertical form fill-and-seal continuous pouch machines having a forming tube.

U.S. Pat. No. 7,578,779 discloses methods and apparatuses for making and winding bags.

U.S. Pat. No. 8,029,428 discloses machines and methods for making bags from a web traveling from an input section to a rotary drum to an output section.

U.S. Pat. No. 10,946,591 discloses methods and apparatuses for making bags or pouches with ultrasonic sealers.

U.S. Patent Application Publication No. 2018/0056599 discloses machines and methods for making bags that include a web traveling from an input section to a rotary drum, to an output section.

U.S. Patent Application Publication No. 2022/0347961 discloses machines for forming a web into bags or pouches includes a sealing section through which the web is conveyed in a machine direction.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter. It will be appreciated that different features of different aspects of the present disclosure may be combined in different ways.

In certain examples, a winder for winding bags into rolls that includes an input station configured to receive the bags is disclosed. A first conveyor is configured to convey the bags along a first winding path to a first spindle such that the bags conveyed along the first winding path are wound around the first spindle into a first roll of bags. A second conveyor is configured to convey the bags along a second winding path to a second spindle such that the bags conveyed along the second winding path are wound around the second spindle into a roll of bags. A diverter is configured to selectively divert the bags along the first winding path or the second winding path. Any aspects, and any combination thereof, of these examples may further include one or more of the following optional features. Optionally, the bags received into the input station are formed from a web of material, and the input station comprises a tension sensor configured to sense tension of the web and a plurality of rollers is configured to adjust tension in the web based on the tension sensed by the tension sensor. Optionally, an overlap station is configured to overlap the bags such that a plurality of overlapped bags are conveyed along the first winding path and the second winding path. Optionally, the diverter has a pair of diverter rollers that define a diverter nip through which the bags are conveyed to the first winding path or the second winding path. Optionally, an actuator pivots the diverter into and between a first diverter position in which the diverter directs the bags along the first winding path and a second diverter position in which the diverter directs the bags along the second winding path. Optionally, the diverter pivots to a value in a range of 60.0-80.0 degrees between the first diverter position and the second diverter position. Optionally, a first guide assembly is configured to guide the bags along the first winding path and a second guide assembly is configured to guide the bags along the second winding path. Optionally, a first guide assembly is configured to guide the bags along the first winding path, and the first guide assembly has a pair of rollers and a plurality of ropes that encircle the rollers such that the ropes are recessed in the pair of rollers. Optionally, an air system is configured to pull a leading end of a leading bag in the bags conveyed along the first winding path onto the first spindle. Optionally, the first spindle has a plurality of holes such that the air system creates a vacuum that pulls air through the plurality of holes and pulls the leading bag onto the first spindle. Optionally, an air system is configured to push the roll of bags radially away from the first spindle. Optionally, the first spindle has a plurality of holes such that the air system creates a vacuum that pulls air through the plurality of holes and pulls a leading bag onto the first spindle. Optionally, a flap is configured to bias the bags wound around the first spindle radially toward the first spindle.

In certain examples, a machine for processing a web of material into bags is disclosed. The machine includes an input section configured to receive a roll of the web of material. A sealing section is configured to form seals in the web of material to thereby at least partially form the bags from the web of material. A winder is configured to wind the bags into rolls of bags. The winder comprises an input station configured to receive the bags from the sealing section, a first conveyor configured to convey the bags along a first winding path to a first spindle such that the bags conveyed along the first winding path are wound around the first spindle into a first roll of bags, a second conveyor configured to convey the bags along a second winding path to a second spindle such that the bags conveyed along the second winding path are wound around the second spindle into a roll of bags, and a diverter configured to selectively divert the bags along the first winding path or the second winding path. Any aspects, and any combination thereof, of these examples may further include one or more of the following optional features. Optionally, the bags received into the input section are formed from a web of material, and the input station comprises a load sensor configured to sense tension of the web and a plurality of rollers configured to adjust tension in the web based on the tension sensed by the load sensor. Optionally, the winder further comprises an overlap station configured to overlap the bags such that a plurality of overlapped bags are conveyed along the first winding path and the second winding path. Optionally, the winder has a pair of diverter rollers that define a diverter nip through which the bags are conveyed to the first winding path or the second winding path. Optionally, the winder further comprises an actuator that pivots the diverter into and between a first diverter position in which the diverter directs the bags along the first winding path and a second diverter position in which the diverter directs the bags along the second winding path. Optionally, the diverter pivots a value in a range of 60.0-80.0 degrees the first diverter position and the second diverter position. Optionally, the winder further comprises a first guide assembly configured to guide the bags along the first winding path and a second guide assembly configured to guide the bags along the second winding path. Optionally, the winder further comprises a first guide assembly configured to guide the bags along the first winding path, the first guide assembly having a pair of rollers and a plurality of ropes that encircle the rollers such that the ropes are recessed in the pair of rollers. Optionally, the winder further comprises an air system configured to pull a leading end of a leading bag in the bags conveyed along the first winding path onto the first spindle. Optionally, the first spindle has a plurality of holes such that the air system creates a vacuum that pulls air through the plurality of holes and couples the leading bag onto the first spindle. Optionally, the winder further comprises an air system configured to push the roll of bags radially away from the first spindle. Optionally, the first spindle has a plurality of holes such that the air system creates a vacuum that pulls air through the plurality of holes and pulls a leading bag onto the first spindle. Optionally, a flap is configured to bias the bags wound around the first spindle radially toward the first spindle. Optionally, a control system controls the diverter to pivot the diverter from the first diverter position to the second diverter position or from the second diverter position to the first diverter position after a predetermined length of bags passes through the diverter.

In certain examples, a winder for winding bags into rolls is disclosed that includes an input station configured to receive the bags and a conveyor configured to convey the bags along one or more winding paths such that the bags conveyed along each winding path are wound around a spindle into a roll of bags. A diverter is configured to selectively divert the bags along one of the winding paths. Any aspects, and any combination thereof, of these examples may further include one or more of the following optional features. Optionally, the diverter has a pair of diverter rollers that define a diverter nip through which the bags are conveyed to one or more of the winding paths. Optionally, an actuator pivots the diverter into and between a diverter position in which the diverter directs the bags along a first winding path and a second diverter position in which the diverter directs the bags along a second winding path. Optionally, the diverter pivots to a value in a range of 60.0-80.0 degrees between the first diverter position and the second diverter position. Optionally, an air system is configured to pull a leading end of a leading bag in the bags conveyed along a winding path onto the spindle associated with the winding path. Optionally, the spindle has a plurality of holes such that the air system creates a vacuum that pulls air through the plurality of holes and pulls a leading bag onto the spindle. Optionally, an air system is configured to push the roll of bags radially away from the spindle. Optionally, the spindle has a plurality of holes through which the air exhausts. Optionally, a flap is configured to bias the bags wound around the spindle radially toward the spindle.

In certain examples, a method for processing bags created from a web of material into rolls of bags is disclosed. The method includes the steps of receiving the bags into a winder, diverting, with a diverter, the bags along a first winding path, winding the bags diverted along the first winding path around a first spindle to thereby form a first roll of bags, pivoting the diverter to thereby divert the bags along a second winding path, and winding the bags diverted along the second winding path around a second spindle to thereby form a second roll of bags. Any aspects, and any combination thereof, of these examples may further include one or more of the following optional steps or features. Optionally, the method may further include the step of separating the bags and overlapping the separated bags such that a plurality of overlapped bags are conveyed along the first winding path and the second winding path. Optionally, the method may further include the step of pulling, with an air system, a leading end of a leading bag in the bags conveyed along the first winding path onto the first spindle. Optionally, the first spindle has a plurality of holes such that the air system creates a vacuum that pulls air through the plurality of holes and pulls the leading bag onto the first spindle. Optionally, an air system is configured to push the roll of bags radially away from the first spindle. Optionally, the first spindle has a plurality of holes such that the air system creates a vacuum that pulls air through the plurality of holes and pulls a leading bag onto the first spindle. Optionally, the method may further comprise the step of biasing, with a flap, the bags wound around the first spindle radially inwardly toward the first spindle. Optionally, the method further comprises the step of sensing, with a home sensor, position of the diverter, moving an air horn away from the first spindle after a predetermined length of bags is wound into a first roll of bags onto the first spindle, pivoting the diverter from a first diverter position in which the diverter diverts the bags along the first winding path to a second diverter position in which the diverter diverts the bags along the second winding path, pushing the first roll of bags off the first spindle, pivoting the diverter from the second diverter position to the first diverter position, and pushing the second roll of bags off the second spindle.

In certain examples a machine for processing a web of material into bags is disclosed. The machine includes a winder with an input station configured to receive the bags and wind the bags about a spindle to form a roll of bags. The winder conveys the bags in a machine direction to the spindle. A bander is configured to band each roll of bags, and the bander is offset from the winder along a cross-machine direction extending transverse to the machine direction. Any aspects, and any combination thereof, of these examples may further include one or more of the following optional features. Optionally, the spindle extends in the cross-machine direction, and the winder is configured to move the roll of bags in the cross-machine direction along the spindle from a first spindle position in which the winder winds the bags into a roll of bags to a second spindle position in which the bander bands the roll of bags. Optionally, the spindle is rotatable at a first spindle speed while the bags are in the first spindle position and the second spindle position. Optionally, the spindle is a first spindle and the winder has a second spindle about which bags are wound into a roll of bags and the bander has a first banding device for applying banding material to the roll of bags wound around the first spindle and a second banding device for applying banding material to the roll of bags wound around the second spindle, the second banding device is positioned vertically below the first banding device. Optionally, the spindle is a first spindle about which a first roll of bags is wound and the winder comprises a second spindle about which a second roll of bags is wound and the bander has a first banding device for applying banding material to the first roll of bags and a second banding device for applying banding material to the second roll of bags. Optionally, the second banding device is positioned vertically below the first banding device.

In certain examples, a machine for processing a web of material into bags is disclosed that comprises an input section configured to receive a roll of the web of material, a sealing section configured to form seals in the web of material to thereby at least partially form the bags in the web of material, and a winder is configured to wind the bags into rolls of bags. The winder comprises at least one spindle, and the winder conveys the bags in a machine direction to the spindle. A bander is configured to band each roll of bags, and the bander is offset from the winder in a cross-machine direction that extends transverse to the machine direction. Any aspects, and any combination thereof, of these examples may further include one or more of the following optional features. Optionally, the spindle extends in the cross-machine direction, and the winder is configured to move the roll of bags in the cross-machine direction along the spindle from a first spindle position in which the winder winds the bags into the roll of bags to a second spindle position in which the bander bands the roll of bags. Optionally, the spindle is rotatable at a first spindle speed while the bags are in the first spindle position and the second spindle position. Optionally, the winder comprises a first spindle about which the bags are wound into a roll of bags and a second spindle about which the bags are wound into a roll of bags, and the bander has a first banding device for applying banding material to the roll of bags wound around the first spindle and a second banding device for applying banding material to the roll of bags wound around the second spindle, the second banding device is positioned vertically below the first banding device. Optionally, the winder has a first spindle about which a first roll of bags in wound and a second spindle about which a second roll of bags and the bander has a first banding device for applying banding material to the first roll of bags and a second banding device for applying banding material to the second roll of bags. Optionally, the second banding device is positioned vertically below the first banding device.

In certain examples, a method for processing bags formed from a web of material is disclosed. The method comprises receiving the bags into a winder, conveying the bags in a machine direction to a spindle, winding the bags about the spindle to form a roll of bags, moving the roll of bags in a cross-machine direction along the spindle, the cross-machine direction being transverse to the machine direction, and banding the roll of bags with banding material. Any aspects, and any combination thereof, of these examples may further include one or more of the following optional steps or features. Optionally, the spindle is a first spindle and the conveying the bags comprises conveying the bags to a first spindle or a second spindle. The step of winding the bags comprises winding the bags about the first spindle to form a first roll of bags and winding the bags about a second spindle to form a second roll of bags. The step of moving the roll of bags comprises moving the first roll of bags in the cross-machine direction and moving the second roll of bags in the cross-machine direction. The step of banding the roll of bags comprises a banding the first roll of bags with banding material and banding the second roll of bags with banding material. Any aspects, and any combination thereof, of these examples may further include one or more of the following optional steps or features. Optionally, the method may include the step of receiving, into an input section, a roll of the web of material, and forming seals, with a sealing section, in the web of material to thereby at least partially form the bags in the web of material, with the input section and the sealing section are aligned in the machine direction. Optionally, the method may include the step of diverting, with a diverter, the bags along a first winding path, winding the bags diverted along the first winding path around a first spindle to thereby form a first roll of bags, pivoting the diverter to thereby divert the bags along a second winding path, and winding the bags diverted along the second winding path around a second spindle to thereby form a second roll of bags. Optionally, the winder may include a spindle about which the roll of bags is wound, and the winder is configured to move the roll of bags in a cross-machine direction along the spindle such that the bander bands the roll of bags. Optionally, the spindle extends in the cross-machine direction and the winding the bags includes winding the bags in a first spindle position, and moving the roll of bags in the cross-machine direction from the first spindle position to a second spindle position and wherein the banding the roll of bags comprising banding the roll of bags in the second spindle position. Optionally, the step of banding the roll of bags comprises banding the roll of bags with a first banding device that applies banding material and banding another roll of bags with a second banding device that applies banding material, the second banding device is positioned vertically below the first banding device. Optionally, the spindle is a first spindle, and the step of winding the bags comprises winding the bags about the first spindle to form a first roll of bags and winding the bags about a second spindle to form a second roll of bags, and the banding the roll of bags comprises banding, with a first banding device, the first roll of bags in banding material and banding, with a second banding device, the second roll of bags in banding material. Optionally, the second banding device is positioned vertically below the first banding device.

In certain examples, a machine for processing a web of material into bags is disclosed that comprises an input section configured to receive a roll of the web of material, the input section comprising a pair of arms that are configured to engage the roll of the web of material and define an unwind axis and an unwind device configured to engage an outer perimetral surface of the roll of the web of material and rotate the roll of the web of material about the unwind axis such that the web of material is unwound. The pair of arms permits the roll of the web of material to axially shift as the unwind device rotates the roll of the web of material. Any aspects, and any combination thereof, of these examples may further include one or more of the following optional features. Optionally, a sealing section is configured to form seals in the web of material to thereby at least partially form the bags in the web of material and a winder is configured to wind the bags into rolls of bags. Optionally, the arms are configured to vertically lift the roll of the web of material. Optionally, the arms are axially movable away from each other such that the roll of the web of material is positioned between the arms and further axially movable toward each other to thereby engage with the roll of the web of material. Optionally, each arm has an axially extending projection that is inserted into the roll of the web of material. Optionally, the unwind device has a drive roller that engages the outer perimetral surface of the roll of the web of material to thereby rotate the roll of the web of material and a leg that secures the drive roller to a frame, the leg is pivotally coupled to the frame such that the leg and the drive roller pivot relative to the frame as diameter of the roll of the web of material decreases such that the drive roller maintains engagement with the roll of the web of material.

In certain examples, a method of processing a web of material to form bags is disclosed that includes the steps of engaging a roll of the web of material with a pair arms that define an unwind axis, unwinding the web of material from the roll of the web of material with an unwind device that engages an outer perimetral surface of the roll of the web of material and rotates the roll of the web of material about the unwind axis, and permitting axially shifting of the roll of the web of material being engaged by the pair of arms so as to permit position adjustment of the web of material to thereby reduce undesirable weave or tension inconsistencies in the web. Any aspects, and any combination thereof, of these examples may further include one or more of the following optional steps or features. Optionally, the method may further include the step of conveying the web of material downstream from an input section in which the web is unwound from the roll of the web, forming one or more seals in the web of material as the web of material is conveyed through a sealing section such that the bags are at least partially formed from the web of material, and/or winding the bags into a roll of bags with a winder. Optionally, the method may further include the step of lifting, with the arms, the roll of the web of material. Optionally, the method may include axially moving the arms away from each other such that the roll of the web of material is positioned between the arms and further axially moving the arms toward each other to thereby engage with the roll of the web of material. Optionally, the method may further include the step of inserting an axially extending projection of each arm into the roll of the web of material. Optionally, the method may further comprise the step of rotating, with a drive roller, the roll of the web of material to thereby unwind the web, wherein the drive roller engages the outer perimetral surface of the roll of the web of material to thereby rotate the roll of web of material, and pivoting, an arm coupled to the drive roller, such that the drive roller pivots and thereby follows the outer perimetral surface of the roll of material as diameter of the roll of the web of material decreases such that the drive roller maintains engagement with the roll of the web.

In certain examples, a machine for processing a web of material into bags is disclosed that comprises a hem forming section configured to form a hem in the web of material. The hem forming section comprises a plurality of rollers configured to convey the web of material between a first hem forming end and second hem forming end and a deflection device positioned between the first hem forming end and the second hem forming end and being configured to deflect the web of material away from a first web plane along which the web of material conveys between the first hem forming end and the deflection device to thereby increase speed of the web of material and tension in the web of material conveying such that the web of material folds and thereby forms the hem in the web of material. Any aspects, and any combination thereof, of these examples may further include one or more of the following optional features. Optionally, after the web of material conveys past the deflection device at least at portion of the web of material folds onto another portion of the web of material to thereby form the hem. Optionally, the deflection device has a deflection surface that engages the web of material. Optionally, the deflection surface extends transverse to the first web plane. Optionally, the deflection surface and the first web plane defines a deflection angle therebetween in a range of 20.0-70.0 degrees. Optionally, the deflection device is configured to separate the web of material into a first web side and a second web side, and the deflection device deflects the first web side and the second web side away from the first web plane such that hems are formed in both the first web side and the second web side. Optionally, the web of material has an edge that extends along a web edge axis, and wherein the deflection device is radially offset from the web edge axis. Optionally, the hem forming section includes a guide member configured to guide an edge of the web of material as the web of material folds and forms the hem. Optionally, the guide member is positioned downstream of the deflection device. Optionally, an input section is configured to receive a roll of the web of material, a sealing section is configured to form seals in the web of material to thereby at least partially form the bags in the web of material, and/or a winder is configured to wind the bags into rolls of bags.

In certain examples, a machine for processing a web of material into bags is disclosed and the machine includes a hem forming section configured to form a hem in the web of material. The hem forming section comprising a plurality of rollers configured to convey the web of material along a first web plane and a deflection device configured to deflect the web of material away from the first web plane to thereby increase speed of the web of material and tension in the web of material such that the web of material folds and thereby forms the hem in the web of material. Any aspects, and any combination thereof, of these examples may further include one or more of the following optional features. Optionally, the web of material moves back into the first web plane after the deflection device deflects the web of material. Optionally, the deflection device has a deflection surface that engages the web of material. Optionally, the deflection surface extends transverse to the first web plane. Optionally, the deflection device is configured to separate the web of material into a first web side and a second web side, and the deflection device deflects the first web side and the second web side away from the first web plane such that hems are formed in both the first web side and the second web side. Optionally, the web of material has an edge that extends along a web edge axis, and the deflection device is radially offset from the web edge axis. Optionally, the hem forming section includes a guide member configured to guide an edge of the web of material as the web of material folds and forms the hem. Optionally, an input section is configured to receive a roll of the web of material, a sealing section is configured to form seals in the web of material to thereby at least partially form the bags in the web of material, and a winder is configured to wind the bags into rolls of bags.

In certain examples, a method of processing a web of material from which bags are formed is disclosed that includes the steps of conveying the web of material along a first web plane and deflecting the web of material, with a deflection device, away from the first web plane to thereby increase speed of the web of material and tension in the web of material such that the web of material folds and thereby forms a hem. Any aspects, and any combination thereof, of these examples may further include one or more of the following optional features. Optionally, the steps of conveying the web downstream from an input section in which the web is unwound from a roll of the web of material, forming one or more seals in the web as the web is conveyed through a sealing section such that the bags are at least partially formed in the web of material, and/or winding the bags into a roll of bags with a winder may be included in the method. Optionally, the method may include the step of conveying the web of material into the first web plane after the deflection device deflects the web of material. Optionally, the method may include the step of separating, with the deflection device, a first web side and a second web side and deflecting the first web side and the second web side away from the first web plane to thereby increase speed of the first web side and the second web side and tension in the first web side and the second web side such that the first web side and the second web side each automatically fold to thereby form hems. Optionally, the web of material has an edge that extends along a web edge axis and the deflection device is radially offset from the web edge axis. Optionally, the method may include the step of guiding, with a guide member, an edge of the web of material as the web of material folds and forms a hem.

In certain examples, a draw tape unwind station for unwinding draw tape for bags formed from a web of material is disclosed. The draw tape unwind station includes a dancer system configured to receive the draw tape and further dispense the draw tape. The dancer system includes a frame having a first frame end and an opposite second frame end, the first frame end and the second frame end being movable relative to each other, a first set of outer rollers coupled to the first frame end, a second set of outer rollers coupled to the second frame end, a first set of inner rollers coupled to the first frame end, and a second set of inner rollers coupled to the second frame end. The first set of inner rollers and the second set of inner rollers are positioned between the first set of outer rollers and the second set of outer rollers, and the first set of inner rollers and the second set of outer rollers are configured to guide the draw tape through the dancer system before the first set of outer rollers and the second set of inner rollers to guide the draw tape. Any aspects, and any combination thereof, of these examples may further include one or more of the following optional features. Optionally, one or more drive rollers are configured to convey the draw tape through the dancer system. Optionally, the first frame end and the opposite second frame end selectively translate toward each other. Optionally, each roller in the first set of outer rollers is aligned with a corresponding roller in the first set of inner rollers along a first roller axis, each roller in the second set of outer rollers is aligned with a corresponding roller in the second set of inner rollers along a second roller axis, and the first roller axes are parallel and offset from the second roller axes. Optionally, the dancer system comprises a first dancer side and a second dancer side such that the first dancer side is configured to receive the draw trap and dispense the draw tape. Optionally, the dancer system is configured to route the draw tape in a first dancer direction and subsequently in a second dancer direction opposite the first dancer direction.

In certain examples, a draw tape unwind station for unwinding draw tape for bags formed from a web of material is disclosed. The draw tape unwind station includes a dancer system having a first dancer side configured to receive and dispense the draw tape and an opposite second dancer side. The dancer system is configured to route the draw tape in a first dancer direction from the first dancer side to the second dancer side along a first serpentine path and subsequently in an opposite second dancer direction from the second dancer side to the first dancer side along a second serpentine path. Any aspects, and any combination thereof, of these examples may further include one or more of the following optional features. Optionally, the second serpentine path follows the first serpentine path. Optionally, the second serpentine path is parallel with the first serpentine path. Optionally, the second serpentine path is offset and equidistant from the first serpentine path. Optionally, the dancer system further comprises a first set of outer rollers, a second set of outer rollers spaced apart from the first set of outer rollers, a first set of inner rollers, and/or a second set of inner rollers spaced apart from the first set of inner rollers. The first set of inner rollers and the second set of inner rollers are positioned between the first set of outer rollers and the second set of outer rollers, and the dancer system is configured to route the draw tape in the first dancer direction alternately along rollers of the first set of inner rollers and rollers of the second set of outer rollers and subsequently route the draw tape in the second dancer direction alternately along rollers of the first set of outer rollers and rollers of the second set of inner rollers. Optionally, the dancer system comprises a frame having a first frame end and an opposite second frame end, the first frame end and the second frame end being movable relative to each other. The first set of outer rollers and the first set of inner rollers are coupled to first frame end and move therewith, and the second set of outer rollers and the second set of inner rollers are coupled to second frame end and move therewith. Optionally, one or more drive rollers are configured to convey the draw tape through the dancer system. Optionally, the first frame end and the opposite second frame end selectively translate toward each other. Optionally, each roller in the first set of outer rollers is aligned with a corresponding roller in the first set of inner rollers along a first roller axis, each roller in the second set of outer rollers is aligned with a corresponding roller in the second set of inner rollers along a second roller axis, and the first roller axes are parallel and offset from the second roller axes.

In certain examples, a machine for processing a web of material into bags is disclosed. The machine includes a draw tape unwind station configured to unwind draw tape for insertion in the bags, the draw tape unwind station comprising a dancer system having a first dancer side configured to receive and dispense the draw tape and an opposite second dancer side and the dancer system being configured to route the draw tape in a first dancer direction from the first dancer side to the second dancer side along a first serpentine path and subsequently in an opposite second dancer direction from the second dancer side to the first dancer side along a second serpentine path. Any aspects, and any combination thereof, of these examples may further include one or more of the following optional features. Optionally, a hem forming station is configured to form a hem of the bags in which the draw tape is inserted, a sealing section is configured to form seals in the web of material to thereby at least partially form the bags from the web of material, and/or a winder is configured to wind the bags into rolls of bags. Optionally, the second serpentine path is parallel with the first serpentine path. Optionally, the second serpentine path is offset and equidistant from the first serpentine path. Optionally, the dancer system further comprises a first set of outer rollers, a second set of outer rollers spaced apart from the first set of outer rollers, a first set of inner rollers, and/or a second set of inner rollers spaced apart from the first set of inner rollers. The first set of inner rollers and the second set of inner rollers are positioned between the first set of outer rollers and the second set of outer rollers, and the dancer system is configured to route the draw tape in the first dancer direction alternately along rollers of the first set of inner rollers and rollers of the second set of outer rollers and subsequently route the draw tape in the second dancer direction alternately along rollers of the first set of outer rollers and rollers of the second set of inner rollers. Optionally, the dancer system further comprises a frame having a first frame end and an opposite second frame end, the first frame end and the second frame end being movable relative to each other, and the first set of outer rollers and the first set of inner rollers are coupled to first frame end and move therewith and the second set of outer rollers and the second set of inner rollers are coupled to second frame end and move therewith. Optionally, one or more drive rollers is configured to convey the draw tape through the dancer system. Optionally, the first frame end and the opposite second frame end selectively translate toward each other. Optionally, each roller in the first set of outer rollers is aligned with a corresponding roller in the first set of inner rollers along a first roller axis, each roller in the second set of outer rollers is aligned with a corresponding roller in the second set of inner rollers along a second roller axis and the first roller axes are parallel and offset from the second roller axes.

In certain examples, a method of unwinding draw tape for bags formed from a web of material is disclosed. The method includes the steps of receiving the draw tape into a first dancer side of a dancer system, routing the draw tape in a first dancer direction from the first dancer side to an opposite second dancer side and along a first serpentine path, and further routing the draw tape in an opposite second dancer direction from the second dancer side to the first dancer side along a second serpentine path. Any aspects, and any combination thereof, of these examples may further include one or more of the following optional steps or features. Optionally, the second serpentine path is parallel with the first serpentine path. Optionally, the second serpentine path is offset and equidistant from the first serpentine path. Optionally, the method may further comprise the step of routing the draw tape in the first dancer direction alternately along rollers of a first set of inner rollers and rollers of a second set of outer rollers and/or routing the draw tape in the second dancer direction alternately along rollers of a first set of outer rollers and rollers of a second set of inner rollers. Optionally, the first set of outer rollers and the first set of inner rollers are coupled to a first frame end and move therewith and wherein the second set of outer rollers and the second set of inner rollers are coupled to a second frame end and move therewith, and further comprising translating the first frame end and the second frame end away from each other to thereby permits accumulation of draw tape in the dancer system. Optionally, the method may further comprise the step of translating the first frame end and the second frame toward each other to thereby account for decreases in the amount of draw tape in the dancer system. Optionally, the method may further comprise the step of controlling with a control system, one or more actuators to move the first frame end and the second frame end relative to each other.

In certain examples, a method of forming seals in a web of material to thereby at least partially form bags from the web of material is disclosed. This method includes the steps of conveying the web of material to a first pair of seal bars, forming a seal in the web of material by moving the first pair of seal bars into cooperation with each other and the web, conveying the web of material vertically to a second pair of seal bars, and forming another seal in the web of material by moving the second pair of seal bars into cooperation with each other and the web of material. Any aspects, and any combination thereof, of these examples may further include one or more of the following optional steps or features. Optionally, the first pair of seal bars is vertically spaced apart from the second pair of seal bars. Optionally, the step of moving the first pair of seal bars comprises moving the first pair of seal bars with the web of material. Optionally, the step of moving the second pair of seal bars comprises moving the second pair of seal bars with the web of material. Optionally, the first pair of seal bars linearly and/or the second pair of seal bars translate with the web of material. Optionally, the first pair of seal bars and the second pair of seal bars form alternating spaced apart seals in the web of material. Optionally, the method further comprises the step of dispensing the web of material with a plurality of seals formed therein such that each seal in the plurality of seals spaced apart from each other, and the first pair of seal bars forms every other seal in the plurality of seals. Optionally, the seals formed in the web of material extending a cross-machine direction.

In certain examples, a machine for processing a web of material into bags is disclosed that includes a sealing section configured to form seals in the web of material to thereby at least partially form the bags from the web of material. The sealing station comprises a first pair of seal bars that are movable into cooperation with each other and the web of material to thereby form a seal in the web of material and a second pair of seal bars that are movable into cooperation with each other and the web of material to thereby form another seal in the web of material. The first pair of seal bars is vertically spaced apart from the second pair of seal bars and the web of material is vertically conveyed between the first pair of seal bars and the second pair of seal bar. Any aspects, and any combination thereof, of these examples may further include one or more of the following optional features. Optionally, the sealing station further includes a plurality of rollers configured to convey the web of material vertically between the first pair of seal bars and the second pair of seal bars. Optionally, a hem forming station is configured to form a hem of the bags in which draw tape is inserted and/or a winder is configured to wind the bags into rolls of bags. Optionally, the first pair of seal bars is vertically spaced apart from the second pair of seal bars. Optionally, the first pair of seal bars and the second pair of seal bars is directly vertically spaced apart from each other. Optionally, the first pair of seal bars are configured to move with the web of material as the seal is formed in the web of material. Optionally, the second pair of seal bars are configured to move with the web of material as the seal is formed in the web of material. Optionally, the first pair of seal bars linearly translates with the web of material. Optionally, the second pair of seal bars linearly translates with the web of material. Optionally, the first pair of seal bars and the second pair of seal bars form alternating spaced apart seals in the web of material. Optionally, the sealing section is configured to dispense the web of material with a plurality of seals formed therein such that each seal in the plurality of seals spaced apart from each other, and the first pair of seal bars forms every other seal in the plurality of seals. Optionally, the seal formed in the web of material by the first pair of seal bars and the second pair of seal bars extend a cross-machine direction.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

FIG. 24 depicts a diverter in a first diverter position, FIGS. 25-26 depict the diverter in a second diverter position, and FIG. 27 depicts the diverter pivoted back to the first diverter position.

DETAILED DESCRIPTION

Plastic bags of the type described herein are formed from a web that is folded and sealed such that the bag has a closed bottom, an open top end, and sealed side edges. In certain examples, hems are formed at the open top end to define a channel in which draw tapes are held. The draw tapes may be pulled by the user to close the open top end of the bag. The web and the draw tapes are each unwound from one or more rolls of supply material and fed into the machine 10. Alternatively, the web and/or the draw tape may be received in-line from an ongoing film extrusion process.

Figure 1:
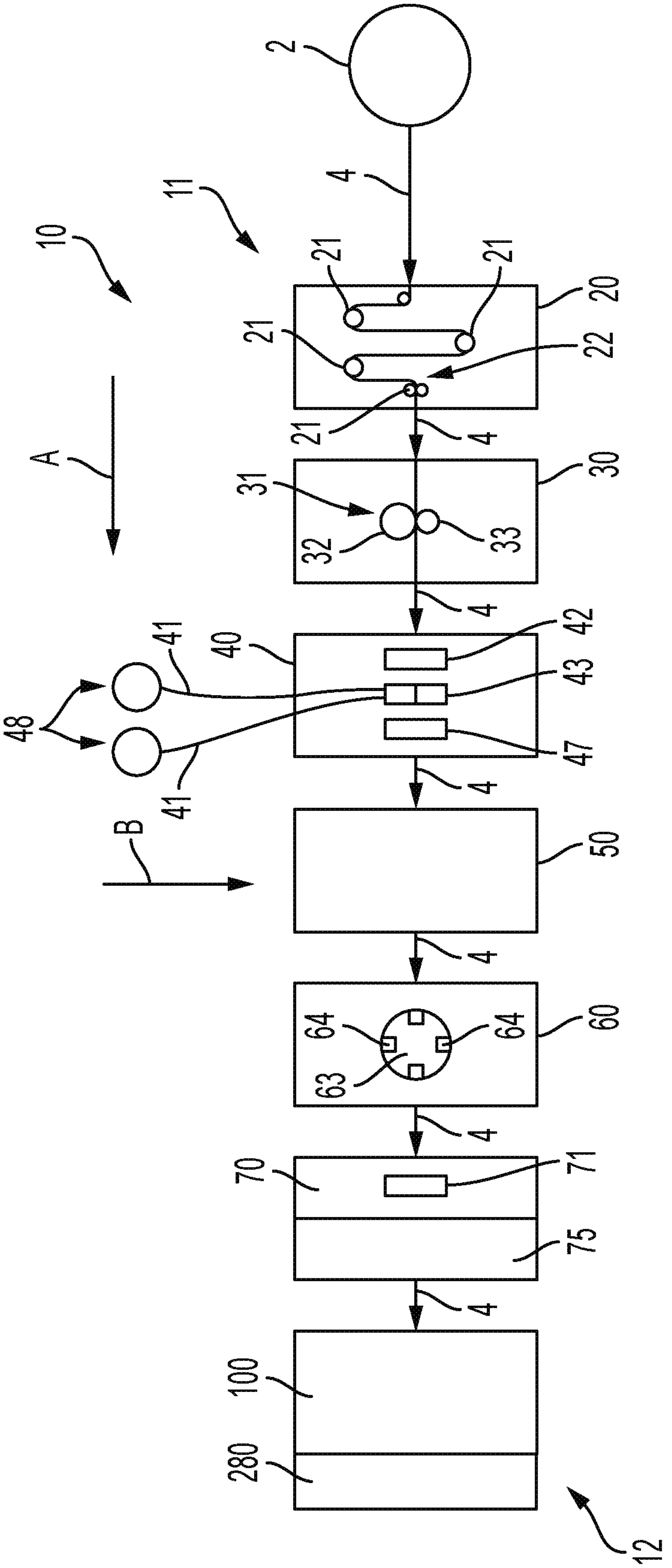
FIG. 1 is a schematic diagram of an example machine according to the present disclosure.
Figure 2:
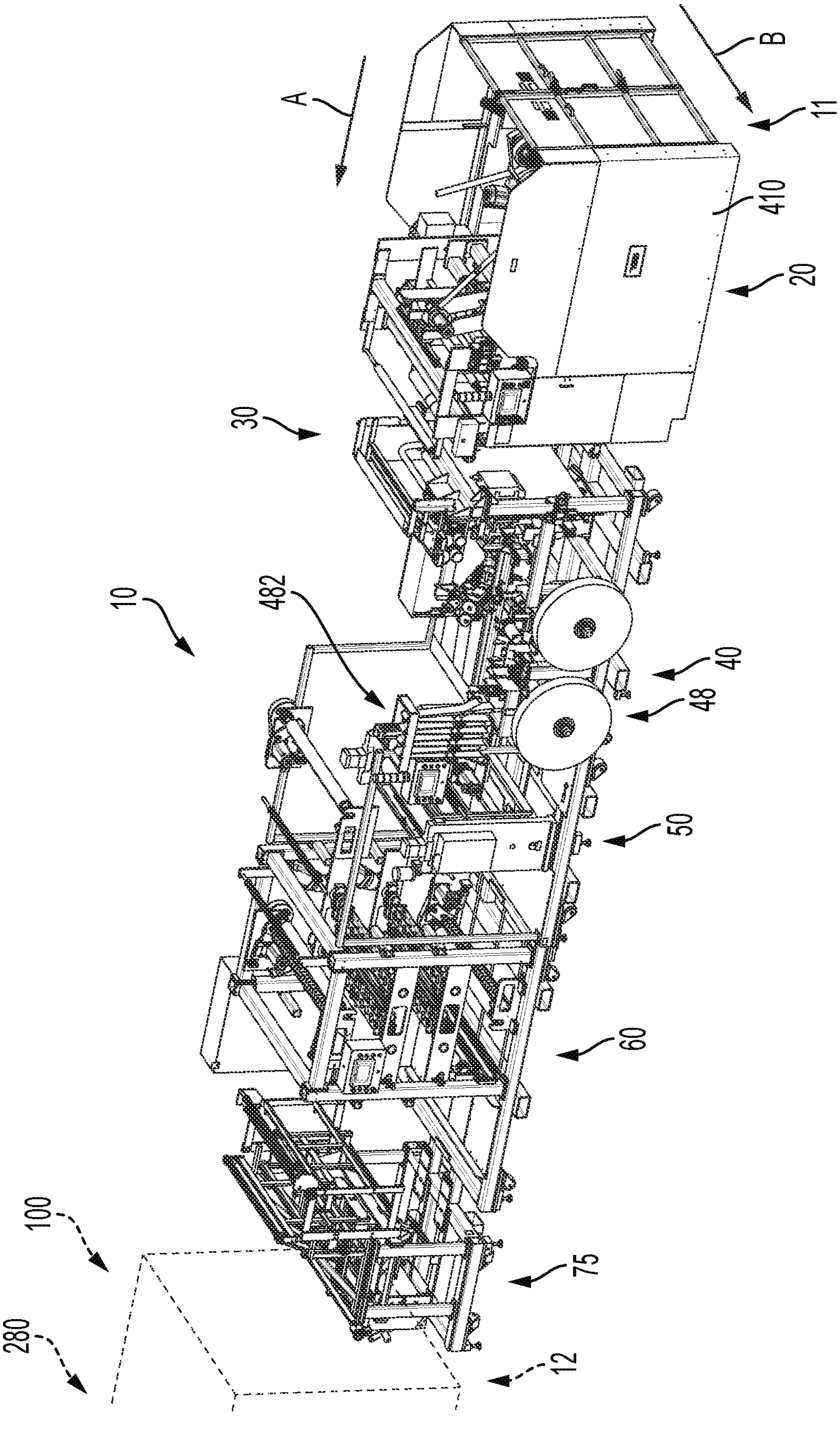
FIG. 2 is a perspective view of an example machine according to the present disclosure.

FIG. 1 depicts a schematic diagram of a machine 10 according to the present disclosure, and FIG. 2 depicts an example machine 10 according to the present disclosure. The machine 10 includes an upstream first end 11 configured to receive a web 4 from a roll 2 of film. The web 4 is conveyed downstream in a machine direction (see arrow A) toward a downstream, second end 12 through a series of one or more stations or sections such as an input section 20, a hole forming section 30, a hem forming section 40, a embossing section 50, a sealing section 60, a perforation section 70, a folding section 75, a winder 100, and/or a bander 280, each of which are described in more detail hereinbelow, that process the web 4 to form bags. The machine 10 further dispenses the bags in rolls from the second end 12 and the rolls of bags can thereby be further processed, packaged, and/or shipped. Example sections of the machine 10 are configured to process the film are described hereinbelow.

The web 4 is received from the roll 2 into an input section 20. The input section 20 includes a series of rollers 21, and the web 4 is routed around the rollers 21 along a web path. The size and type of rollers 21 may vary, and in certain examples, the rollers 21 may be drive rollers, driven rollers, and/or idle rollers. Note that in certain examples drive rollers are positioned throughout the machine 10 to thereby convey the web therethrough. The rollers 21 may define one or more nips 22 through which the web 4 passes. Note that in certain examples, the input section can include an input dancer assembly (not depicted) for stabilizing and optimizing tension in the web 4. Reference is made to the above-incorporated U.S. Patent Application Publication No. 2018/0056599 for example features and components of a known input section and dancer assembly that can be incorporated into the machine 10 of the present disclosure in certain examples.

In other examples, it can be advantageous for the machine 10 of the present disclosure to include an input section 20 that has a minimal number of rollers 21 and/or to exclude an input dancer assembly to reduce or minimize the length of the web path. Minimizing the length of the web path advantageously reduces the size of the input section 20 (e.g., the footprint of the input section 20 can be reduced) and prevents jamming or misalignment of the web 4 while traveling along the web path within the input section 20. The input section 20 can also include one or more load cells that are configured to sense and/or determine tension on the web 4. The load cells are preferably coupled to one or more rollers along which the web 4 is conveyed. If the tension on the web 4 is less than or greater than a predetermined tension value based on signals from the load cells, the machine 10 can increase or decrease rotational speed of one or more rollers to thereby increase the tension on the web 4 to the predetermined tension value.

Figure 3A:
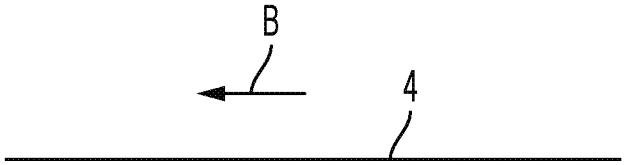
FIGS. 3A-3C are schematic cross-sectional views of different configurations of a web of material.
Figure 3B:
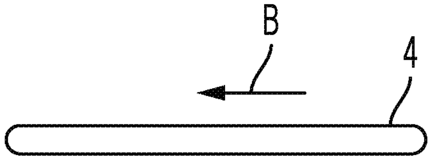
Figure 3C:
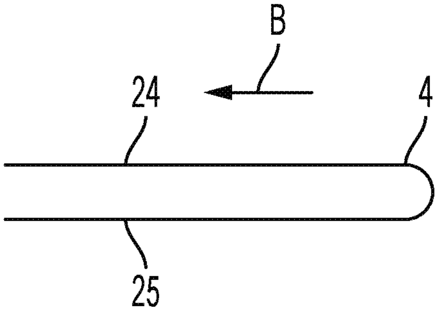

In certain examples the web 4, when received into the input section 20, may be in a flat and unfolded configuration (see FIG. 3A that depicts a cross-sectional view of a flat and unfolded web 4 entering input section 20) or the web 4 may be in a tubular configuration (see FIG. 3B that depicts a cross-sectional view of a tubular web 4 entering the input section 20). Note that FIGS. 2, 3A, 3B, and 3C denote the cross-machine direction (see arrow B). In certain examples, when the web 4 is not in the C-shape configuration (FIG. 3) when unwound from the roll 2, the input section 20 is configured to fold and/or slit the web 4 from one of the configurations of FIG. 3A or 3B into the C-shaped configuration (FIG. 3C) so that the web 4 can be processed by the machine 10 as described hereinbelow. As such, the input section 20 may include folding devices, such as folding boards, that fold the web 4 of FIG. 3A into the desired C-shape of FIG. 3 or may include knives and/or other cutting devices that slit or cut the web 4 of FIG. 2B into the C-shape of FIG. 3.

Figure 4:
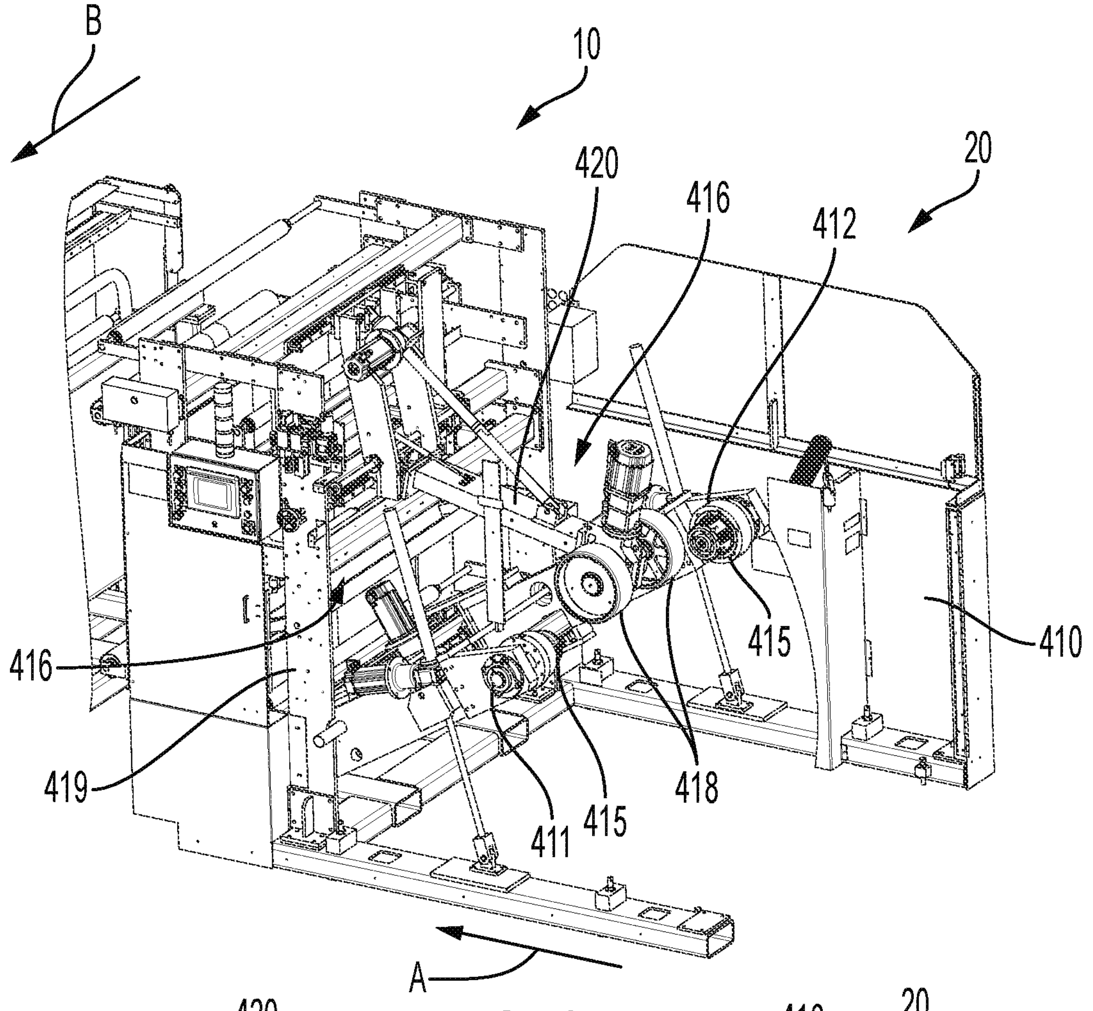
FIG. 4 is a partial perspective view of an input section of the machine depicted in FIG. 2 with a portion of an enclosure removed.
Figure 5:
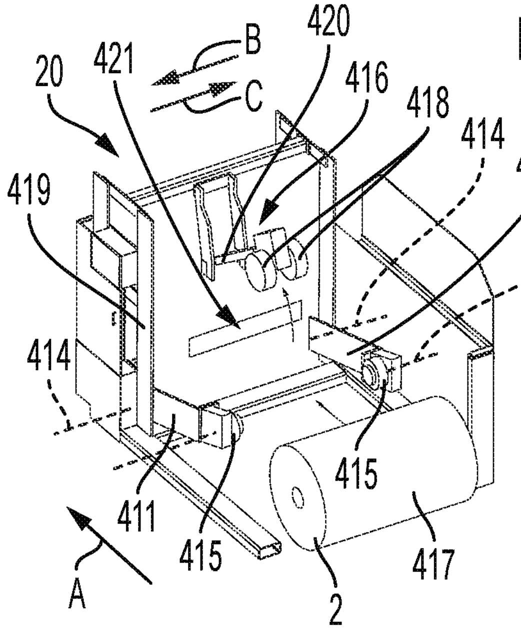
FIGS. 5-6 are schematic views of the input section depicted in FIG. 4.
Figure 6:
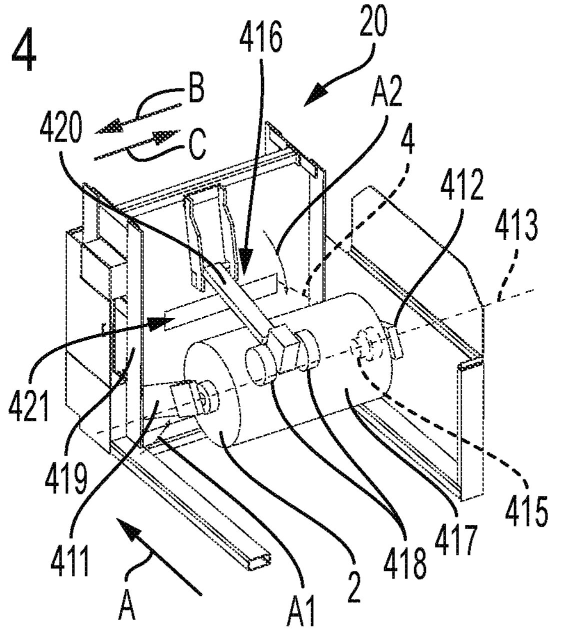

Referring now to FIGS. 4-6, an example input section 20 is shown in greater detail. FIG. 4 is a partial perspective view of the input section 20 depicted in FIG. 2 and a portion of an enclosure 410 has been removed. FIGS. 5-6 are schematic views of the input section 20 depicted in FIG. 4 that depict operation of the input section 20 as described hereinbelow.

The input section 20 includes a first arm 411 and a second arm 412 configured to engage a roll 2 of the web of material. The arms 411, 412 collectively define an unwind axis 413 about which the roll 2 of the web of material rotates. The arms 411, 412 are configured to move in the cross-machine direction (arrow B) or opposite cross-machine direction (arrow C) such that the distance between the arms 411, 412 increases or decreases. The arms 411, 412 are also pivotable about an arm axis 414. In operation, the input section 20 receives the roll 2 of the web of material. The arms 411, 412 are in lowered first arm positions (FIG. 5) such that the roll 2 can be rolled around the ground and that the center of the roll 2 aligns with the unwind axis 413. Once the roll 2 is aligned with the unwind axis, the arms 411, 412 are actuated such that the arms 411, 412 engaged the roll 2. In certain examples, axially extending projections 415 are inserted into the center of the roll 2. Note that the projections 415 may be actuated, or each of the entire arms 411, 412 are actuated. In certain examples, the arms 411, 412 are moved toward each other such that the arms 411, 412 are in a second arm position in which the axial distance between the arms 411, 412 is less than the axial distance between the arms 411, 412 when the arms 411, 412 are in the first arm position (FIG. 5). The arms 411, 412 are pivotable into a third arm position (FIG. 6) (see arrow A1) such that the roll 2 is vertically lifted. In the third arm position, the arms 411, 412 permit the roll 2 to axially shift. Axial shifting of the arms and thereby the roll 2 may be facilitated by one or more actuators controlled by the control system 300 (described above) and/or the arms 411, 412 may be capable of freely axially 'floating' or shifting as the roll 2 is unwound.

The input section 20 also includes an unwind device 416 that is configured to engage an outer perimetral surface 417 of the roll 2 to thereby rotate the roll 2 about the unwind axis 413. The unwind device 416 can be any suitable device for unwinding the web of material from the roll 2, and in one example, the unwind device 416 includes a drive roller 418 that engages and rotates the outer perimetral surface 417 of the roll 2 of the web of material. The drive roller 418 is coupled to the frame 419 of the machine 10 such that the leg 420 and the drive roller 418 can pivot relative to the frame 419 about an axis as the diameter of the roll 2 of the web of material decreases (see arrow A2). Accordingly, the drive roller 418 maintains engagement with the roll 2 as material is removed from the roll 2. The drive roller 418 and the leg 420 are also pivotable away from the roll 2 in the event a new roll 2 is inserted into the input section 20. The drive roller 418 engages the roll 2 to thereby unwind the web 4 and convey the web to the rollers 21 (FIG. 4). FIGS. 5-6 schematically depict an opening or nip 421 through which the web 4 conveyed in the machine direction (arrow A). The nip 421 can be defined between two rollers 21. As the web 4 is unwound, the arms 411, 412 are configured to permit axial movement (e.g., axially shifting) of the roll 2 about the unwind axis 413 to thereby permit position adjustment of the roll 2 and/or the web 4 to reduce undesirable weave or tension inconsistencies in the web as it conveyed downstream in the machined direction (arrow A). As such, the input section 20 acts as a surface-driven side-shifting section that helps to permit large rolls 2 of the web 4 to be utilized in the machine 10. In certain examples, the machine 10 of the present disclosure is capable of processing more linear feet of web 4 that conventional machines and thus, being able to utilize large diameter rolls 2 of the web 4 is advantageously to thereby reduce down time replacing rolls 2 as the web 4 is unwound from the roll 2. Surface driving the roll 2, via the unwind device 416 makes this possible as the unwind speed of the roll 2 can be better controlled than conventional center-drive unwinding devices as these center-drive unwinding devices require additional control system considerations due to driving rotation about the center of the roll 2.

The present inventors recognized that the example input sections 20 of the present disclosure advantageously permit the operator of the machine 10 to utilize large rolls of web (e.g., rolls of web having outer diameters greater than 40.0"), maximize speeds at which the web 4 is conveyed through the machine 10 (e.g., speeds of conveying 700.0 feet per minute or more), minimizing machine downtime, reduce or eliminate roll misalignment which may lead to undesirable tension and/or weaving of the web as it is unwound from the roll, reduce or eliminate web path length relative to convention input sections, reduce or eliminate web weaving of the web, and/or facility low tension in the web of material with large diameter rolls of web.

Figure 7:
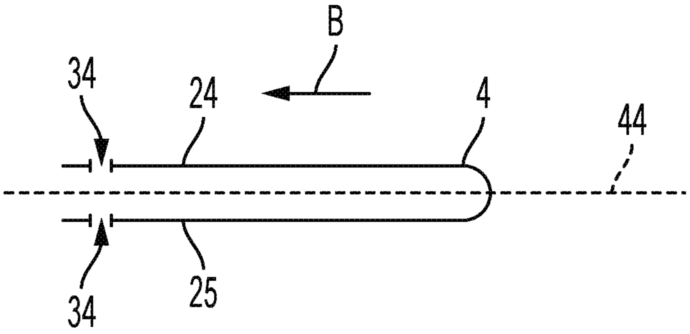
FIG. 7 depicts a cross-sectional view of a web of material with holes 34 cut therein by an example rotary hole cutting device of the present disclosure.
Figure 8:
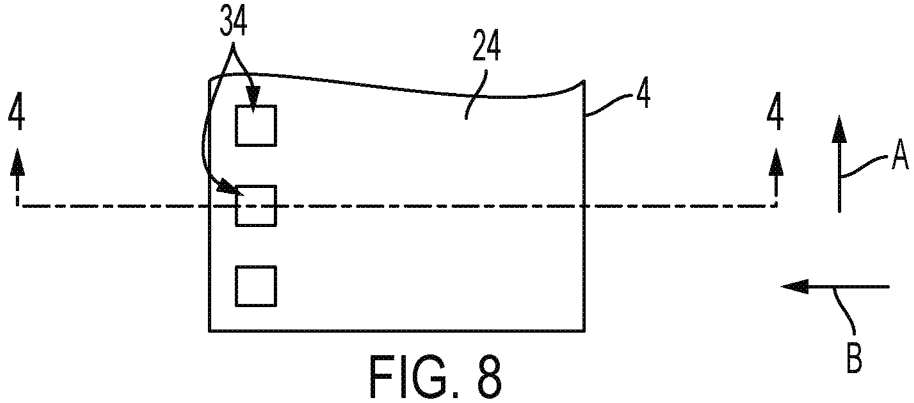
FIG. 8 depicts a top-down plan view of a web of material with holes cut therein.

Referring back to FIGS. 1-2, the input section 20 dispenses the web 4 to a hole forming section 30 that is configured to cut holes into the web 4. The hole forming section 30 includes a rotary hole cutting device 31 having a cutter roller 32 and an opposite anvil roller 33. The web 4 is conveyed through the nip defined between the rollers 32, 33 and the cutter roller 32 rotates with the web 4 such that blades of the cutter roller 32 cut holes 34 (see FIGS. 7-8) in the web 4 at predetermined intervals. FIG. 7 depicts a cross-sectional view of the web 4 with holes 34 cut by the rotary hole cutting device 31, and FIG. 8 depicts a top-down plan view of the web 4 with holes 34 punched therein. Note that the first and second web sides 24, 25 of the web 4 in FIG. 7 are shown spaced apart from each other for clarity and explanation. In operation, the space between the upper and the lower sides 24, 25 of the web 4 in FIGS. 3A-3C and 7 is minimal. The rotary hole cutting device 31 is configured to form corresponding holes 34 in both sides 24, 25 of the web 4 at the same time. Note that in other examples, the holes 34 may be cut into the web 4 via known folding and hole forming processes such as the processes described in U.S. Pat. No. 5,857,953 which is incorporated by reference above.

Figure 9:
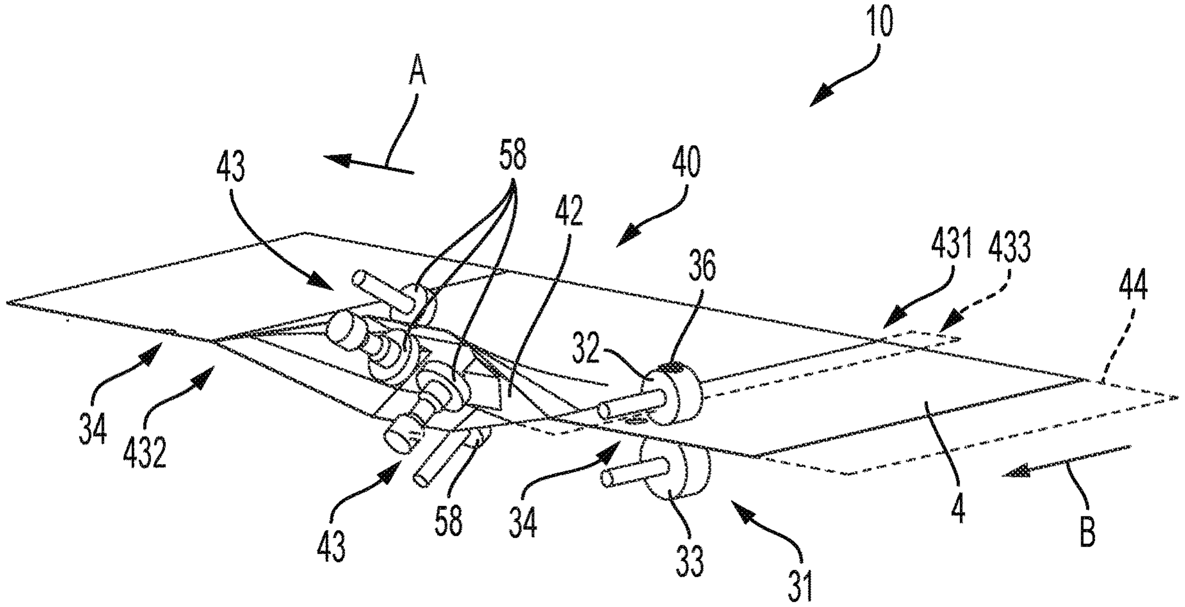
FIGS. 9-11 are various partial schematic views of an example hem forming section according to the present disclosure.
Figure 10:
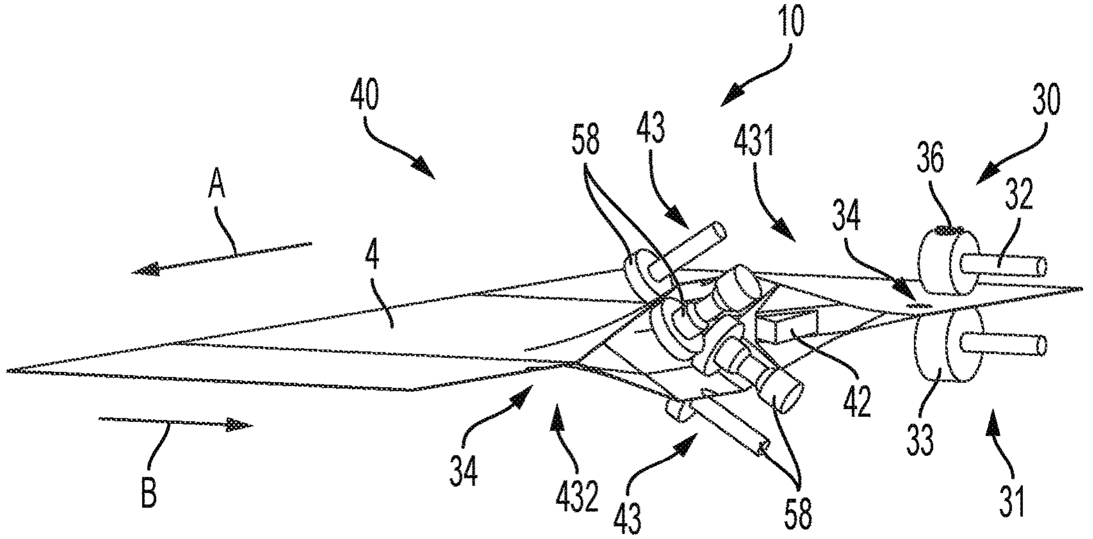
Figure 11:
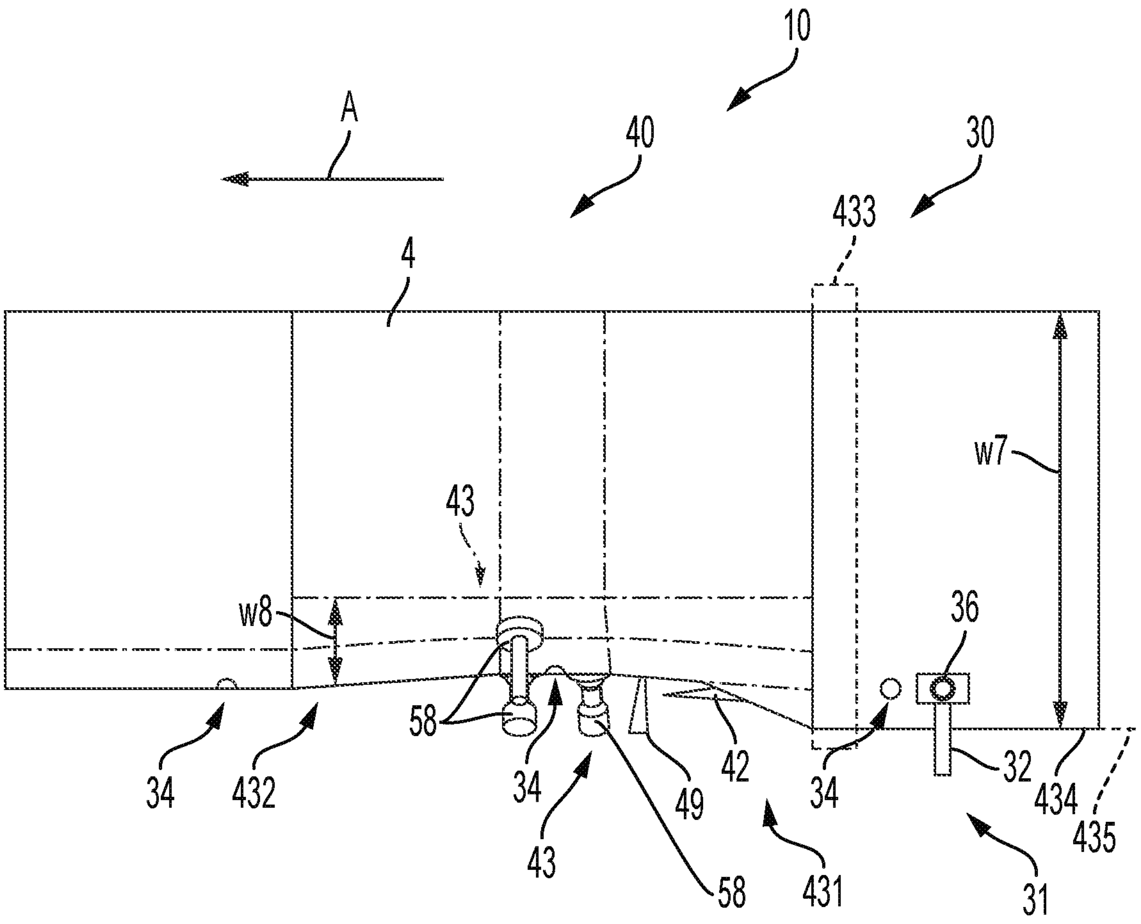

FIGS. 9-11 depict another example hole forming section 30 with another rotary hole cutting device 31. The rotary hole cutting device 31 includes a cutter roller 32 with a die cut projection 36 extending from the outer perimetral surface. An anvil roller 33 is opposite the cutter roller 32 and is configured to support the bottom side of the web 4. In operation, the cutter roller 32 and/or the anvil roller 33 rotate with the web 4 such that the cutter roller 32 cuts the holes 34 through the upper and the lower sides 24, 25 of the web 4 (see FIG. 7). Note that in certain examples, the cutter roller 32 and/or the anvil roller 33 are driver rollers (e.g., the rollers 32, 33 are driven by motor or actuator. Note that in certain examples, the web 4 is later folded (e.g., hems are folded into the web 4) such that the hole 34 formed by the rotary hole cutting device 31 is folded onto itself (e.g., the circular hole formed by the rotary hole cutting device 31 is folded into a semi-circle thumb notch when the hem is formed in the web). Note that using the rotary hole cutting device 31 of the present disclosure allows for various shapes and/or sizes of holes (e.g., triangle, square, rectangle) to be cut into the web 4.

The present inventors have recognized that using the rotary hole cutting device 31 provides unique advantages over conventional machines that use conventional cutter claws and/or hole punches or thumb hole punches to form the holes 34 in the web 4. For instance, the inventors have determined that when utilizing the rotary hole cutting device 31 the web path along which the web 4 is conveyed can be reduced/shortened relative to the web path in conventional machines. The reduced web path is possible due to the rotary hole cutting device 31 rotating with the web 4 such that the cutter roller 32 radially crushes and cuts the web 4. The rotary hole cutting device 31 does not increase or decrease the tension in the web 4 as the hole 34 is formed. That is, the rollers 32, 33 do not stretch or pull on the web 4 as the holes 34 are cut. Thus, additional rollers or other devices are not necessary to maintain an appropriate tension in the web 4 or counteract the tension forces that would otherwise be applied by conventional hole cutting devices. Note that there is minimal or no variation in the tension of the web 4 as the rotary hole cutting device 31 forms the holes 34 in the web 4. As such, consistent tension in the web 4 decreases or eliminates shifting of the web 4 and wrinkles in the web 4 that may otherwise create frayed edges of the holes 34 and/or misaligned holes 34. Furthermore, the rotary hole cutting device 31 of the present disclosure advantageously permits a greater speed of the conveyance of the web 4 through the machine 10 such that the machine 10 is capable of processing web at higher speeds than conventional machines. In certain examples, the utilization of the rotary hole cutting device 31 of the present disclosure can include several additional advantages over conventional machines such as better tension control in the web 4, reduced maintenance to achieve optimal tension in the web 4, and/or elimination of tension shock in the web 4 that may result when conventional cutter claws are used to from holes in the web. In addition, the rotary hole cutting device 31 cuts the full shape of the holes in both sides of the unfolded web 4. As such folding boards are not included before the rotary hole cutting device 31 and the machine direction length of the hole forming section 30 can be minimized. Furthermore, the accuracy, consistency, and alignment of the holes formed in both sides of the web 4 is improved (relative to conventional machines) because folding or unfolding the sides of the web 4 is not required to form the holes in both sides of the web 4. Also, the sides of the web 4 are not separately unfolded in preparation for receiving the draw tape (as in some conventional machines). As such, rotary hole cutting device 31 of the present disclosure consistently and accurately form the full shape of the holes in both sides of the web 4.

In addition, the present inventors have recognized that using the rotary hole cutting device 31 of the present disclosure advantageously provides greater customization options because the cutter roller 32 can be easily removed and replaced with a different cutter roller 32 having a different die cut projection 36. As such, the holes 34 formed in the web 4 can be customized to match desired customer parameters. For example, the cutter roller 32 could include a square-shaped projection and an oblong-shaped projection. Typically, it is not possible to quickly and easily adjust the shape of the holes formed in the web when using conventional machines because the conventional cutter claws are specifically designed to cut the holes in the web based on a certain tension in the web. As such, an operator cannot substitute a conventional cutter claw without also attending to other modifications of the conventional machine such as modifying tension in the web and/or adjusting one or more rollers.

In certain examples, the rotation of the cutter roller 32 is registered to and corresponds to the conveyance speed of the web 4 along the web path. In these examples, the speed of the web 4 can be increased or decreased (e.g., for maintenance, for inspection purposes) and the cutter roller 32 will maintain accurate forming of the holes 34 in the web 4 and the spacing between adjacent holes 34 in the machine direction regardless of the speed of the web 4.

Figure 12:
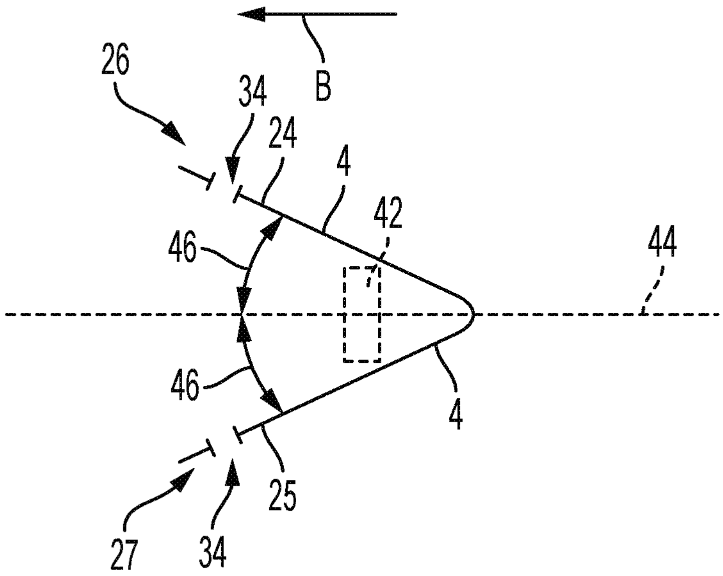
FIG. 12 is a cross-sectional schematic view of a web of material while being separated by an example deflection device of an example hem forming section.
Figure 13:
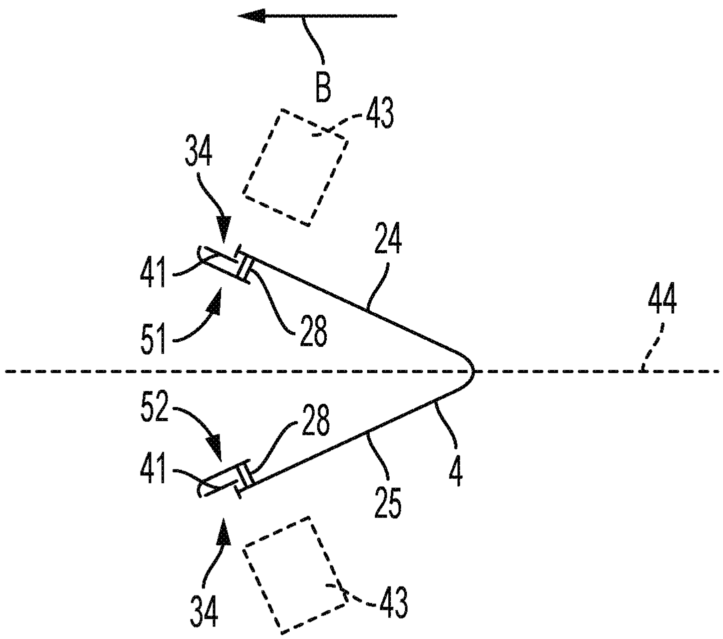
FIG. 13 is a cross-sectional schematic view of a web of material in an example hem forming section when draw tape is inserted into hems and hem seals are formed in the web of material.
Figure 14:
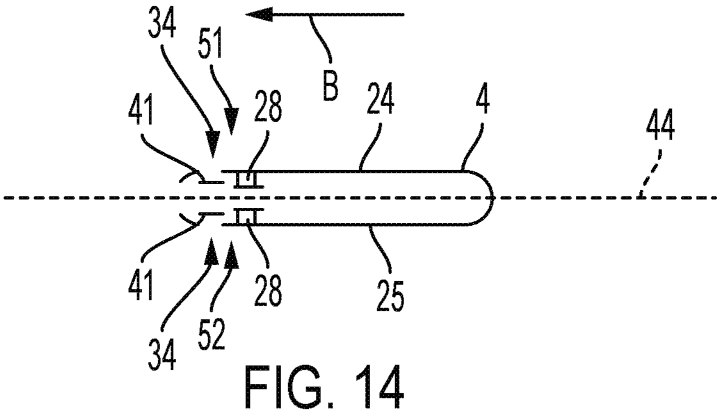
FIG. 14 is a cross-sectional schematic view of a web of material in an example hem forming section when sides of the web of material are adjacent to each other with hem seals and draw tape.

Referring now to FIGS. 9-11, the hole forming section 30 dispenses the web 4 to a hem forming section 40 that is configured to fold hems 51, 52 (see FIGS. 12-13); form seals 28 at the free ends 26, 27 of the web 4 to secure the hems 51, 52 (see FIGS. 12-13); and/or insert draw tape 41 (see FIGS. 13-14) into the hems 51, 52. Note that FIGS. 12-14 are end view of the web 4 at different subsequent positions as the web 4 is conveyed through the hem forming section 40. In operation, the web 4 is conveyed through the hem forming section 40 and the free ends 26, 27 are separated from each other with a deflection device 42 (described in greater detail herein; see FIG. 12). The deflection device 42 (FIG. 12) causes the free ends 26, 27 of the web 4 to separate from each other. Note that the sides 24, 25 of the web 4 extend parallel relative to a horizontal plane 44 upstream of the deflection device 42, and the deflection device 42 is configured to separate the sides 24, 25 such that an angle 46 is defined between each side 24, 25 of the horizontal plane 44 (see FIG. 12).

The present inventors have recognized that separating the sides 24, 25 into positions on either side of the horizontal plane 44 has many advantages over conventional machines. For example, some conventional machines, such as above-incorporated U.S. Pat. No. 5,857,953, disclose separating the sides of the web such that one side of the web remains parallel to the horizontal plane while the other side hangs vertically downwardly from the horizontal plane. In these examples, the weight of the side of the web hanging vertically downwardly causes additional tensile stress in this side of the web and thus the stresses acting on this side of the web are different than the stresses acting on the side of the web that is in the horizontal plane. In these examples, the conventional machine must account for the different stresses in the opposing sides of the web to properly form the hem seals. In addition, the strengths of the hems and/or hem seals formed in the opposing sides of the web may not be uniform resulting in bag/pouch imperfections and/or detrimental variations. Accordingly, the present inventors determined that separating both sides in opposite directions relative to the horizontal plane reduces the maximum tensile stresses in the sides 24, 25 and/or minimizes the differences in the stresses acting on the opposing sides 24, 25 of the web 4. As such the seals 28 can be formed in the web 4 formed without decreasing the strength of the seal 28 and thereby the overall construction of the pouches or bag (and the seals thereof) is improved. Note that in some examples, the two opposing angles 46 are advantageously equal to each other (e.g., forty-five degrees). In addition, by separating the sides of the web in opposite directions and having generally equal angles relative to a horizontal plane, the opposing sides of the web 4 are easily moved back toward each other after the seals 28 are formed in the sides 24, of the web 4.

In certain examples, the hem forming section 40 includes a plurality of rollers (not depicted) that cause the sides of the web 4 to be folded around the draw tape 41 before forming the seals 28 (see FIGS. 13-14). Note that downstream from the rollers the tension in the web 4 causes the opposing sides 24, 25 of the web 4 to move back toward each other. In this example, the holes 34 formed in the web 4 thereby automatically realign with each other after the seals 28 are formed. Note that in other examples folding plates or bars are provided upstream of the rollers to aid folding of the sides 24, 25 of the web 4 and/or provided downstream from the rollers to aid in moving the sides of the web 4 back toward each other.

In other examples as depicted in FIGS. 9-11, the deflection device 42 is configured to cause the sides of the web 4 to fold and/or form hems 51, 52 around the draw tape 41 before forming the seals 28 (see FIG. 13-14) in the hems 51, 52. Referring now to FIG. 11, a plurality of rollers (not depicted) located upstream, and/or downstream relative to the hem forming section 40 are configured to convey the web 4 through the hem forming section 40 between a first hem forming end 431 and a second hem forming end 432. The second hem forming end 432 is downstream in the machine direction (arrow A) from the first hem forming end 431. The deflection device 42 is positioned between the first hem forming end 431 and the second hem forming end 432 and is configured to deflect the web 4 away from a first web plane 433 along which the web 4 is conveyed between the first hem forming end 431 and the deflection device 42. Deflecting the web 4 away from the first web plane 433 advantageously increases the speed of the web 4 and/or the tension in the web 4 conveying along the deflection device 42 such that each side 24, 25 of the web 4 folds onto each other, respectively, thereby forming the hems 51, 52 (see FIGS. 13-14) in the web 4. At least one side 24, 25 of the web of material 4 has an edge 434 that extends along a web edge axis 435, and the deflection device 42 is radially offset from the web edge axis 435. In certain examples, a guide member 49 is downstream in the machine direction (arrow A) and configured to guide at least one of the edges 434 of the sides 24, 25 to form the hems 51, 52, respectively.

Concurrent with the forming of the hems 51, 52, the hem forming section 40 is configured to continuously insert draw tapes 41 from one or more tape unwind stations 48 into each hem 51, 52. Further downstream in the machine direction (arrow A), hem sealing stations 43 are configured to form seals 28 in the web 4 to thereby prevent the hems 51, 52 from inadvertently unfolding and further preventing the draw tape 41 from inadvertently moving out of the hem 51, 52. In certain examples, two hem sealing stations 43 are positioned downstream of the deflection device 42 and are positioned next to one of the free ends 26, 27, respectively (see FIGS. 12-13). The hem sealing stations 43 can include heat sealer or ultrasonic sealer rollers or wheels 58 for forming the seals 28. In certain examples, after the hems 51, 52 are secured to the sides 24, 25 of the web 4, the seals 28 pass through finishing rollers or wheels (not depicted) that apply pressure and/or heat to the seals 28 to improve the seal quality and/or a temperature control station (not depicted) that cools the temperature hem and sides 24, 25. Both the pressure wheel and temperature control station are known in the art and conventional in forming hem seals. Also, note certain components and features of the system described in U.S. Pat. No. 5,857,953 can be utilized in certain examples of the hem forming section 40 of the present disclosure.

After the hems 51, 52 are formed and sealed (as described above), the web 4 is conveyed further downstream where the separated sides 24, 25 are moved toward each other (as shown in FIGS. 9-11 and 14). Note that while FIG. 14 depicts the sides 24, 25 spaced apart for clarity, in operation the sides 24, 25 are in contact each other or at least in close proximity to each other with minimal gap between the sides 24, 25. Accordingly, as the web 4 is conveyed past the deflection device 42, least at portion of the web 4 folds onto another portion of the web 4 to thereby form the hem 51, 52 in each side 24, 25 of the web 4.

Referring specifically to FIGS. 9-11, in certain examples, the hem forming section 40 does not separate the sides 24, 25 of the web 4 along the entire or the majority of the cross-machine width W7 of the web 4. Instead, the hem forming section 40 is configured to separate the sides 24, 25 of the web 4 only near the location where the seals 28 are formed (see distance see web width W8). In this example, the shape of the web 4 as the seals 28 are formed in the separated sides 24, 25 of the web 4 is generally "Y" shaped. There are several advantages achieved when only separating the sides 24, 25 of the web 4 as much as is necessary to insert the draw tape 41, create the hems 51, 52, and form the seals 28. Advantages include increased accuracy in re-aligning the holes 34 in the sides of the web 4 after the seals 28 are formed, reducing or eliminating the risk of entrapping air between the sides 24, 25 of the web 4 when the sides 24, 25 are brought back together, reducing the risk that the draw tape 41 will be pulled out of the folded sides 24, 25 of the web 4, and/or reducing the likelihood of the draw tape 41 "popping" or destroying the hem seal 28. In certain examples, the sealers for forming the seals 28 are ultrasonic sealers having a patterned surface that imparts a corresponding pattern into the seals 28. The patterned seals 28 advantageously have varying thicknesses, ridges, edges, and/or shapes (e.g., bands in the web 4) such that not all portions of the seals 28 are subjected to the same amount of pressure and/or temperatures (compare to continuous seals 28 without patterns that can be uniformly subjected to consistent pressure and temperature). As such, the patterned seals 28, may have increased strength relative to other seals and the draw tape is therefore securely contained within the hem without drawbacks to the bags or the web (e.g., decreased strength). Examples of other ultrasonic sealing components and patterns that can be used with or in place of the components and features of the machine 10 of present disclosure are described in U.S. Pat. No. 10,946,591 and U.S. Application No. 2022/0347961, both of which are hereby incorporated by reference in entirety.

Figure 15:
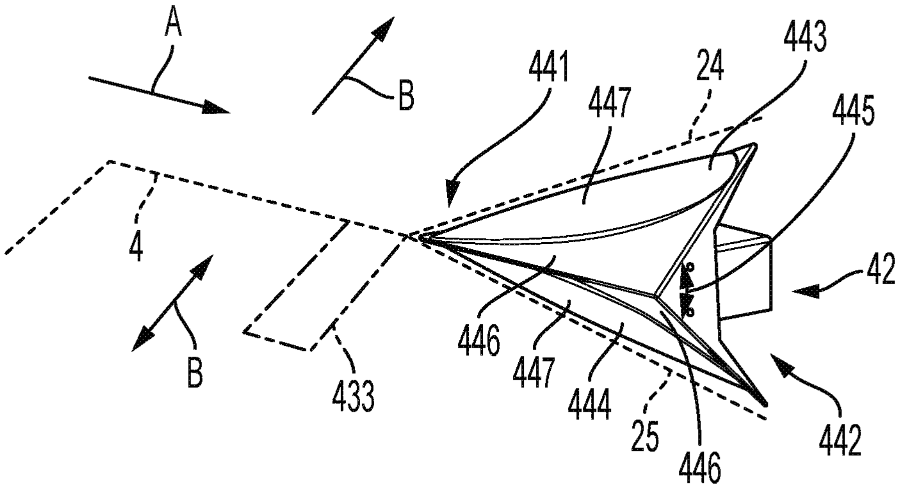
FIG. 15 is a perspective view of an example deflection device according to the present disclosure.
Figure 16:
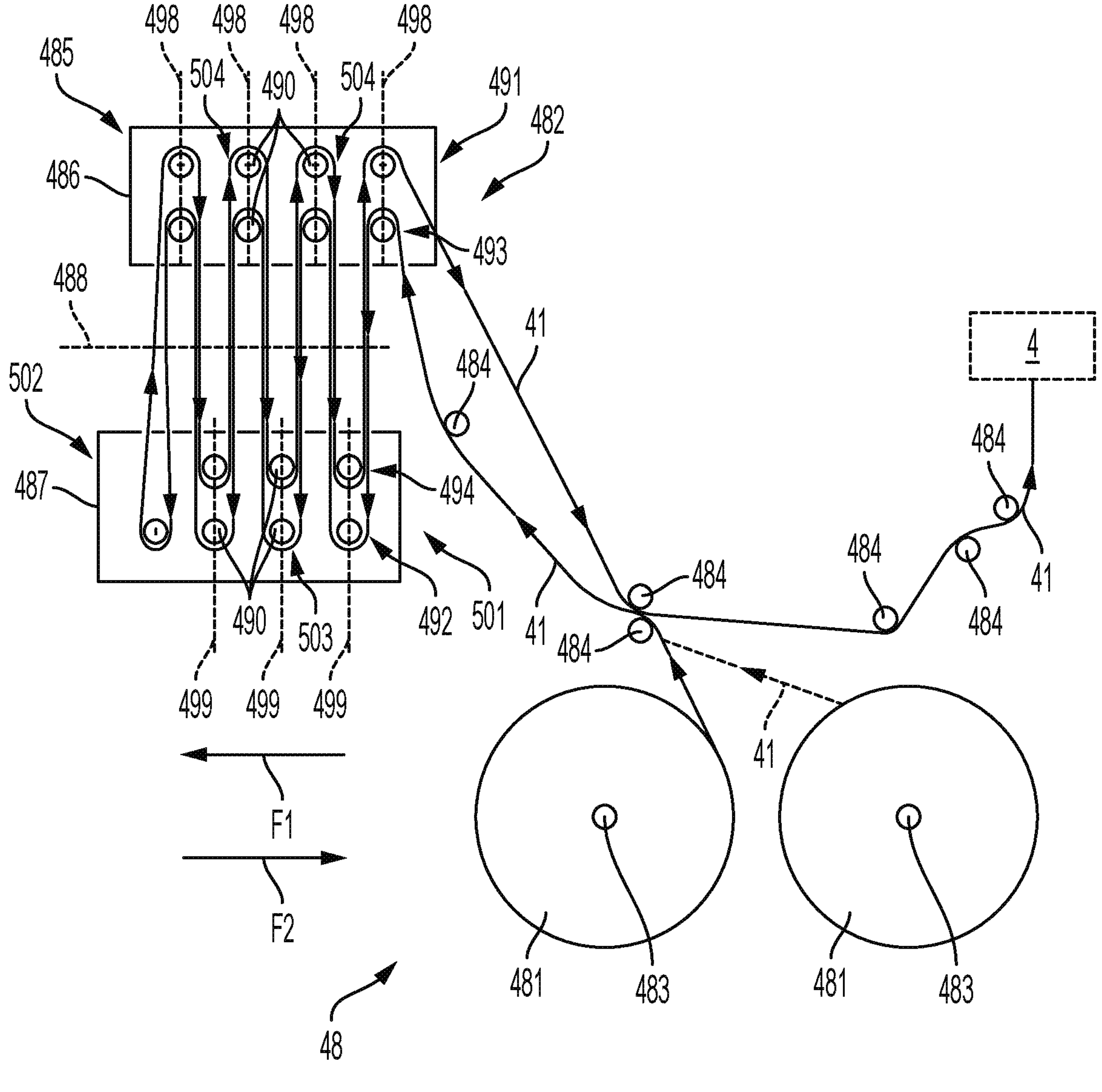
FIG. 16 is an enlarged schematic view of an example draw tape dancer according to the present disclosure.

Referring now to FIGS. 15-16, an example deflection device 42 of the present disclosure is depicted in greater detail. The deflection device 42 has a first deflection end 441 and a second deflection end 442 that is opposite the first deflection end 442. The first deflection end 441 is upstream from the second deflection end 442. The web 4 is schematically depicted as a dashed line on FIG. 15 and spaced apart from the deflection device 42 for clarity. As described above, the web 4 is conveyed in the machine direction (arrow A), the sides 24, 25 move along and are separated by the deflection device 42. The deflection device 42 includes a first deflection surface 443 along which one side 24 of the web 4 is conveyed and a second deflection surface 444 along which the other side 25 of the web 4 is conveyed. Note that the deflection surfaces 443, 444 are generally identical but facing in different directions and thus, each deflection surface 443, 444 can comprise any of the features noted herein. The first deflection surface 443 and the second deflection surface 444 extend transversely to each other and define a deflection angle 445 therebetween. In certain examples, the deflection angle 445 is 45.0 degrees. In other examples, the defection angle is between 5.0 degrees and 85.0 degrees. The first deflection surface 443 includes a planar portion 446 and a curved portion 447 that is curved out of the plane in which the planar portion 446 extends. As such, the deflection device 42 has a 'bulge' defined by the curved portion 447 along which the web 4 passes.

Figure 32:
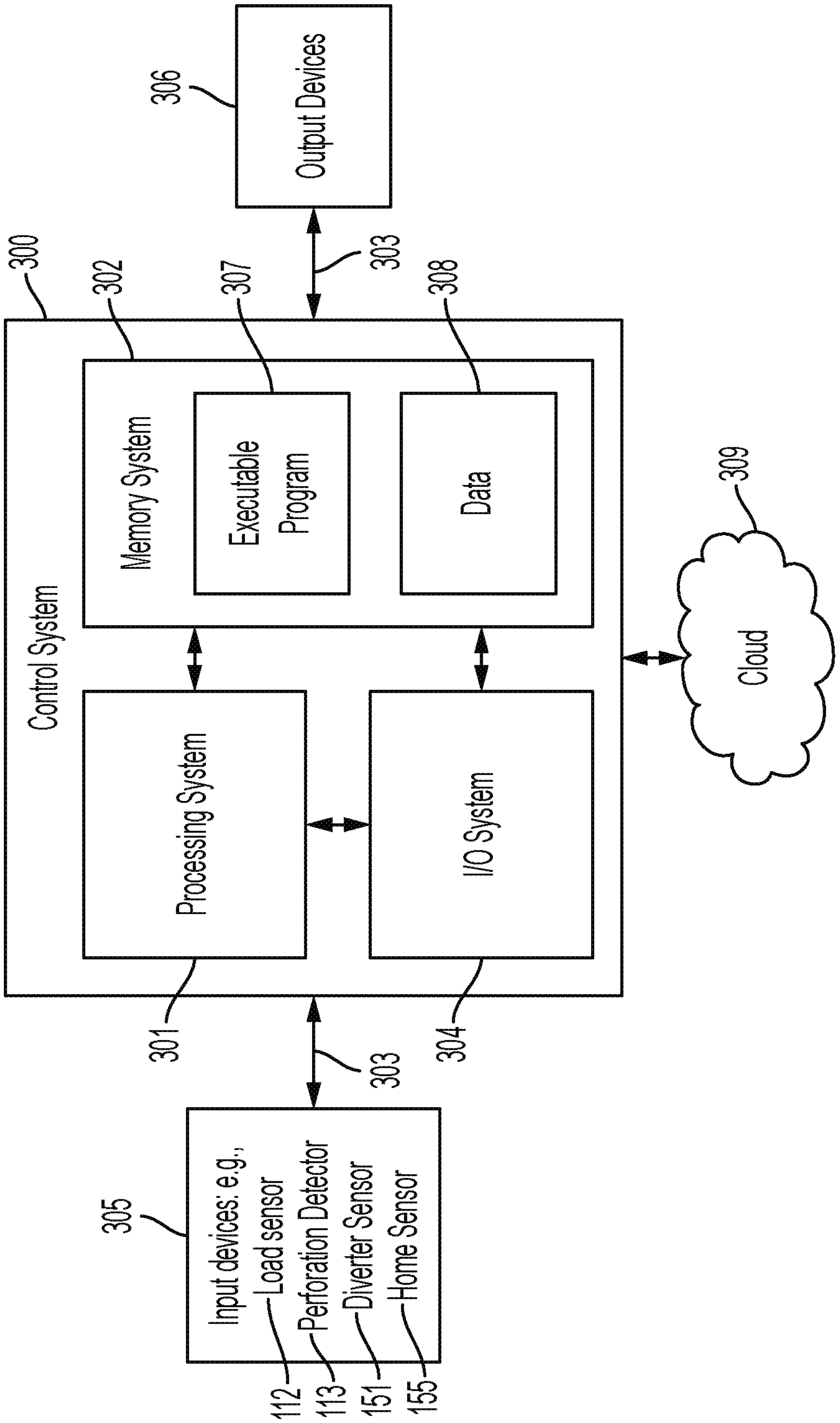
FIG. 32 is a schematic diagram of an example control system according to the present disclosure.

Referring FIGS. 2 and 16, the hem forming section 40 is adjacent to one or more draw tape unwind stations 48 (as noted above) that are configured to support one or more rolls of draw tape 481 from which draw tape 41 is unwound and inserted into the hems of the bags as noted above. The draw tape unwind station 48 includes a draw tape dancer system 482 that is configured to store and/or accumulate the draw tape before being inserted into the hems. FIG. 16 schematically depicts the draw tape unwind station 48 of FIG. 2. The draw tape unwind station 48 includes one or more support rollers 483 configured to support one or more rolls of draw tape 481 thereon. The draw tape from the roll of draw tape 481 is routed along one or more rollers 484 to the dancer system 482. Note that in certain examples, the rollers 484 are drive rollers configured to convey the draw tape 41. In other examples, the dancer system 482 includes a frame 485 with a first frame end 486 and an opposite second end 487. The frame ends 486, 487 are movable relative to each other such that the distance between the frame ends 486, 487 can change. The frame 485 has an frame axis 488 between ends 486, 487 and the ends 486, 487 radially move (e.g., translate) toward and away from the frame axis 488 and each other. The frame ends 486, 487 move toward and away from each other by one or more actuators (not depicted) that are controlled by the control system 300 (FIG. 32). In certain examples, the ends 486, 487 axially move away from each other as draw tape 41 is received into the dancer system 482 such that the amount of draw tape 41 increases (e.g., the length of draw tape 41 within the dancer system 482 increases). Increasing the amount of draw tape 41 can be accomplished by increasing the speed of the rollers that convey the draw tape 41 into the dancer system 482 and/or decrease the speed of the rollers that convey the draw tape 41 out of the dancer system 482 while simultaneously increasing the distance between sets of rollers (described hereinbelow) coupled to the ends 486, 487. Increasing the amount of draw tape 41 advantageously builds a 'reserve' of draw tape 41 that can be conveyed to the web of material for incorporation into the bags formed from the web of material in the event that the roll of draw tape 481 is exhausted and a new roll of draw tape 481 must be utilized by splicing the trailing end of the draw tape with leading end of draw tape from the new roll of draw tape 481. As such, machine 10 downtime may be avoided. Subsequently, the amount of draw tape 41 decreases as the draw tape 41 is conveyed out of the dancer system 482 is greater than the amount of draw tape 41 received into the dancer system 482. The distance between the sets of rollers coupled to the ends 486, 487 decreases as the amount of draw tape 41 in the dancer system 482 decreases.

Still referring to FIG. 16, an outer first set of outer rollers 491 is rotatably coupled to the first frame end 486, an outer first set of inner rollers 493 is rotatably coupled to the first frame end 486, a lower second set of outer rollers 492 is rotatably coupled to the second frame end 487, and a lower second set of inner rollers 494 is rotatably coupled to the second frame end 487. The sets of inner rollers 493, 494 are inset relative to the outer sets of rollers 491, 492. The number of rollers 490 in the sets of rollers 491, 492, 493, 494 can vary, and in the example depicted in FIG. 16 each set of rollers 491, 492, 493, 494 has a plurality of rollers 490. In one non-limiting example, each set of rollers 491, 492, 493, 494 has four or three rollers 490. In other examples, one or more of the rollers 490 configured to convey the draw tape 41 through the dancer system 482.

In certain examples, each roller 490 in the first set of outer rollers 491 and the corresponding roller 490 in the first set of inner rollers 493 is aligned along a first roller axis 498 that extends in the direction between the ends 486, 487 (e.g., a rightmost roller 490 in the first set of outer rollers 491 is aligned along a first roller axis 498 with a rightmost roller 490 in the first set of inner rollers 493). In the example depicted in FIG. 16, the three roller axes 498 are offset and parallel to each other. Similarly, each roller 490 in the second set of outer rollers 492 and the corresponding roller 490 in the second set of inner rollers 494 is aligned along a second roller axis 499 that extends in the direction between the ends 486, 487 (e.g., a rightmost roller 490 in the second set of outer rollers 492 is aligned along a second roller axis 499 with a rightmost roller 490 in the second set of inner rollers 494). In the example depicted in FIG. 16, the three second roller axes 499 are offset and parallel to each other. In certain examples, the first rollers axes 498 are parallel and offset from the second roller axes 499.

In certain examples, the dancer system 482 has a first dancer side 501 configured to receive the draw tape 41 and an opposite second dancer side 502. The draw tape 41 is routed in generally a first dancer direction F1 from the first dancer side 501 to the second dancer side 502 and alternately along rollers 490 of the first set of inner rollers 493 and the second set of outer rollers 492. As such, the draw tape 41 is conveyed along a first serpentine path 503 in generally the first dancer direction F1. The draw tape 41 is then routed in generally a second dancer direction F2 opposite the first dancer direction F1 from the second dancer side 502 to the second dancer side 502 and alternately along rollers 490 in the first set of outer rollers 491 and the second set of inner rollers 494. The draw tape 41 is dispensed from the first dancer side 501. As such, the draw tape 41 is conveyed along a second serpentine path 504 in generally the second dancer direction F2. Note that the second serpentine path 504 is offset from and follows the first serpentine path 504. In certain examples, the second serpentine path 504 is adjacent to and follows the first serpentine path 503. In certain examples, the second serpentine path 504 is parallel and/or equidistant from the first serpentine path 503. Accordingly, the total length of draw tape within the dancer system 482 is advantageously greater than the total length of draw tap within conventional draw tape dancers that occupy the same footprint thereby permitting the machine to convey the web at higher speeds and storing more draw tape in the dancer system 482 that can be utilized by the machine when the draw tape roll 481 needs to be replaced and/or spliced with a new roll of draw tape thereby minimizing or preventing machine downtime. The dancer system 482 of the present disclosure also advantageously occupies less space than the space needed for conventional dancers to accumulate the same length of draw tape 41. After the draw tape 41 is routed through the draw tape unwind station 48, the draw tape 41 is conveyed along rollers to be inserted into the web as described above. The present inventors recognized that the example draw tape unwind stations 48 of the present disclosure can advantageously increase the amount of accumulation of the draw tape in the dancer system thereby enabling increased speed of conveyance of the web through the machine 10.

Figure 17:
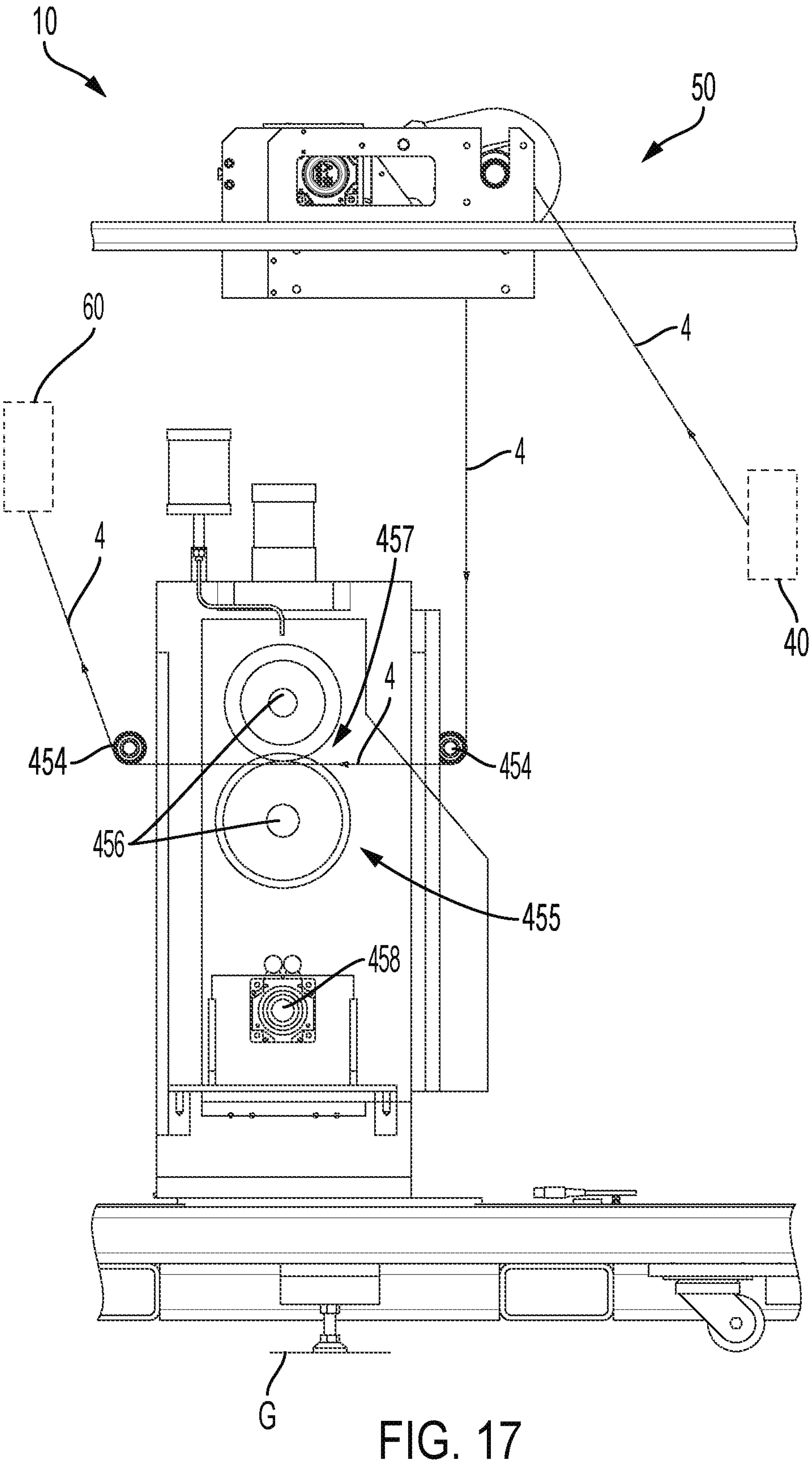
FIG. 17 is a side view of an example embosser according the present disclosure.

Referring FIGS. 1-2 and 17, the web 4 can be conveyed downstream in the machine direction (arrow A) from the hem forming section 40 to an embossing section 50 configured to emboss the sides 24, 25 of the web 4. In certain examples, the web 4 is conveyed along one or more rollers 454 through an embosser 455 have a pair of embossing rollers 456. The nip 457 is defined between the embossing rollers 456. A motor 458 rotates one or both of the embossing rollers 456. Note in other examples, the embossing rollers 456 are rotated by web 4. The embossing roller 456 emboss the patterns on the embossing roller 456 into the sides 24, 25 of the web 4. In certain examples, the embosser 455 applies pressure and/or heat to the sides 24, 25 of the web 4 to thereby emboss the pattern into the web 4.

Figure 18:
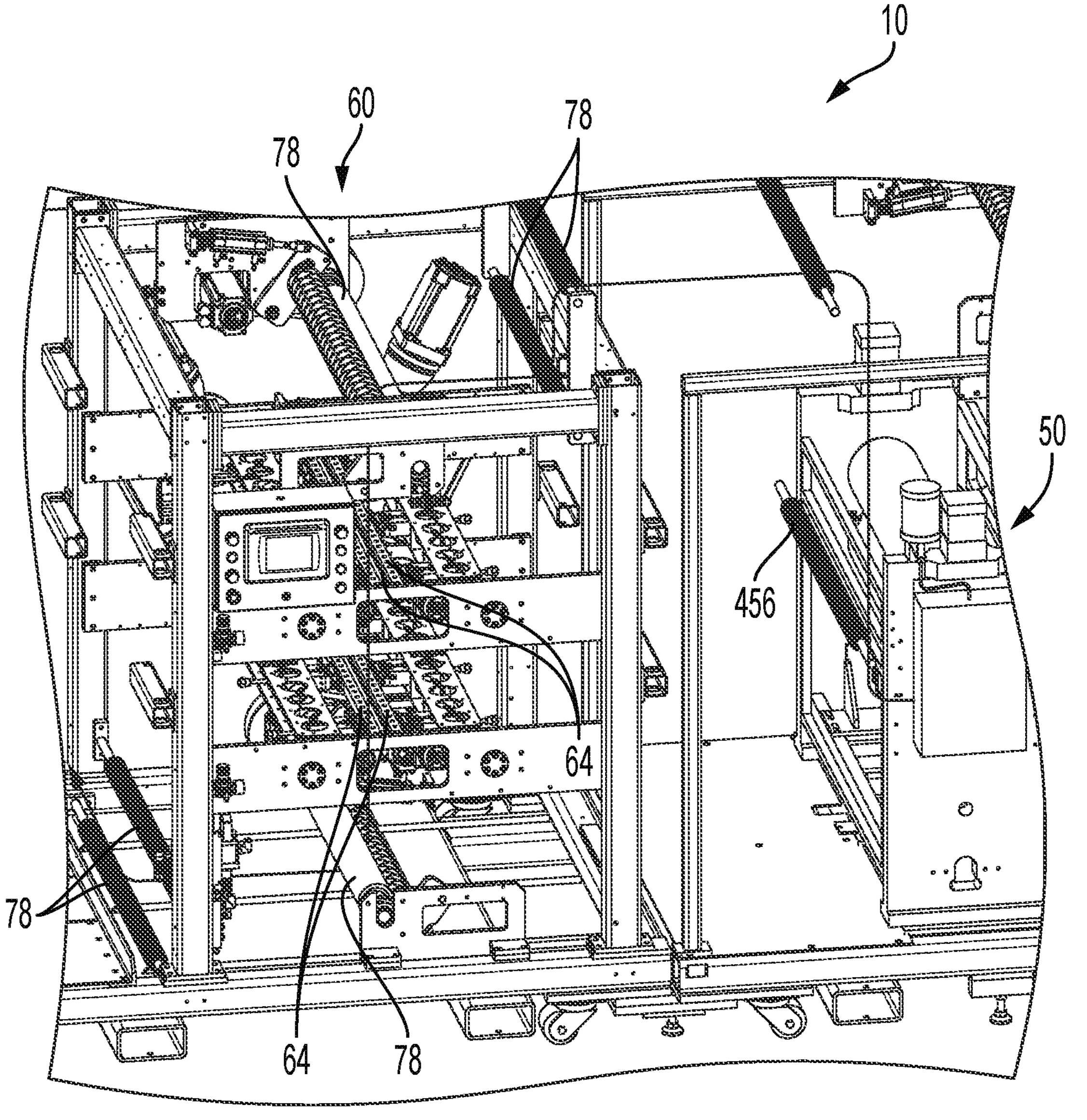
FIG. 18 is a perspective view of an example sealing section according to the present disclosure.
Figure 19:
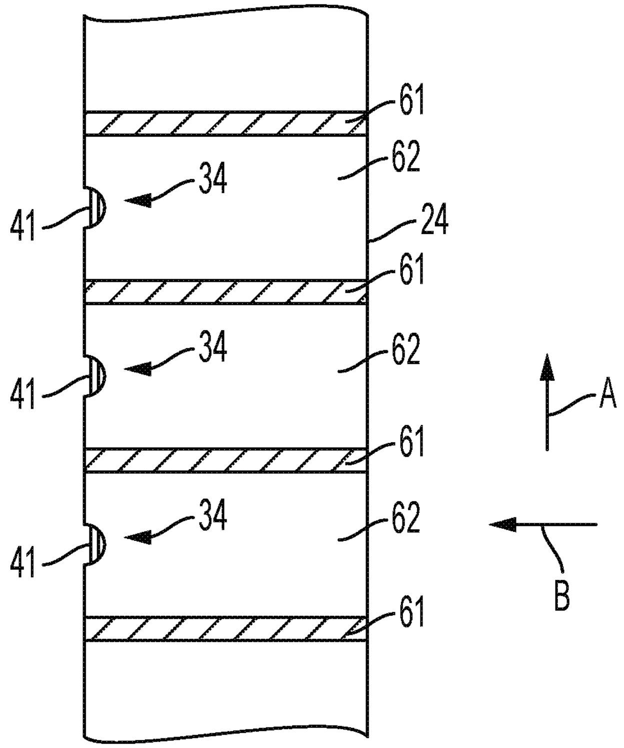
FIG. 19 is a top-down schematic view of an example web of material with side seals between each bag that is formed in the web of material.

Referring to FIGS. 1-2 and FIG. 18, an example sealing section 60 is positioned downstream in the machine direction (arrow A) from the embossing section 50. The web 4 with the hem and draw tape formed therein is conveyed to the sealing section 60 such that seals, specifically side seals 61, are added to the web 4 to thereby at least partially define individual bags 62 (see FIG. 19) from the web 4. FIG. 19 depicts a schematic view of the web 4 as it is conveyed downstream from the sealing section 6. In the example section of the web 4 depicted in FIG. 19, four side seals 61 are formed in the web 4 and extend in the cross-machine direction (arrow B) such that three bags 62 are defined therein. The side seals 61 may be formed using a sealing drum 63 with a plurality of seal bars 64 as the web 4 is conveyed around the sealing drum 63. Reference is made to the above-incorporated U.S. Patent Application Publication No. 2018/0056599 for components and features of conventional rotary bag machines that incorporate a sealing section that can be utilized in the machine 10 of the present disclosure.

Figure 20:
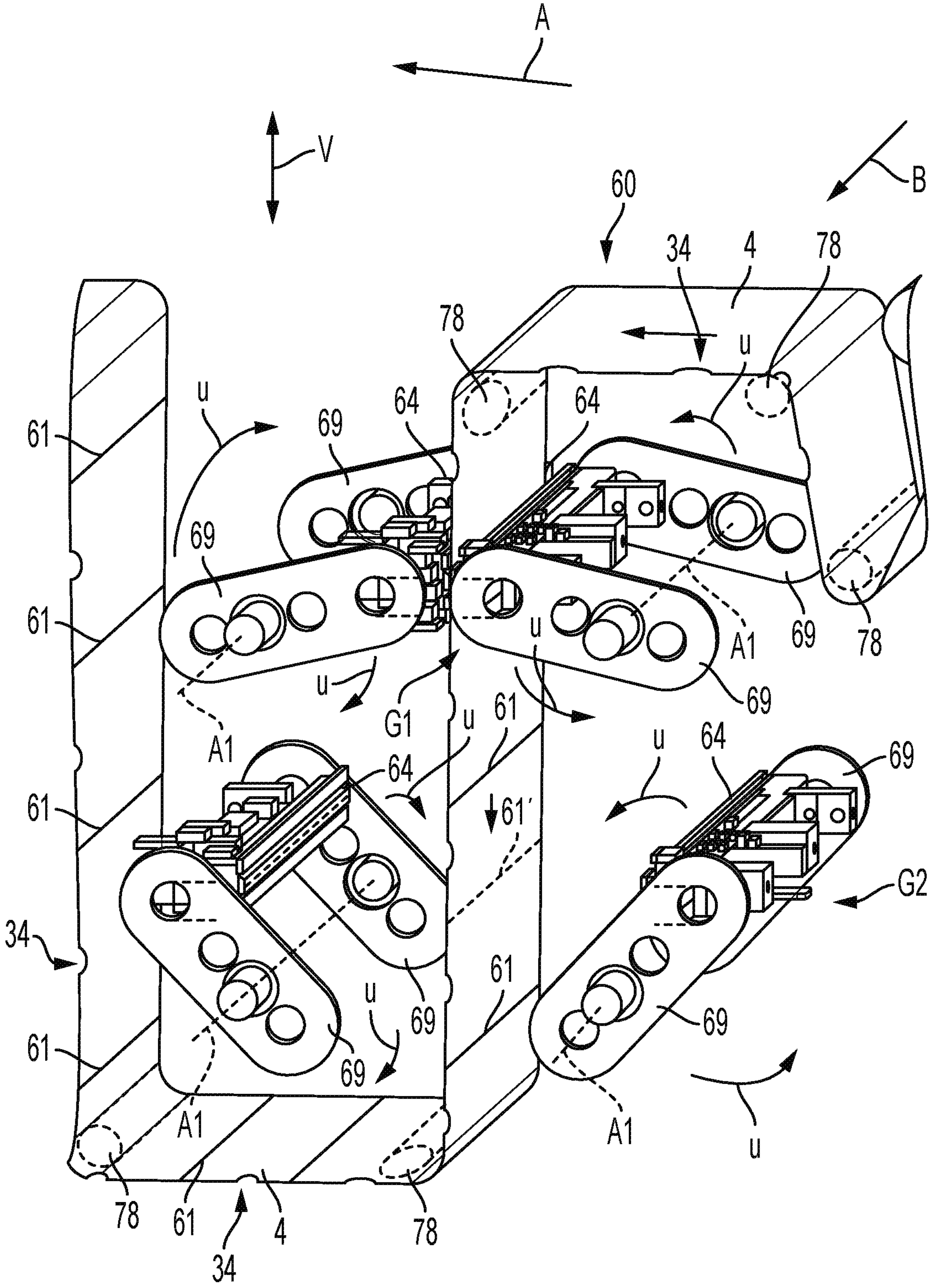
FIG. 20-21 are example schematic view of a sealing section according to the present disclosure with sealing bars in different positions.
Figure 21:
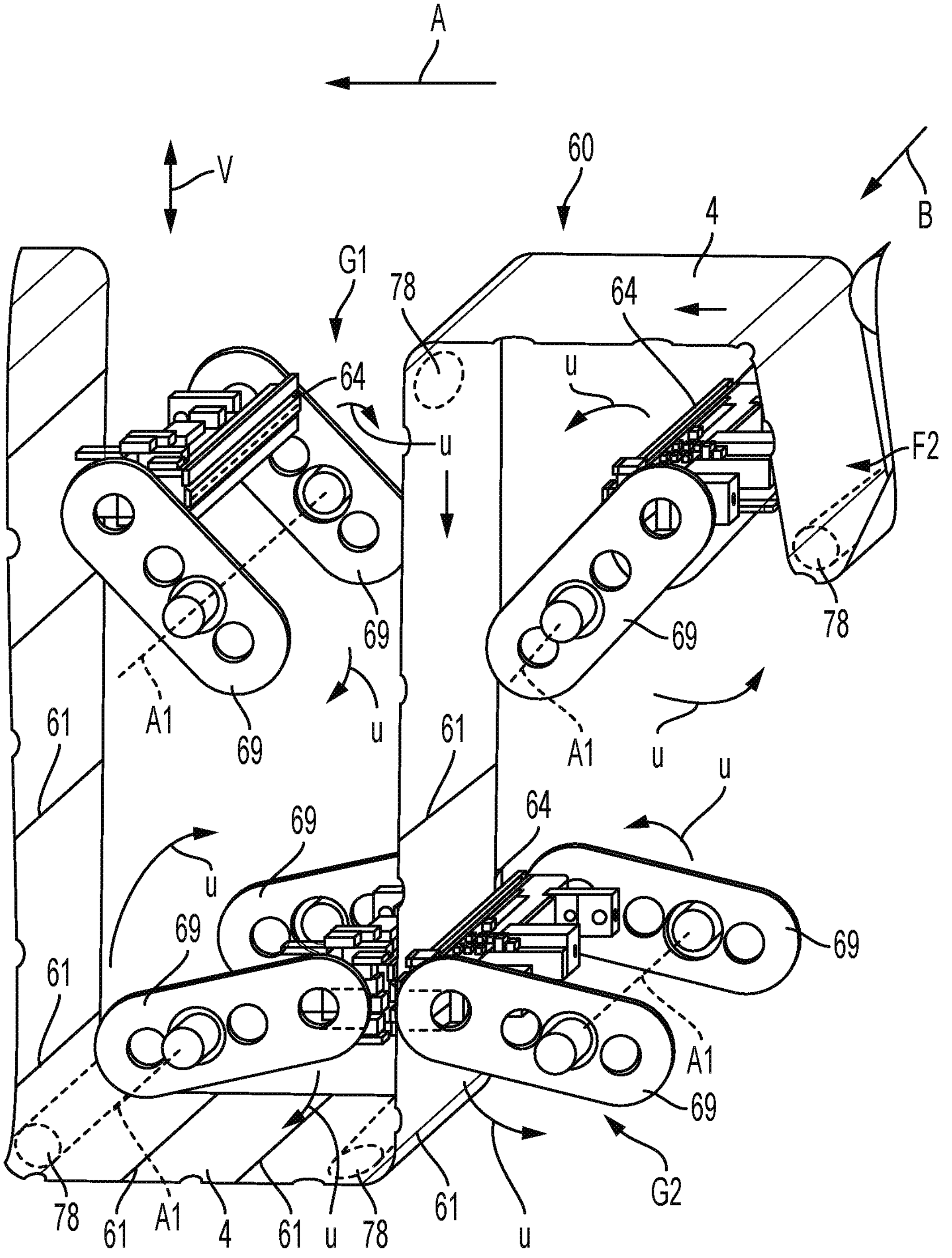
Figure 22:
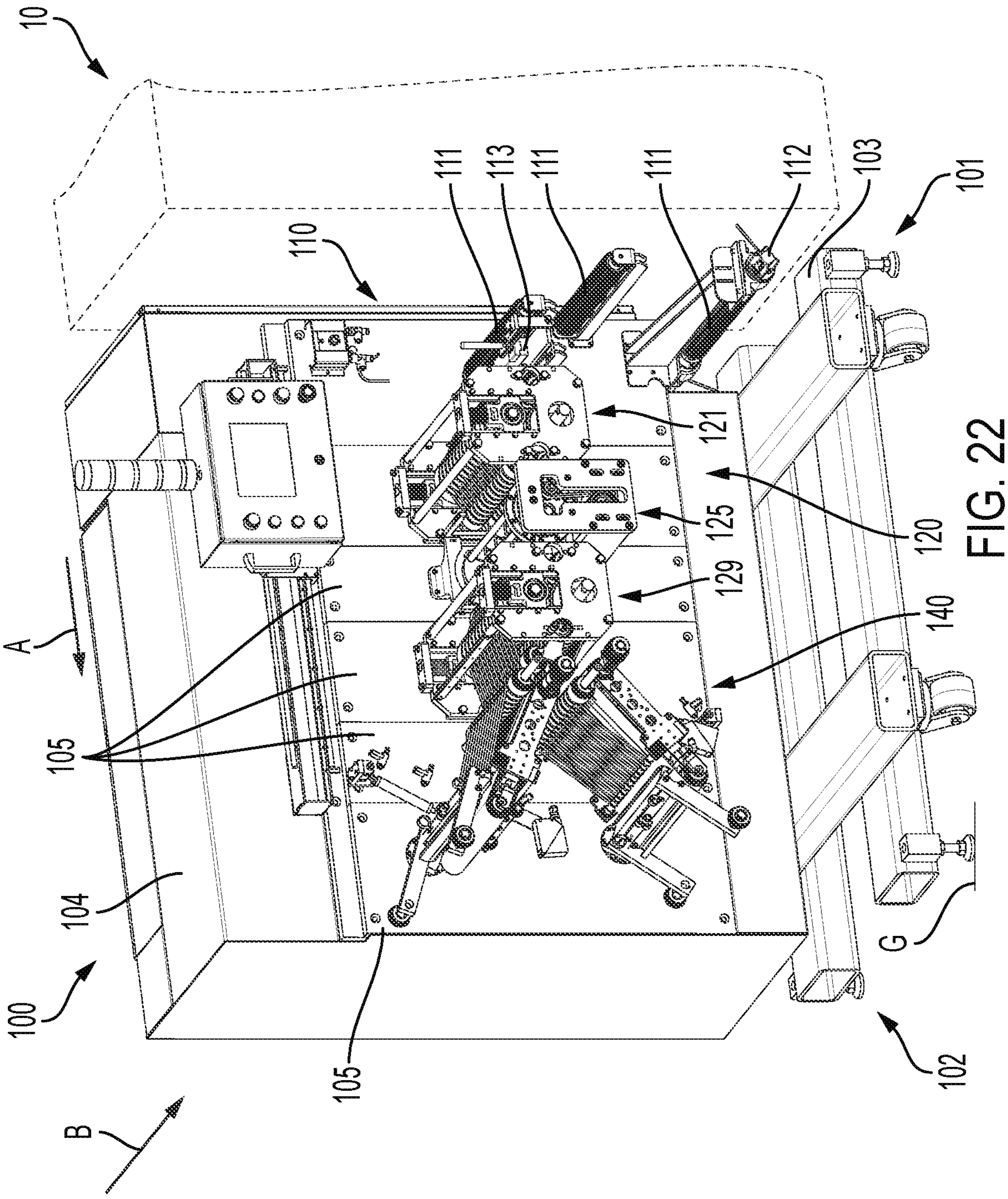
FIG. 22 is a perspective view of an example winder according to the present disclosure.

Referring to FIGS. 20-22, another example sealing section 60 is depicted in greater detail. Note that FIGS. 20-22 schematically depict the sealing section 60 and depict the seal bars 64 in different positions as the seal bars 64 rotate to thereby form seals, specifically side seals 61, of the bags in the web 4 (described in greater detail hereinbelow). The seal bars 64 can apply heat and/or pressure to the web 4. Note that the seal bars 64 may travel with the web 4 for a predetermined dwell time such that the side seal 61 is properly formed in the web 4.

In the example depicted in FIGS. 20-22, the web 4 is conveyed downstream along a plurality of rollers 78 and a portion 510 of the web path extends vertically through the sealing section 60. As will be described further herein, the seal bars 64 from the side seals in the web 4 along the portion 510 of the web path that extends vertically. As such, the footprint of the sealing section 60 can be reduced in comparison to conventional sealing sections that form seals while the web path is in a generally horizontal orientation (or extends in the machine direction).

The sealing section 60 includes two or more pairs of moving seal bars 64, and in this example, the sealing section 60 includes two pair of sealing bars 64 (first pair G1 and second pair G2). Each seal bar 64 moves in a continuous path (e.g., circular path) as the seal bar 64 rotates about its respective axis A1 (see arrows U depicting motion of the seal bars 64 about the axes A1), and the seal bars 64 in each pair cooperate to thereby form the side seal in the web 4 as the web 4 is conveyed through the sealing section 60. In this example, the web 4 is conveyed along a web path (e.g., serpentine path) defined by rollers 78 (see schematically depicted in dashed lines) in a vertical direction (see example vertical axis V) through two pairs of seal bars 64 (first pair G1 and second pair G2). The seal bars 64 are mounted on arms 69 that each rotate about a respective axis A1. In certain examples, the seal bars 64 are pivotally coupled to the arms 69 such that the seal bars 64 pivot and/or linearly translate with the web 4. The first pair of seal bars (G1) is vertically spaced apart from the second pair of seal bars 64. The first pair of seal bars 64 (G1) form one of the side seals 61 (see FIG. 19) in the web 4 when the seal bars 64 are rotated into engagement with the web 4, and the second pair of seal bars 64 (G2) from another of the side seals 61 (FIG. 19) adjacent to and spaced apart from the seal formed by the first pair of seal bars 64 (G2). As such, each pair of seal bars 64 form "every-second" or alternating seals 61 in the web 4 (FIG. 19; see also FIG. 20 which schematically depicts the location of the seal to be applied by the second set of rotating seal bars 64 as part number 61'). In certain examples, the first pair of seal bars 64 (G1) form every other side seal 61 (see FIG. 19) and the second pair of seal bars 64 (G2) form the other side seals 61 in the web 4. In this example, the speed of the web 4 conveyed through the side seal section 60 can be increased due to the two pairs of seal bars 64 (G1, G2) forming every other side seal 64 in the web 4 in comparison to a sealing section in a conventional machine that utilizes only one pair of seal bars 64. In other examples, the two pairs of seal bars 64 together form the side seals 61 in the web 4 and separately form every-other side seal 61 in the web 4. Note that in other examples, more than two pairs of seal bars 64 may be utilized, and in these examples, the speed of the web 4 may be increased as the 'number' of pairs of seal bars 64 will form every 'numberth' seal in the web 4. The present inventors recognized that the example draw tape unwind stations 48 of the present disclosure can advantageously reduces the length of web path in the sealing station, reduces size/footprint of the machine 10 and rotating inertia in comparison to conventional sealing section, and/or maintains preferred sealing conditions (e.g., dwell times and sealing temperatures) to thereby facilitate forming of strong seals in the web without compromising the films/substrates.

Referring back to FIG. 1, optionally, after the side seals are formed in the web 4 in the sealing section 60, the web 4 is conveyed in the machine direction (arrow A) downstream through a perforation section 70 that has a perforator 71 configured to add perforations between the bags 62. For instance, the perforator adds perforations in or adjacent to the side seals 61. Note certain components and features of the system described U.S. Patent Application Publication No. 2018/0056599 may be utilized in the machine 10 of the present disclosure. Note that in other examples, perforations are added to the web 4 in the sealing section 60.

The web 4 can also be optionally conveyed through a folding section 75 that is configured to fold the web 4 and the bags 62 formed therein. In one example, the bags are folded lengthwise such that the overall width of the bags is less than the width of the web 4. As such, the folded bags in web 4 are wound downstream in the winder 100 (described in greater detail herein below). In certain examples, the perforation is added with a blade such that the perforation is between two adjacent portions of the side seal. As such, the width of the unsealed "skirts" between the bags or pouches is reduced.

Referring to FIGS. 1-2 and FIGS. 22-29, the machine 10 includes a winder 100 that is configured to wind the bags 62 into rolls of bags (described in greater detail herein below).

The winder 100 receives the web 4 with the bags formed therein (as described above) for an upstream section, such as the sealing section 60 or the folding section 75. The rolls of bags are then conveyed further downstream for processing (e.g., packaged, shipped). The winder 100 includes an upstream first winder end 101 and an opposite downstream second winder end 102. A frame 103 supports components of the winder 100 vertically above the ground G, and a housing 104 houses several components of the winder 100. Note that panels 105 of the housing 104 can be removed to thereby expose components therein, some of which are noted hereinbelow. The example winder 100 of the present disclosure includes an input station 110, an overlap station 120, and a winding station 140.

Referring to FIG. 22, the input station 110 includes a plurality of rollers 111 along which the web 4 is routed (note that the path of the web 4 is depicted in dashed lines). One or more of the rollers 111 can include a load sensor 112 that is configured to determine tension in the web 4. The load sensor 112 advantageously sends signals to a control system 300 (FIG. 32) corresponding to the tension of the web 4 and based on the tension in the web 4 the control system 300 controls rotation of one or more rollers 111 to thereby maintain or adjust the tension in the web to a desired tension. For example, the control system 300 may increase the rotational speed of the roller 111 to thereby decrease the tension in the web 4 or decease the rotational speed of the roller 111 to thereby increase the tension in the web 4. In other examples, the control system 300 processes signals from the load sensor 112 to determine tension in the web 4 and if the tension is less than a predetermined optimum tension value, the control system 300 increases or decreases rotation of one or more rollers 111 to adjust the tension in the web 4 to the predetermined optimum tension. The present inventors have discovered that if the tension in the web 3 is less than the predetermined optimum tension value, the web 4 will not be properly conveyed through and processed by the winder 100.

The input station 110 also includes one or more perforation detectors 113 that are configured to sense the perforations in the web 4. As noted above, the perforations between bags 62 are added to the web 4 by the perforator 71 (see FIG. 1) in the perforation section 70 (FIG. 1). The perforation detectors 113 send signals to the control system 300 when a perforation is detected in the web 4. The control system 300 (FIG. 32) compares the signals to an anticipated or desired location of the perforations in the web 4 based on speed of the web 4 or length of the web 4 calculated passing by a specific point in the machine 1. If the control system 300 determines that the signals from the perforation detectors 113 correspond or match the anticipated location of the perforation, the control system 300 controls the machine 10 to thereby continue normal operation thereof to process the web 4 (as described below). However, if the control system 300 determines actual location of the perforation in the web 4 is different than the anticipated location of the perforation, the control system 300 alerts the operator and/or shuts the machine 10 down to prevent improper processing of the web 4 and/or jamming of the web within the winder 100 and/or the machine 10. Accordingly, the perforation detectors 113 act to confirm and "double-check" that web 4 is being properly conveyed and/or being conveyed at proper speeds such that the web 4 is can be property processed by the machine 10 in the winder 100. Note that the number of perforation detectors can vary. In certain examples, the anticipated or known locations of the perforations are based on the distance the web 4 travels between the perforator 71 and the perforation detector 113. This distance is preprogrammed into the control system 300 when the operator setups up the machine 10.

Referring back to FIG. 22, the overlap station 120 is located between the input station 110 and the winding station 140. The overlap station 120 is for overlapping or interleaving the bags 62 with each other. Consumers of rolled bags are often accustomed to interleaved bags 62, and when a consumer pulls on the outermost bag of an overlapped roll of a bags, the roll turns, the outermost bag is easily removed, and the new wound bag is readily accessible to the consumer. Generally, the overlap station 120 includes an input assembly 121 that receives the web from the upstream perforating section 70 (see FIG. 1). The input assembly 121 has a pair of rollers 122 that define a nip through which the web 4 is conveyed. Elastic ropes 123 encircling the rollers 122 guide the web 4 between the rollers 122 and the web 4 is conveyed to a rotor assembly 125.

Figure 23:
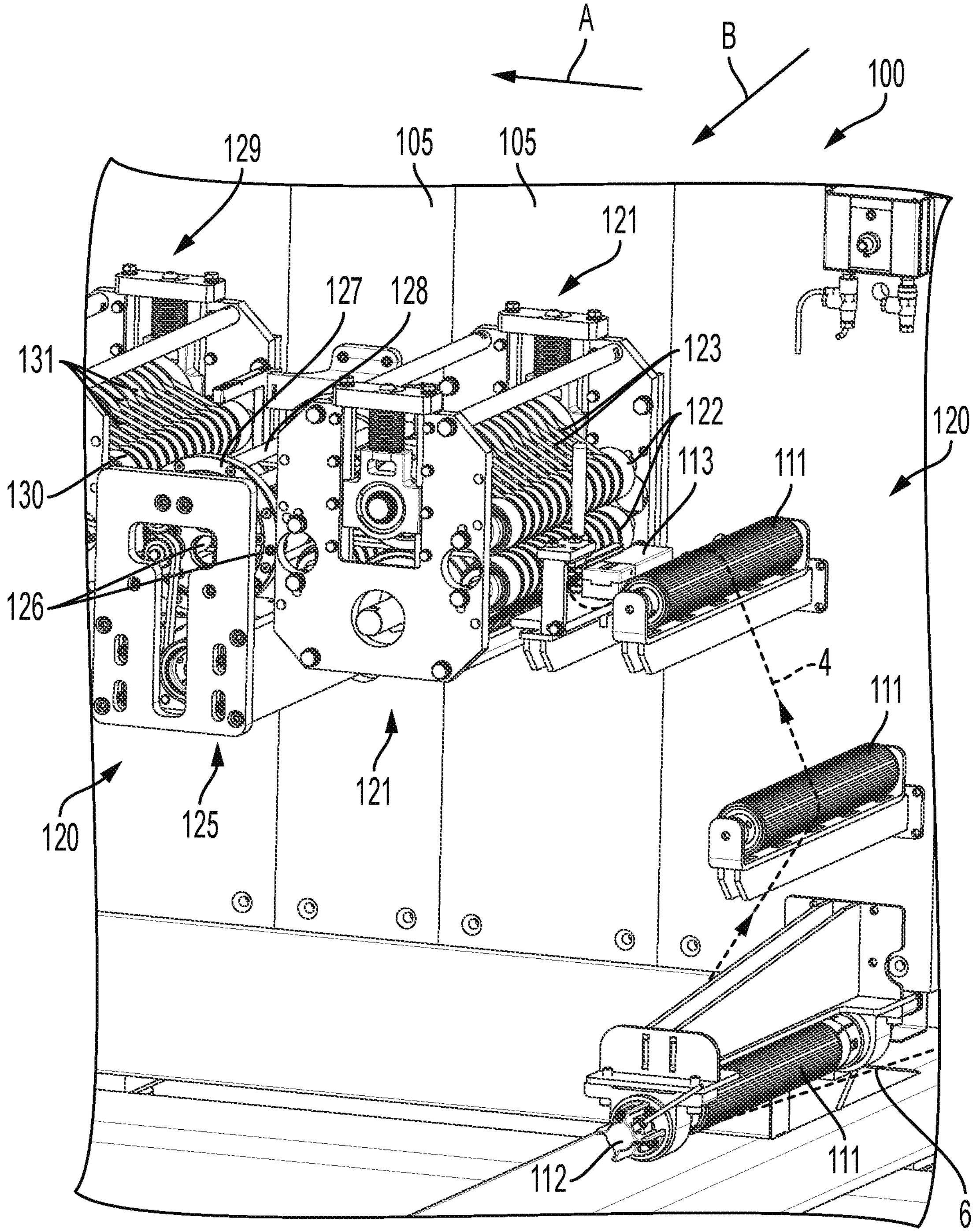
FIG. 23 is a perspective view of an input station of the winder of FIG. 22.

Referring now to FIG. 23, the rotor assembly 125 includes a plurality of rollers 126 arranged in a rotor 127 and a pair of spools 128 that rotate with the rotor 127. The rotor 127 is configured to rotate the spools 128 to selectively separate the bags from each other. For example, to overlap the bags, the leading end of a first bag in the web 4 is conveyed between the rollers 126 and is further received into a downstream output assembly 129. Elastic ropes 131 encircling the rollers 130 help to guide the bag downstream. The rotor 127 is subsequently rotated by an actuator (not depicted, e.g. servo motor) such that the spools 128 also rotates and thereby "breaks" the trailing end of the first bag away from the leading end of second bag in the web 4 at the perforation. The leading end of the second bag is conveyed into the rotor assembly 125 and into a position in which the leading end of the second bag lies on (i.e. overlaps) the trailing end of the first bag. Thus, the second bag overlaps the first bag (e.g., the bags overlap each other by 6.0 inches or another desired measurement). The bags are subsequently conveyed to the output assembly 129 in the above noted overlapped orientation. Reference is made to the above-incorporated U.S. Pat. No. 5,362,013 for example features and components of conventional overlap stations that can be included with the machine 10 of the present disclosure.

Referring now to FIGS. 24-27, after leaving the overlap station 120, the bags are wound into rolls in the winding station 140. Note that the bags received by the winding station 140 are overlapped onto each other and conveyed to the winding station 140 as a plurality of overlapped bags that are conveyed in a stream of overlapped bags. The winding station 140 includes a diverter 141 having two diverter rollers 142 that define a diverter nip therebetween. The diverter 141 is pivotable about a diverter axis 143, and the diverter rollers 142 are mounted to a pair of diverter plates 156. The diverter 141 is coupled to the frame of the upstream rotor assembly 125. The diverter 141 selectively pivots about the axis 143 between a first diverter position (see FIG. 24) in which the diverter 141 directs the stream of overlapped bags along a first winding path 144 and a second diverter position (see FIG. 25) in which the diverter 141 directs the stream of overlapped bags along a second winding path 145. Note that the second winding path 145 may include components and features that are similar to the components and features described hereinbelow with respect to the first winding path 144.

Figure 24:
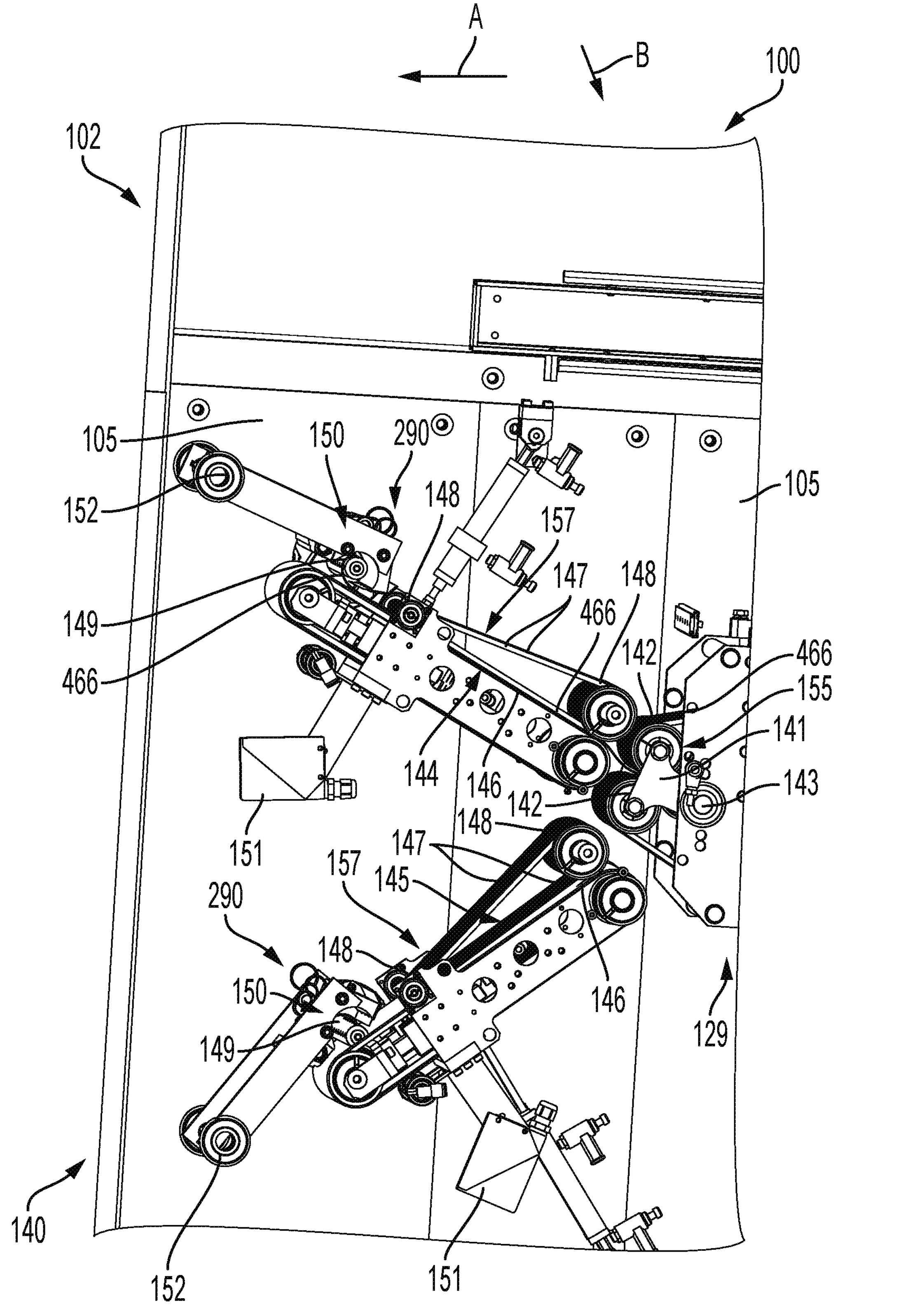
FIGS. 24-27 are perspective views of a winding station of the winder of FIG. 22.
Figure 26:
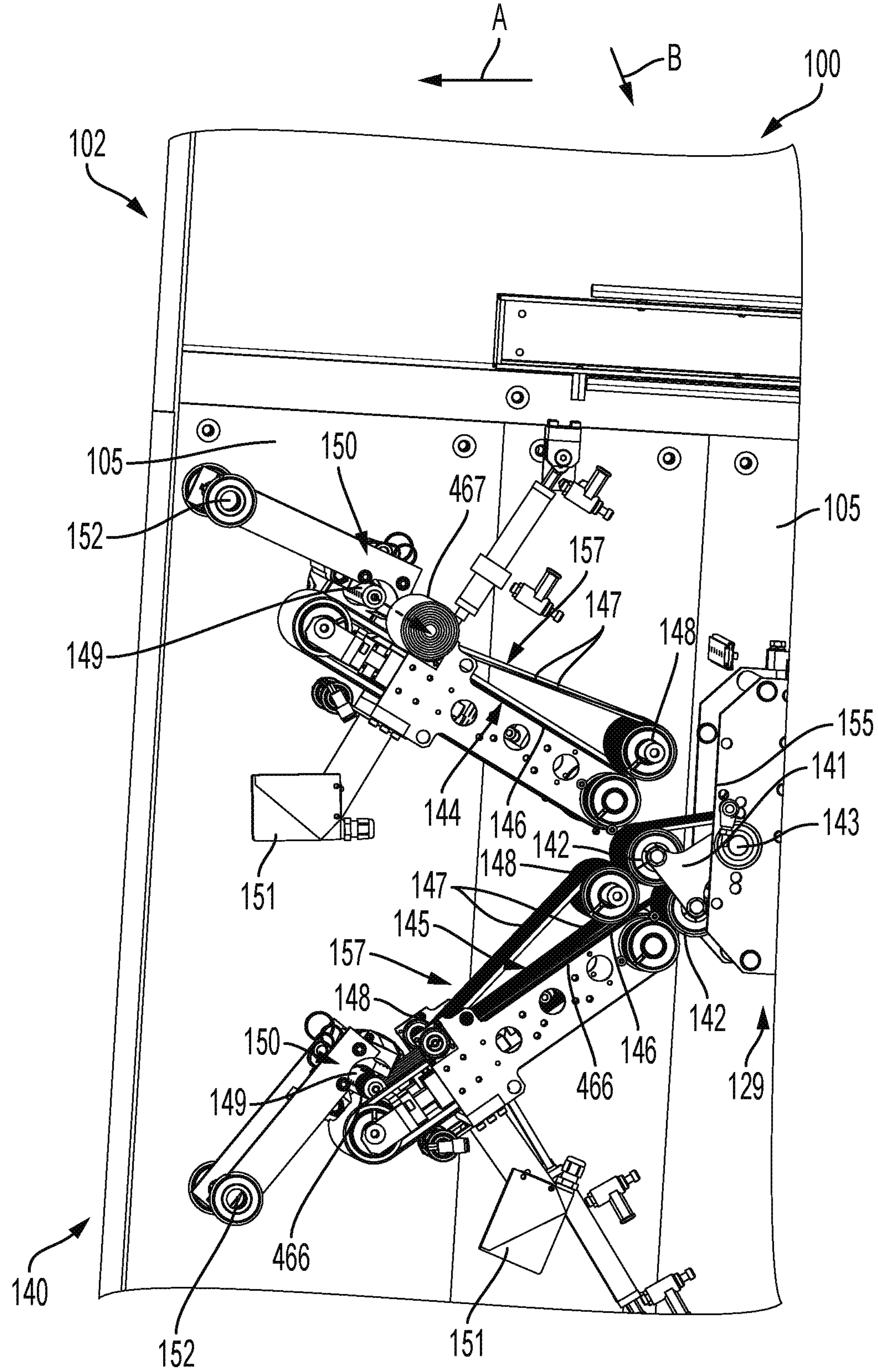
Figure 27:
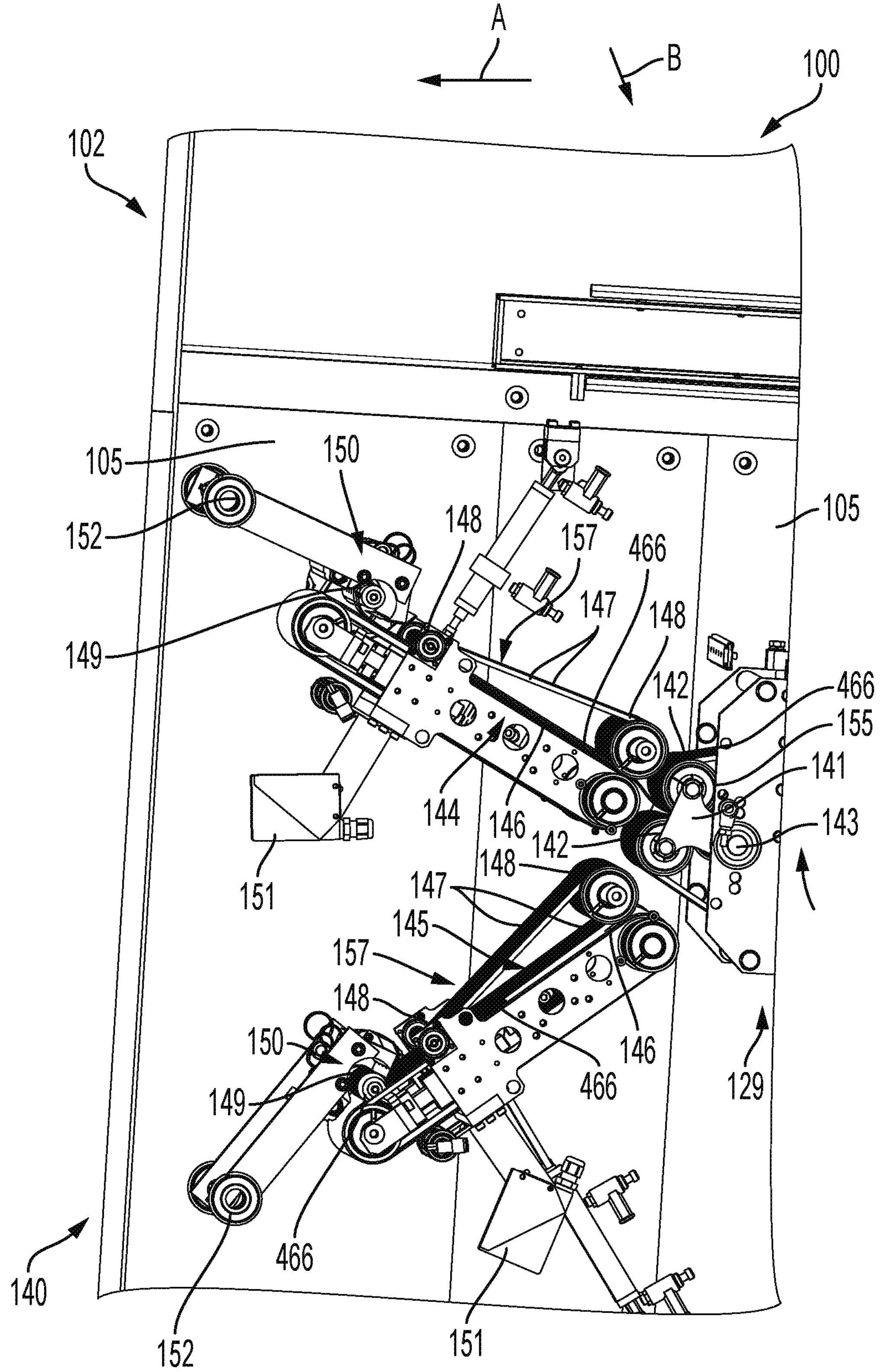

FIG. 24 depicts the diverter 141 in the first diverter position such that the bags diverter 141 directs the stream of overlapped bags along the first winding path 144. The stream of overlapped bags is schematically depicted as part number 466. After a predetermined number of bags or a predetermined length of the stream of overlapped bags passes through the diverter 141 (as determined by the control system 300), the diverter 141 into the second diverter position as depicted in on FIG. 25. Note that the end of the stream of overlapped bags 466 is continued to be conveyed along the first winding path 144 to the spindle while the stream of overlapped bags 466 begins to be conveyed along the second winding path 145. FIG. 26 depicts the roll of bags 471 pushed (by the pusher) in a cross-machine direction (arrow B) off the spindle 149. As such, the roll of bags 467 can be further processed e.g., banded by the bander 280 (FIG. 1) or moved to a packaging section. Note that the stream of overlapped bags 466 continues to conveyed along the second winding path 145. FIG. 27 depicts the diverter 141 pivoted back to the first diverter position after a predetermined number of bags or a predetermined length of the stream of overlapped bags 466 passes through the diverter 141 and along the second winding path 145. Note that the end of the stream of overlapped bags 466 is continued to be conveyed along the second winding path 145 to the spindle while the stream of the overlapped begins to be conveyed along the first winding path 144.

Figure 25:
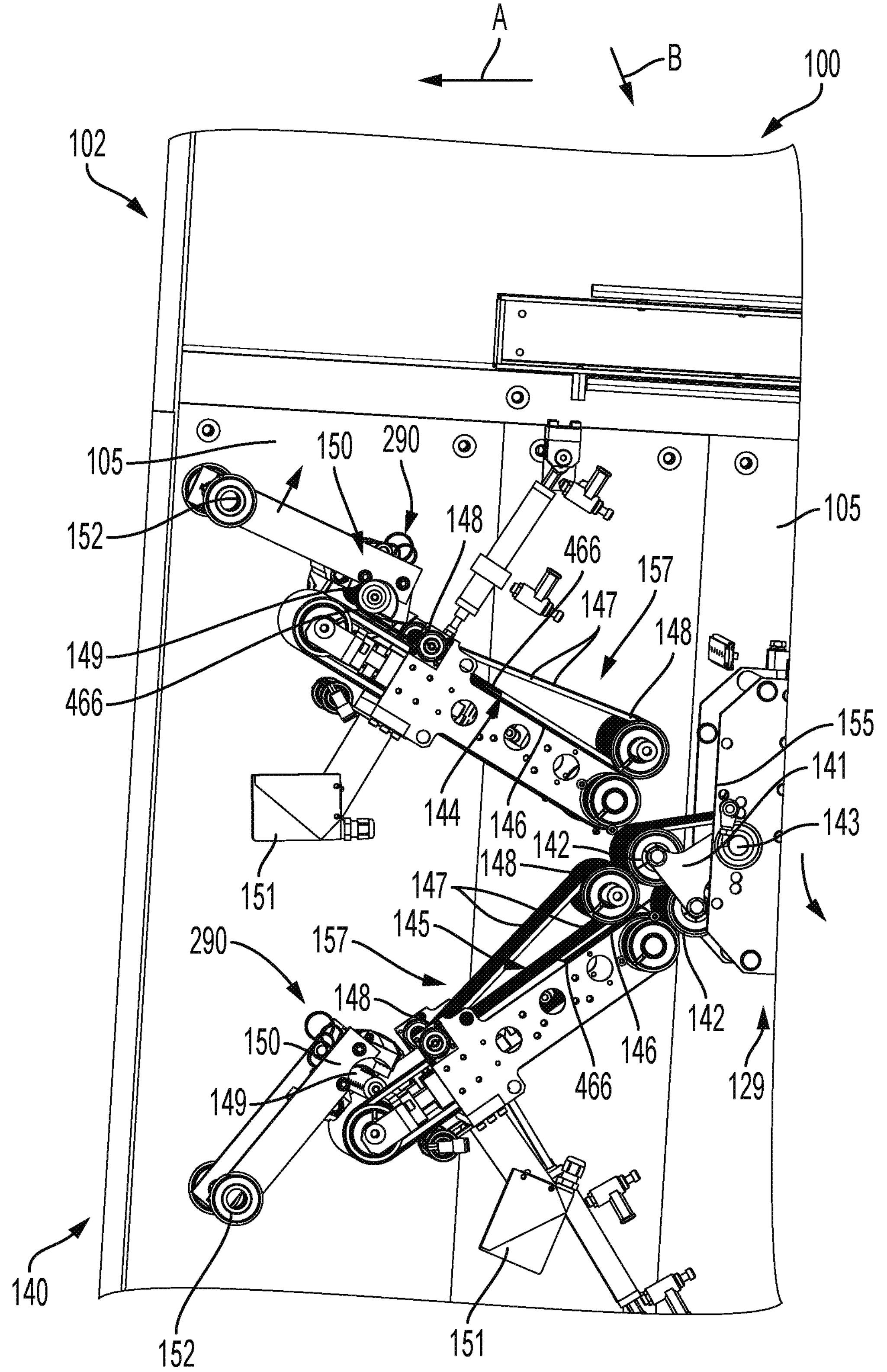

In certain examples, the diverter 141 pivots a degree value in the range of 100.00-30.0 degrees between the first diverter position (FIG. 24) and the second diverter position (FIG. 25). In another example, the diverter 141 pivots to a degree valve in the range of 50.0-80.0 degrees when moving between the first diverter position (FIG. 24) and the second diverter position (FIG. 25). In certain examples, the diverter 141 pivots 70.0 degrees about the diverter axis 143 between the first diverter position (FIG. 24) and the second diverter position (FIG. 25). An actuator (not depicted) pivots the diverter 141 about the diverter axis 143, and the actuator is controlled by the control system 300. The actuator can be any suitable devices such as a pneumatic piston, hydraulic piston, stepper motor, servo motors, linear actuator, and/or the like.

A conveyor 146 (e.g., belt conveyor with servo driver rollers) extends along the first winding path 144, and the conveyor 146 is configured to convey the bags to a spindle 149. A guide assembly 157 having elastic ropes 147 encircling two rollers 148 is adjacent to the conveyor 146 and is configured to guide the bags long and/or hold the bags on the conveyor 146. The guide assembly 157 is also configured to guide the bags along the first winding path 144. The elastic ropes 147 extend along between the two rollers 148 and along the conveyor 146. A first roller 148 and the first end of the conveyor 146 define a nip through which the bags are received. As the bags approach the spindle 149, an air horn 150 causes the bags to wind around the spindle 149. In operation, the air horn 150 causes the leading end of the overlapped bags to form a nip between itself and spindle 149. After the leading end of the bags is secured to spindle 149, a predetermined length of the bag is wound about the spindle 149 before the air horn 150 is moved away from the spindle 149. Note that in certain examples, the air horn 150 is pivoted by an actuator (not depicted) about a horn axis 152. Reference is made to the above-incorporated U.S. Pat. Nos. 5,362,013 and 7,578,779 for example features and components of conventional air horns that can be included with the machine 10 of the present disclosure.

Figure 28:
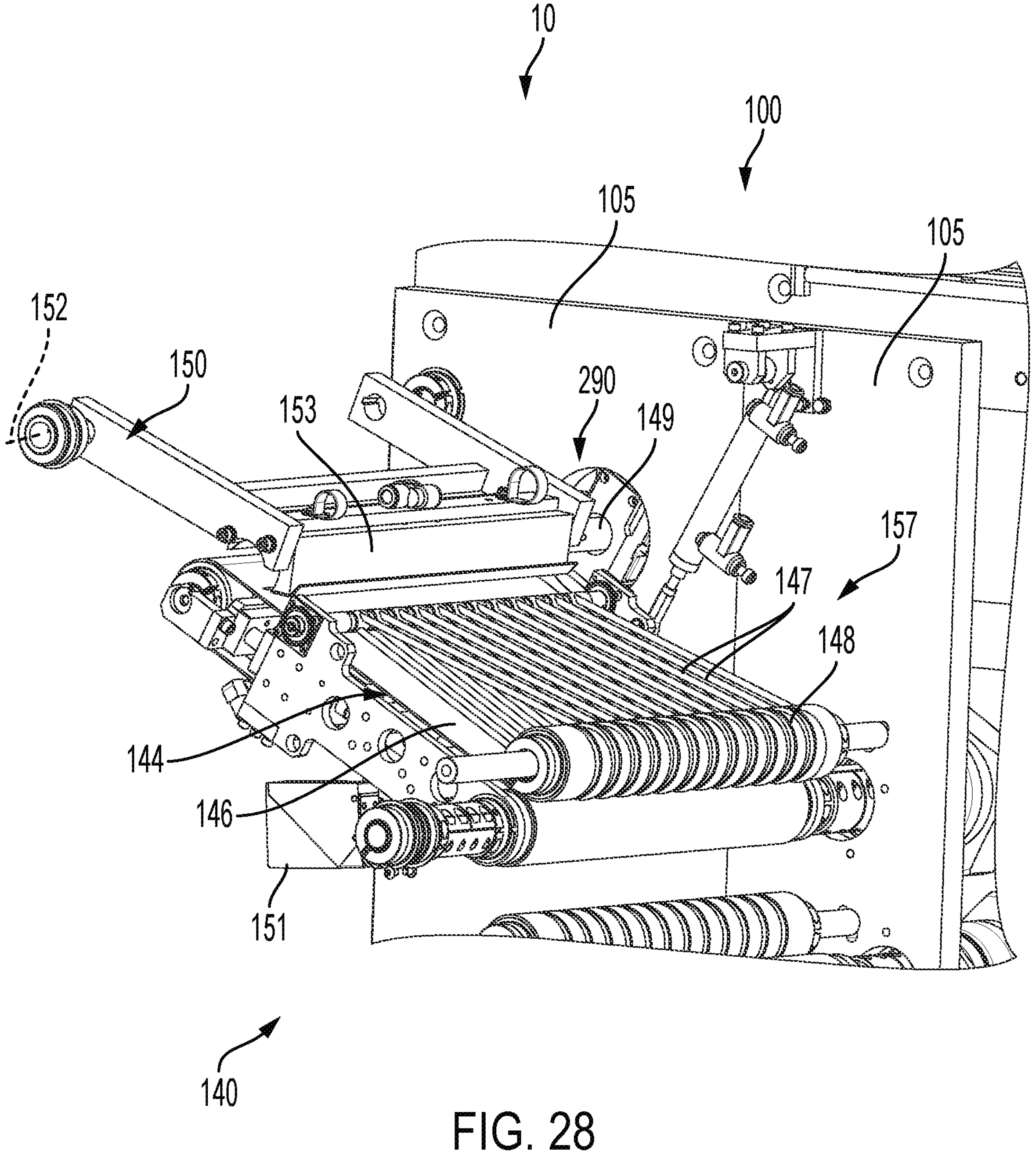
FIG. 28 is partial perspective view of the winding station of the winder of FIG. 22.
Figure 29:
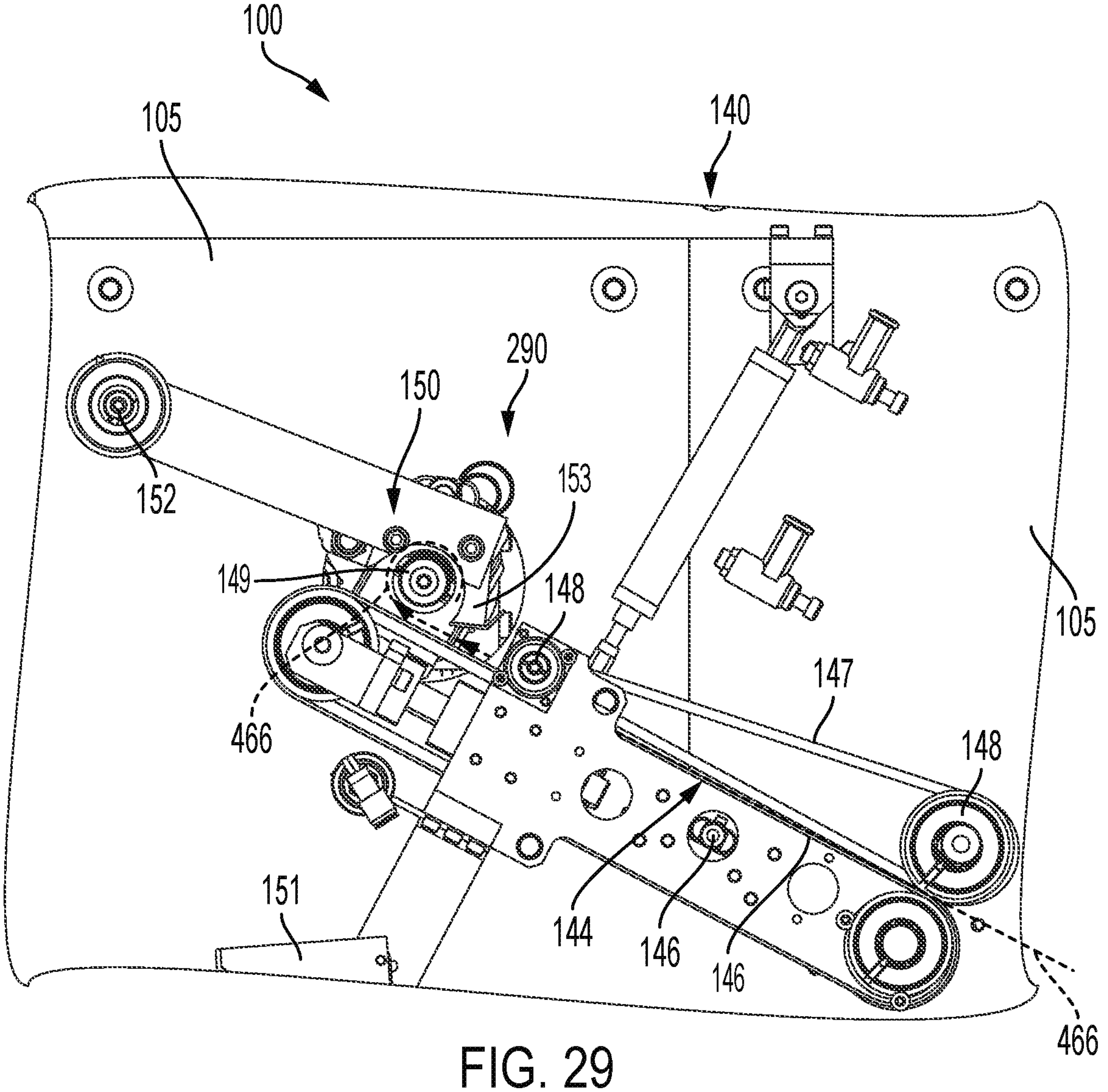
FIG. 29 is partial schematic view of an example winding station of the winder of FIG. 22.

Referring to FIGS. 28-29, an air system 290 is used in conjunction with the air horn 150 to improve the initial winding of the bags onto the spindle 149. In this example, the air system 290 produces a vacuum (e.g., the air system 290 includes a vacuum generator) that draws air into the hollow interior of the spindle 149 via a plurality of holes (not depicted) (e.g., the spindle 149 is porous) arranged on the outer perimetral surface of the spindle 149. The vacuum forces cause the leading end of the bags that form the innermost layer of bags in the roll formed on the spindle 149 to be pulled toward the outer perimetral surface of the spindle 149. A switching valve (not shown) causes the vacuum to generate when the bags are initially wound to the spindle 149, and the switching valve stops the vacuum when a desired length of the bags is wound around the spindle 149 or time duration expires. In operation, the air horn 150 directs the leading end of the bags around the spindle 149 and the air system 290 is activated such that movement of the leading end of the bag is controlled and proper initial winding of the bags around the spindle 149 occurs. Thus, each roll of bags has a “clean start”. The proper initial winding of the bags facilitated by the air horn 150 and the air system 290 has several advantages such as creating a more uniform build of the roll of bags, facilitating push-off of the roll of bags from the spindle 149, and/or increased consistency and quality of the roll of bags. Also note that in certain examples, when the roll of bags is pushed off the spindle 149 (described below), the air system 290 is configured to direct compressed air into the hollow interior of the spindle 149 such that the compressed air exits via the plurality of holes in the outer perimetral surface of the spindle 149 thereby forcing the wound roll of bag radially away from the spindle 149 and counteracting compressive forces and frictional forces acting between the wound roll of bags and the spindle 149. As such, the roll of bags wound around the spindle is more easily pushed off the spindle 149 without damaging the roll of bags wound on the spindle 149.

Note that the rollers 148 about which the ropes 147 encircle and the rollers 148 that drive the conveyor 146, as depicted on FIG. 28, are geared together to reduce the number of actuators necessary to drive the rollers 148 and eliminate inconsistencies between the speeds of the rollers. The ropes 147 can be recessed into grooves of the rollers 148 such that the outer surfaces of the ropes 147 are flush with the outer perimetral surface of the roller 148. As such, the leading end of the bags is better controlled by the conveyors 146. Note that these features of bands and the rollers may also be applied to the ropes 123 and the rollers 122 in the overlapping station 120 noted above. Note that in certain examples, finger members (not depicted) are suspended in the space between roller 148 or 122 and these finger members help to guide the leading ends of the bags. The finger members prevent jamming of the bags. The finger members can be made of any suitable material such as plastic, rubber, or metal.

In certain examples, the air horn 150 is near the spindle 149, and the spindle 149 is rotating at web speed. The spindle 149 continues to rotate after the air horn 150 is moved away from the spindle 149, however, the rotational speed of the spindle 149 decreases as the diameter of the roll of bags wound about the spindle 149 increases. The rate at which the rotational speed of the spindle 149 (e.g., metered winding profile speed) changes as speed decreases can be preprogrammed into the memory of the control system 300 (FIG. 32) or determined by the control system 300 by on signals from a sensor that senses the proximity or diameter of the roll of bags.

The winding of the bags about the spindle 149 continues until the control system 300 (FIG. 32) determines that a predetermined length of the overlapped bags has been conveyed through the diverter 141 (e.g., a full roll of bags includes 50 bags wound about the spindle 149). The predetermined length can be based on a known or predetermined length of web 4 between the perforation detector 113 (FIG. 17) and the nip of the diverter 141. The diverter 141 then pivots about the axis 143 into the second position (FIG. 19) such that the web 4 is directed along the second winding path 145. The bags are then wound about the spindle 149 at the end of the second winding path 145 as is described with respect to the spindle 149 at the end of the first winding path 144. Note that the first winding path 144 and the second winding path 145 extend transverse to each other.

FIG. 29 depicts a flap 153 that extends toward and/or partially around the spindle 149. The flap 153 is configured to bias the bags wound about the spindle 149 axially toward the simple thereby preventing the bags 466 from floating radially away from the spindle 149 after the air horn 150 causes the bags 466 to move around the spindle 149 to begin the winding process. The flap 153 may be used in place of or in combination with the air system 290 noted above. In one instance the flap 153 is formed from Teflon. Absent the flap 153, the bags 466 may float to the downstream side of the spindle 149 such that the air horn 150 cannot properly begin winding the bags 466 around the spindle 149.

Referring back to FIGS. 24-27, the roll of bags wound around the spindle 149 at the end of the first winding path 144 is removed from the spindle 149 by a pusher (not depicted). The pusher can be any suitable conventional known pusher, and the pusher pushes the roll of bags in cross-machine direction (arrow B) off the spindle. Note that while the pusher is pushing the roll of bags off the spindle 149 at the end of the first winding path 144, the bags continue to wind about the spindle 149 at the end of the second winding path 145. Thus, the bags are continuously wound into rolls of bags without stopping the machine 10 to remove a fully wound roll of bags.

The winding station 140 includes diverter sensors 151 for detecting if the bags are properly diverted between the first winding path 144 and the second winding path 145. That is, the sensors 151 determined if there is a "missed transfer" of the bags between the two winding paths 144, 145. The sensors 151 sense if the bags are improperly diverted outside one of the two winding paths 144, 145 and accordingly, send corresponding signals to the control system 300 such that the operator is alerted and/or the machine 10 is shut down. Note that in certain examples, the machine 10 will continue to operate even after the sensor 151 senses a missed transfer. In these examples, each time the missed transfer is sensed, the control system 300 would pivot the diverter 141 to the opposite path 144, 145 so that the machine 10 can continue to produce rolls of bags. In certain instances, the control system 300 may reduce the speed of the web and components of the machine 10 to account for the determined winding errors.

The present inventors recognized that the example winders 100 of the present disclosure can advantageously reduce or minimize the length of the web path and/or required tension in the web in the winder 100 and/or support winding of different types of bag and/or rolls of bags including embossed bags, bags overlapped on one another, and bags connected to each other via perforations.

Figure 30:
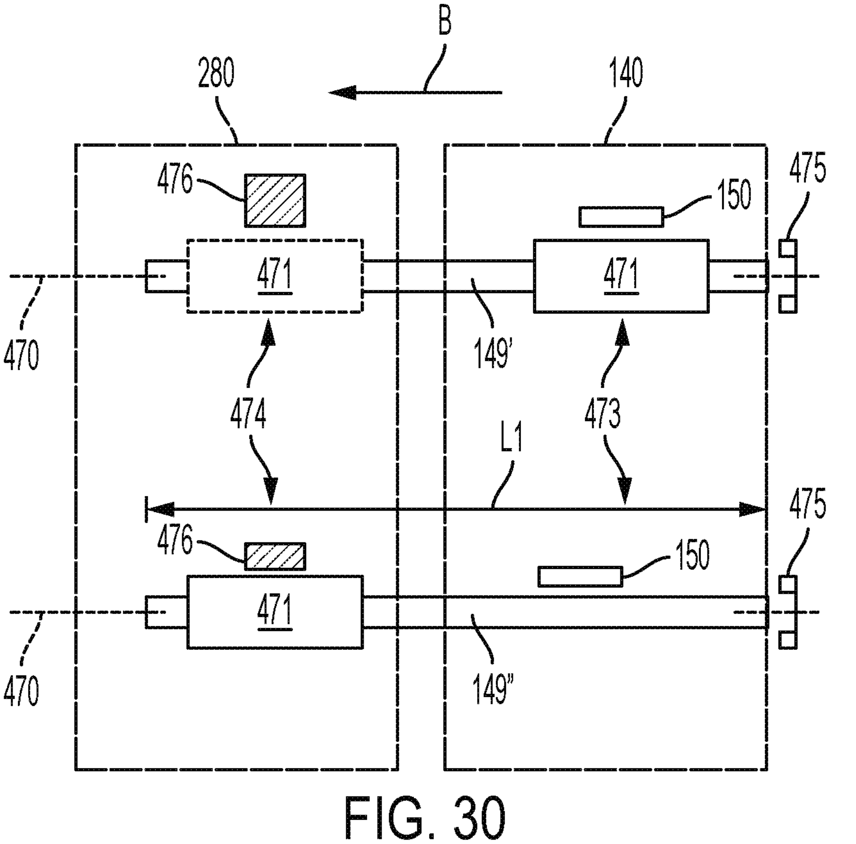
FIG. 30 is a schematic view of an example winder and an example bander according to the present disclosure.
Figure 31:
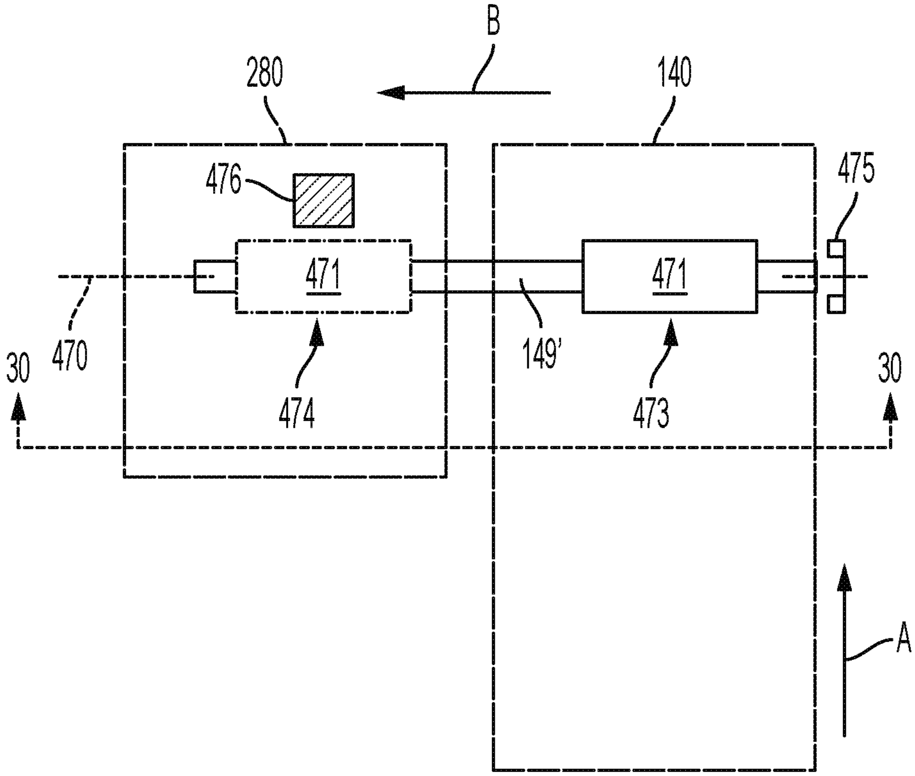
FIG. 31 is a schematic top-down plan view of the winder and bander of FIG. 30.

Referring to FIGS. 30-31, in certain examples, a bander 280 is located adjacent to the winding station 140 (see also FIG. 1) and the bander 280 configured to apply a band of material to the roll of bags to thereby prevent the roll of bags from unwinding. The bander 280 applies the band on martial to the roll of bags before the pusher (not depicted) pushes the completed roll of bags off the spindles 149', 149" (see also FIG. 24). FIG. 30 is an schematic view of the bander 280 and the winder 100 looking in the machine direction (arrow A; see generally line 30-30 on FIG. 31 that schematically depicts the viewpoint for FIG. 30). FIG. 31 is a top-down plan view of the bander 280 and the winder 100. In one example, the spindles 149', 149" of the winder 100 is elongated along an axis 470 that extends in the cross-machine direction (see arrow B) perpendicular to the machine direction (arrow A). Each spindle 149', 149" has a length L1, and the spindles 149', 149" are vertically spaced apart from each other (see also FIG. 24) such that the winder 100 winds separate rolls of bags upon each spindle 149 (as described above). In operation, the winder 100 winds a roll of bags 471 around the first spindle 149' and the rolls of bags 471 is in a first spindle position 473, as depicted in FIG. 30. An exemplary pusher 475 is configured to axially move along the first spindle 149' to thereby push the roll of bags 471 to a second spindle position 474 (FIGS. 30-31 depict the roll of bags 471 in dashed lines when moved into the second spindle position 474 on the first spindle 149'). The second spindle position 474 is axially offset from the first spindle position 473. A bander 280 is positioned adjacent to the first spindle 149 and the second spindle 149" and offset from the first spindle position 473 and the air horn 150 (FIG. 24) and adjacent to second spindle positions 474. When the roll of bags 471 is moved into the second spindle position 474, a banding device 476 applies the banding material (e.g., tape, plastic ribbon) to the roll of bags 471. The bander 280 can include one banding device for applying the banding material to the rolls of bags 471 on each spindle 149', 149" or a separate banding device 476 adjacent to each of the spindles 149', 149". In one example, the banding device 476 wraps a banding tape around the wound roll of bags 471. The bander 280 includes a banding supply roll (not depicted) that supplies banding materials to the banding device(s) 476. When applied properly, the banding material encircles the roll of bags 271 after the roll of bags 471 is pushed along the spindle 149 and into the second spindle position 474. The bander 280 is offset in a cross-machine direction (arrow B) relative to the winding station 140 and banding of the roll of bags happens in the second spindle position 474 which is offset from the first spindle position 473 in the cross-machine direction (arrow B).

Note that it is advantageous to move the roll of bags 471 out of the first spindle position 473 for banding by the bander 280 such that the winder 100 can begin winding another roll of bags 471 in the first spindle position 473 while the wound roll of bags 471 in the second spindle position 474 is banded. As such, the efficiency and/or speed of the machine 10 increases as the multiple rolls of bags 471 can be wound and then banded on the same spindle 149 and at the same time. Note that in certain examples, the rotational speed of the spindle 149 remains consistent as a first roll of bags 471 is being wound about the spindle 149 in the first spindle position 473 and a second roll of bags 471 is being banded in the second spindle position 474. Maintaining a consistent rotational speed of the spindle 149 advantageously reduces the likelihood of improperly winding the bags on the spindle 149. In certain examples, after the bander 280 bands the roll of bags 471 in the second spindle position 474 a wound roll of bags 471 in the first spindle position 473 is axially pushed by the pusher 475 toward the second spindle position 474 such that the wound roll of bags 471 pushes the banded roll of bags 471 axially out of the second spindle position 474. The banded roll of bags may then fall onto another conveyor a bin for further processing and/or packaging. In certain examples, the bander 280 includes a push off member that pushes the banded roll of bag down on chute or onto a conveyor. Reference is made to PCT Application Publication No. WO2017/161380 and U.S. Patent Application Publication No. 2009/0019817, which is incorporated by reference in its entirety, for example features and components of conventional banders that can be included with the machine 10 of the present disclosure. The present inventors recognized that the example banders 280 of the present disclosure can advantageously increase the ability of the machine 10 to control the roll of bags through banding and/or permit the banding material to be applied to the roll of the bags at the same speed as the winding the bags into the a roll of bags about the spindle.

FIG. 32 depicts an example control system 300 of the present disclosure, which is configured to control various components and features of the machine 10 including the example control processes noted above and below. Certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

In certain examples, the control system 300 communicates with each of the one or more components of the machine 10 via a communication link 303, which can be any wired or wireless link. The control system 300 is capable of receiving information and/or controlling one or more operational characteristics of the machine 10 and its various sub-systems by sending and receiving control signals via the communication links 303. In one example, the communication link 303 is a controller area network (CAN) bus; however, other types of links could be used. It will be recognized that the extent of connections and the communication links 303 may in fact be one or more shared connections, or links, among some or all of the components in the machine 10. Moreover, the communication link 303 lines are meant only to demonstrate that the various control elements are capable of communicating with one another, and do not represent actual wiring connections between the various elements, nor do they represent the only paths of communication between the elements. Additionally, the machine 10 may incorporate various types of communication devices and systems, and thus the illustrated communication links 303 may in fact represent various different types of wireless and/or wired data communication systems.

The control system 300 may be a computing system that includes a processing system 301, memory system 302, and input/output (I/O) system 304 for communicating with other devices, such as input devices 305 and output devices 306, either of which may also or alternatively be stored in a cloud 309. The output device 306 can include audio or visual alarms and/or a user input/output device such as a touchscreen. The processing system 301 loads and executes an executable program 307 from the memory system 302, accesses data 308 stored within the memory system 302, and directs the machine 10 to operate as described above and in further detail below.

The processing system 301 may be implemented as a single microprocessor or other circuitry, or be distributed across multiple processing devices or sub-systems that cooperate to execute the executable program 307 from the memory system 302. Non-limiting examples of the processing system include general purpose central processing units, application specific processors, and logic devices The memory system 302 may comprise any storage media readable by the processing system 301 and capable of storing the executable program 307 and/or data 308. The memory system 302 may be implemented as a single storage device, or be distributed across multiple storage devices or sub-systems that cooperate to store computer readable instructions, data structures, program modules, or other data. The memory system 302 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

Note that the example process flow methods described below can combined with other methods and certain methods steps for each method described below can be inserted into any other method. For instance, methods steps described in one process flow method may be freely added to other process flow methods.

Figure 33:
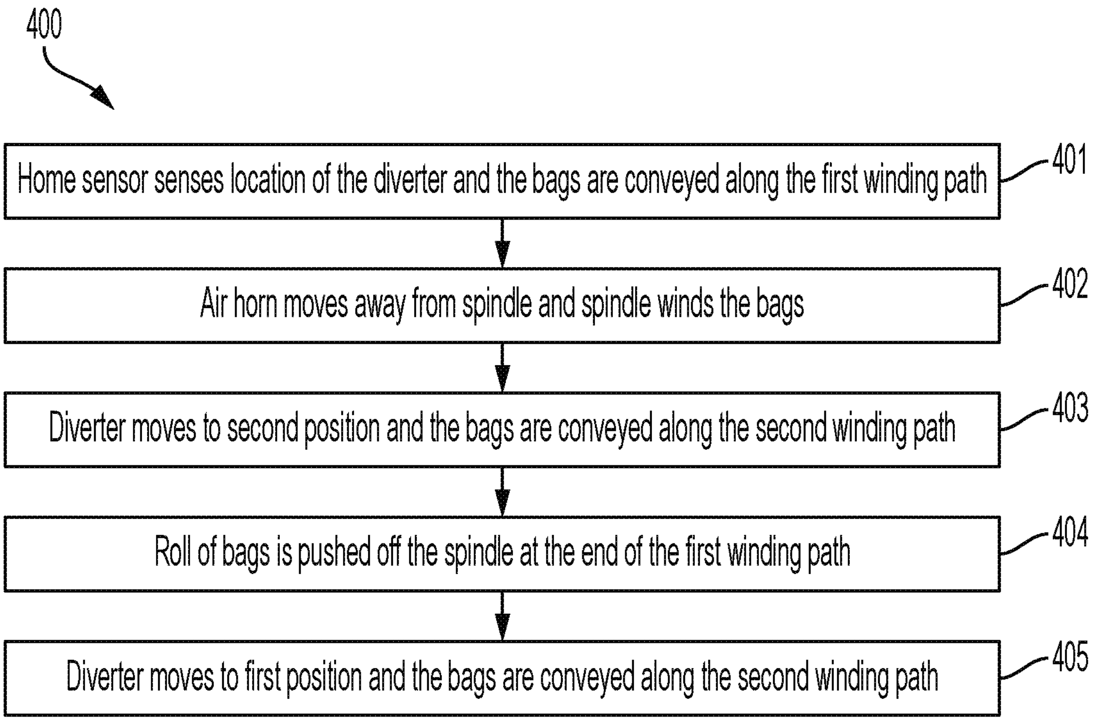
FIGS. 33-38 are example a process flow methods according to the present disclosure.

The example process flow method 400 depicted in FIG. 33 is for diverting the interleaved or overlapped bags between the first winding path 144 and the second winding path 145 (see FIGS. 24-27). The process flow method 400 begins (at step 401) with a home sensor 155 (FIG. 24) determining the position of the diverter 141. The home sensor 155 may be a proximity sensor configured to sense the diverter 141 when the diverter 141 is in the first position as shown in FIG. 18. If the home sensor 155 senses the diverter 141 in the first diverter position (FIG. 24), the home sensor 155 sends a signal to the control system 300 and the control system 300 operates the machine 10 to produce overlapped bags as noted above. However, if the home sensor 155 does not sense the diverter 141, the control system 300 may alert the operator to check the diverter 141. At step 402, the conveyor 146 along the first winding path 144 operates and the overlapped bags are conveyed from the diverter 141 along the conveyor 146 to the spindle 149 at the end of the first winding path 144. The air horn 150 cooperates with the spindle 149 as described above such that the bags begin to wind around the spindle 149 at the end of the first winding path 144. After a predetermined length of the bags is wound around the spindle 149 (as determined by the control system 300 based on encoders, calculated length of web passing a point in the machine, and/or other similar determinations), the air horn 150 is moved away from the spindle 149 and the spindle 149 rotates at a metered speed as the diameter of the roll of bags wound about the spindle 149 increases, as shown at step 402. The bags are wound around the spindle 149 at the end of the first winding path 144 until a predetermined length of bags passes through the diverter 141. At step 403, once the predetermined length of bags passes through the diverter 141, the diverter 141 moves from the first diverter position (FIG. 24) to the second diverter position (FIG. 25) such that the overlapped bags now are conveyed along the second winding path 145 to another spindle 149. The air horn 150 at the end of the second winding path 145 cooperates with the spindle 149 at the end of the second winding path 145 such that the bags are wound around the spindle 149. At step 404, the roll of bag around the spindle 149 at the end of the first winding path 144 is pushed off by a pusher (not depicted). The bags are wound around the spindle 149 at the end of the second winding path 145 until a predetermined length of bags passes through the diverter 141. At step 405, once the predetermined length of bags passes through the diverter 141, the diverter 141 moves from the second diverter position (FIG. 25) back to the first position (FIG. 24).

Figure 34:
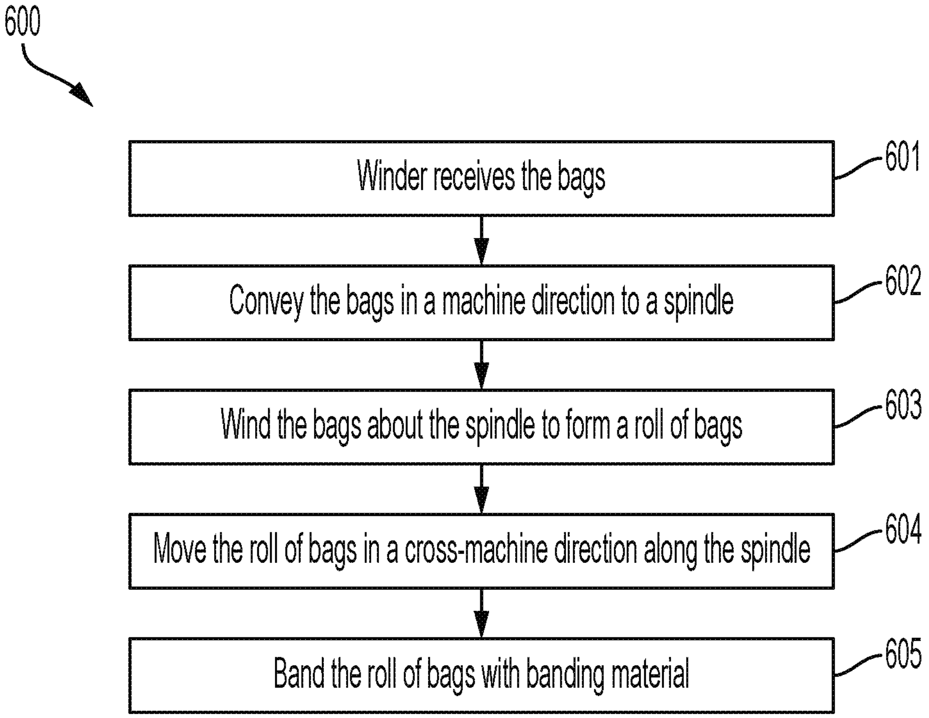

FIG. 34 depicts another example process flow method 600 according to the present disclosure (for reference see also FIG. 24). The method 600 for processing bags formed from a web 4 begins at step 601 in which the winder 100 receives bags 466. At step 602, the conveyor 146 conveys the bags 466 in a generally machine direction to a spindle 149. The bags 466 are wound about the spindle 149 to thereby form a roll of bags 467 at step 603. At step 604, a pusher 475 (FIG. 30) moves the roll of bags 467 in a cross-machine direction (arrow B) along the spindle 149. At step 605, the bander 280 bands the roll of bags 467 with a banding material.

Figure 35:
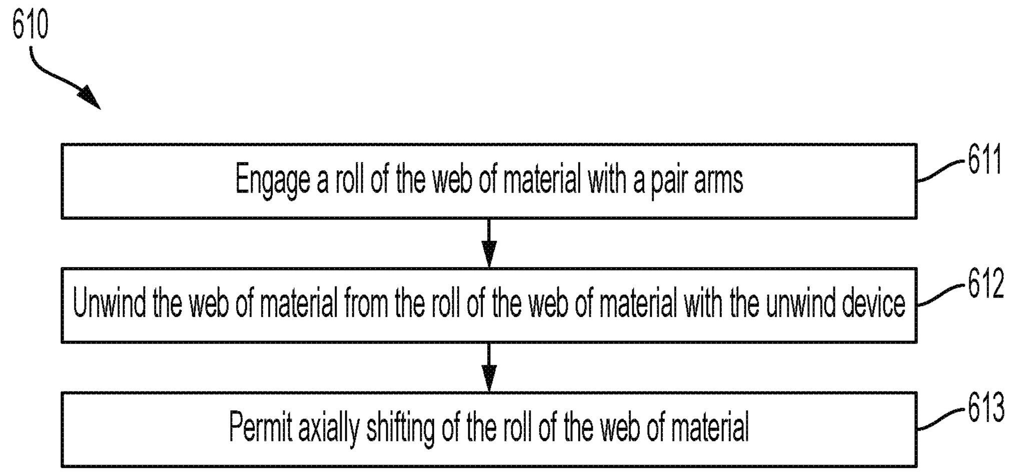

FIG. 35 depicts another example process flow method 610 according to the present disclosure (for reference see also FIGS. 4-6). The method 610 for processing a web of material begins at step 611 in which an input section 20 receives a roll 2 of the web 4 and arms 411, 412 engage the roll 2. At step 612, the web 4 of material is unwound from the roll 2 of the web of material with the unwind device 416 that engages an outer perimetral surface of the roll 2 and rotates the roll of the web of material about an unwind axis 413. At step 613, permit axially shifting of the roll 2 permit position adjustment of the web 2 to thereby reduce undesirable weave or tension inconsistencies in the web 2.

Figure 36:
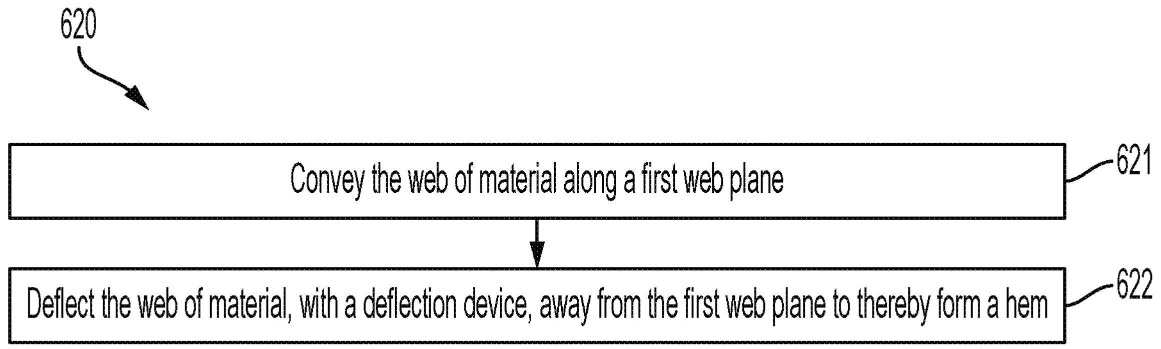

FIG. 36 depicts another example process flow method 620 according to the present disclosure (for reference see also FIGS. 9-14). The method 620 for processing a web of material begins at step 621 by conveying the web 4 of material along a first web plane 433. At step 622, the deflection device 42 deflects the web 4 away from the first web plane 433 to thereby increase speed of the web 4 of material and tension in the web 4 of material such that the web of material folds and thereby forms a hem.

Figure 37:
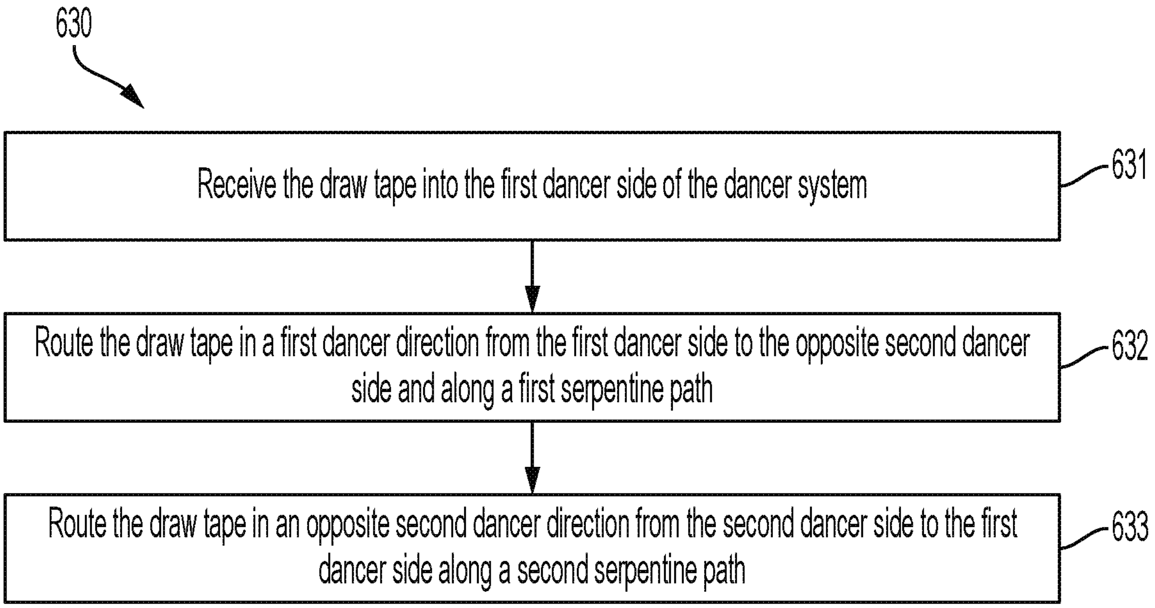

FIG. 37 depicts another example process flow method 630 according to the present disclosure (for reference see also FIGS. 1 and 16). The method 630 for unwinding a roll of draw tape begins at step 631 with receiving the draw tape 41 into a first dancer side 501 of a dancer system 482. The draw tape 41 is routed in a first dancer direction F1 from the first dancer side 501 to the opposite second dancer side 502 and along the first serpentine path 503, at step 622. At step 623, the draw tape 41 is further routed in a second dancer direction F2 from the second dancer side 502 to the first dance side 501 along a second serpentine path 504.

Figure 38:
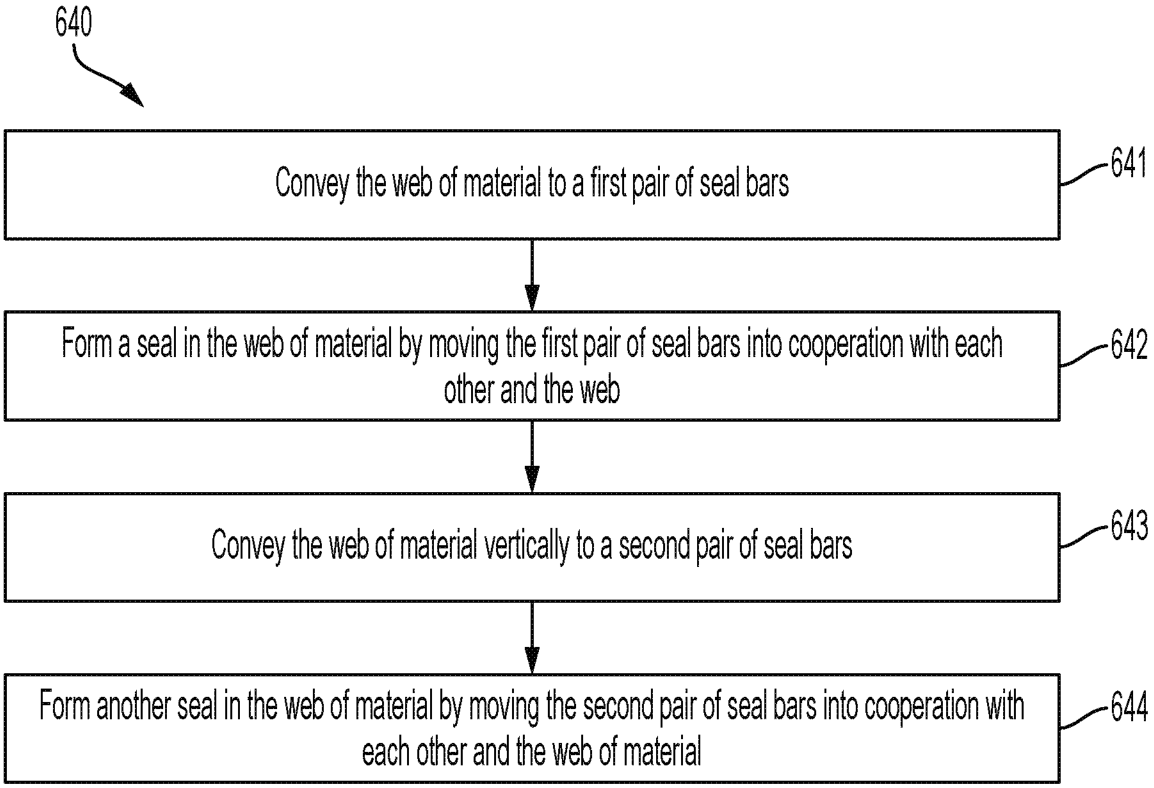

FIG. 38 depicts another example process flow method 640 according to the present disclosure (for reference see also FIGS. 20-21). The method 640 includes at step 641 with conveying the web 4 to the first pair of seal bars G1. At step 642 seals are formed in a web 4 to thereby at least partially form bags by moving the first pair of seal bars G1 into cooperation with each other and the web of material. At step 643 the web 4 is conveyed vertically to the second pair of seal bars G2, and at step 644 the second pair of seal bars G2 from another seal in the web 4 of material by moving the second pair of seal bars G2 into cooperation with each other and the web of material.

In certain examples, a winder for winding bags into rolls includes an input station configured to receive the bags. A first conveyor is configured to convey the bags along a first winding path to a first spindle such that the bags conveyed along the first winding path are wound around the first spindle into a first roll of bags. A second conveyor is configured to convey the bags along a second winding path to a second spindle such that the bags conveyed along the second winding path are wound around the second spindle into a roll of bags. A diverter is configured to selectively divert the bags along the first winding path or the second winding path. Any aspects, and any combination thereof, of these examples may further include one or more of the following optional features. Optionally, the bags received into the input station are formed from a web of material, and the input station comprises a tension sensor configured to sense tension of the web and a plurality of rollers is configured to adjust tension in the web based on the tension sensed by the tension sensor. Optionally, an overlap station is configured to overlap the bags such that a plurality of overlapped bags are conveyed along the first winding path and the second winding path. Optionally, the diverter has a pair of diverter rollers that define a diverter nip through which the bags are conveyed to the first winding path or the second winding path. Optionally, an actuator pivots the diverter into and between a first diverter position in which the diverter directs the bags along the first winding path and a second diverter position in which the diverter directs the bags along the second winding path. Optionally, the diverter pivots to a value in a range of 60.0-80.0 degrees between the first diverter position and the second diverter position. Optionally, a first guide assembly is configured to guide the bags along the first winding path and a second guide assembly is configured to guide the bags along the second winding path. Optionally, a first guide assembly is configured to guide the bags along the first winding path, and the first guide assembly has a pair of rollers and a plurality of ropes that encircle the rollers such that the ropes are recessed in the pair of rollers. Optionally, an air system is configured to pull a leading end of a leading bag in the bags conveyed along the first winding path onto the first spindle. Optionally, the first spindle has a plurality of holes such that the air system creates a vacuum that pulls air through the plurality of holes and pulls the leading bag onto the first spindle. Optionally, an air system is configured to push the roll of bags radially away from the first spindle. Optionally, the first spindle has a plurality of holes such that the air system creates a vacuum that pulls air through the plurality of holes and pulls a leading bag onto the first spindle. Optionally, a flap is configured to bias the bags wound around the first spindle radially toward the first spindle.

In certain examples, a machine for processing a web of material into bags includes an input section configured to receive a roll of the web of material. A sealing section is configured to form seals in the web of material to thereby at least partially form the bags from the web of material. A winder is configured to wind the bags into rolls of bags. The winder comprises an input station configured to receive the bags from the sealing section, a first conveyor configured to convey the bags along a first winding path to a first spindle such that the bags conveyed along the first winding path are wound around the first spindle into a first roll of bags, a second conveyor configured to convey the bags along a second winding path to a second spindle such that the bags conveyed along the second winding path are wound around the second spindle into a roll of bags, and a diverter configured to selectively divert the bags along the first winding path or the second winding path. Any aspects, and any combination thereof, of these examples may further include one or more of the following optional features.

Optionally, the bags received into the input section are formed from a web of material, and the input station comprises a load sensor configured to sense tension of the web and a plurality of rollers configured to adjust tension in the web based on the tension sensed by the load sensor. Optionally, the winder further comprises an overlap station configured to overlap the bags such that a plurality of overlapped bags are conveyed along the first winding path and the second winding path. Optionally, the winder has a pair of diverter rollers that define a diverter nip through which the bags are conveyed to the first winding path or the second winding path. Optionally, the winder further comprises an actuator that pivots the diverter into and between a first diverter position in which the diverter directs the bags along the first winding path and a second diverter position in which the diverter directs the bags along the second winding path. Optionally, the diverter pivots a value in a range of 60.0-80.0 degrees the first diverter position and the second diverter position. Optionally, the winder further comprises a first guide assembly configured to guide the bags along the first winding path and a second guide assembly configured to guide the bags along the second winding path. Optionally, the winder further comprises a first guide assembly configured to guide the bags along the first winding path, the first guide assembly having a pair of rollers and a plurality of ropes that encircle the rollers such that the ropes are recessed in the pair of rollers. Optionally, the winder further comprises an air system configured to pull a leading end of a leading bag in the bags conveyed along the first winding path onto the first spindle. Optionally, the first spindle has a plurality of holes such that the air system creates a vacuum that pulls air through the plurality of holes and couples the leading bag onto the first spindle. Optionally, the winder further comprises an air system configured to push the roll of bags radially away from the first spindle. Optionally, the first spindle has a plurality of holes such that the air system creates a vacuum that pulls air through the plurality of holes and pulls a leading bag onto the first spindle. Optionally, a flap is configured to bias the bags wound around the first spindle radially toward the first spindle. Optionally, a control system controls the diverter to pivot the diverter from the first diverter position to the second diverter position or from the second diverter position to the first diverter position after a predetermined length of bags passes through the diverter.

In certain examples, a winder for winding bags into rolls includes an input station configured to receive the bags and a conveyor configured to convey the bags along one or more winding paths such that the bags conveyed along each winding path are wound around a spindle into a roll of bags. A diverter is configured to selectively divert the bags along one of the winding paths. Any aspects, and any combination thereof, of these examples may further include one or more of the following optional features. Optionally, the diverter has a pair of diverter rollers that define a diverter nip through which the bags are conveyed to one or more of the winding paths. Optionally, an actuator pivots the diverter into and between a diverter position in which the diverter directs the bags along a first winding path and a second diverter position in which the diverter directs the bags along a second winding path. Optionally, the diverter pivots to a value in a range of 60.0-80.0 degrees between the first diverter position and the second diverter position. Optionally, an air system is configured to pull a leading end of a leading bag in the bags conveyed along a winding path onto the spindle associated with the winding path. Optionally, the spindle has a plurality of holes such that the air system creates a vacuum that pulls air through the plurality of holes and pulls a leading bag onto the spindle. Optionally, an air system is configured to push the roll of bags radially away from the spindle. Optionally, the spindle has a plurality of holes through which the air exhausts. Optionally, a flap is configured to bias the bags wound around the spindle radially toward the spindle.

In certain examples, a method for processing bags created from a web of material into rolls of bags includes receiving the bags into a winder, diverting, with a diverter, the bags along a first winding path, winding the bags diverted along the first winding path around a first spindle to thereby form a first roll of bags, pivoting the diverter to thereby divert the bags along a second winding path, and winding the bags diverted along the second winding path around a second spindle to thereby form a second roll of bags. Any aspects, and any combination thereof, of these examples may further include one or more of the following optional features. Optionally, separating the bags and overlapping the separated bags such that a plurality of overlapped bags are conveyed along the first winding path and the second winding path. Optionally, pulling, with an air system, a leading end of a leading bag in the bags conveyed along the first winding path onto the first spindle. Optionally, the first spindle has a plurality of holes such that the air system creates a vacuum that pulls air through the plurality of holes and pulls the leading bag onto the first spindle. Optionally, an air system is configured to push the roll of bags radially away from the first spindle. Optionally, the first spindle has a plurality of holes such that the air system creates a vacuum that pulls air through the plurality of holes and pulls a leading bag onto the first spindle. Optionally, biasing, with a flap, the bags wound around the first spindle radially inwardly toward the first spindle. Optionally, sensing, with a home sensor, position of the diverter, moving an air horn away from the first spindle after a predetermined length of bags is wound into a first roll of bags onto the first spindle, pivoting the diverter from a first diverter position in which the diverter diverts the bags along the first winding path to a second diverter position in which the diverter diverts the bags along the second winding path, pushing the first roll of bags off the first spindle, pivoting the diverter from the second diverter position to the first diverter position, and pushing the second roll of bags off the second spindle.

In certain examples a machine for processing a web of material into bags comprises a winder with an input station configured to receive the bags and wind the bags about a spindle to form a roll of bags. The winder conveys the bags in a machine direction to the spindle. A bander is configured to band each roll of bags, and the bander is offset from the winder along a cross-machine direction extending transverse to the machine direction. Any aspects, and any combination thereof, of these examples may further include one or more of the following optional features. Optionally, the spindle extends in the cross-machine direction, and the winder is configured to move the roll of bags in the cross-machine direction along the spindle from a first spindle position in which the winder winds the bags into a roll of bags to a second spindle position in which the bander bands the roll of bags. Optionally, the spindle is rotatable at a first spindle speed while the bags are in the first spindle position and the second spindle position. Optionally, the spindle is a first spindle and the winder has a second spindle about which bags are wound into a roll of bags and the bander has a first banding device for applying banding material to the roll of bags wound around the first spindle and a second banding device for applying banding material to the roll of bags wound around the second spindle, the second banding device is positioned vertically below the first banding device. Optionally, the spindle is a first spindle about which a first roll of bags is wound and the winder comprises a second spindle about which a second roll of bags is wound and the bander has a first banding device for applying banding material to the first roll of bags and a second banding device for applying banding material to the second roll of bags. Optionally, the second banding device is positioned vertically below the first banding device.

In certain examples, a machine for processing a web of material into bags comprises an input section configured to receive a roll of the web of material, a sealing section configured to form seals in the web of material to thereby at least partially form the bags in the web of material, and a winder is configured to wind the bags into rolls of bags. The winder comprises at least one spindle, and the winder conveys the bags in a machine direction to the spindle. A bander is configured to band each roll of bags, and the bander is offset from the winder in a cross-machine direction that extends transverse to the machine direction. Any aspects, and any combination thereof, of these examples may further include one or more of the following optional features. Optionally, the spindle extends in the cross-machine direction, and the winder is configured to move the roll of bags in the cross-machine direction along the spindle from a first spindle position in which the winder winds the bags into the roll of bags to a second spindle position in which the bander bands the roll of bags. Optionally, the spindle is rotatable at a first spindle speed while the bags are in the first spindle position and the second spindle position. Optionally, the winder comprises a first spindle about which the bags are wound into a roll of bags and a second spindle about which the bags are wound into a roll of bags, and the bander has a first banding device for applying banding material to the roll of bags wound around the first spindle and a second banding device for applying banding material to the roll of bags wound around the second spindle, the second banding device is positioned vertically below the first banding device. Optionally, the winder has a first spindle about which a first roll of bags in wound and a second spindle about which a second roll of bags and the bander has a first banding device for applying banding material to the first roll of bags and a second banding device for applying banding material to the second roll of bags. Optionally, the second banding device is positioned vertically below the first banding device.

In certain examples, a method for processing bags formed from a web of material comprises receiving the bags into a winder, conveying the bags in a machine direction to a spindle, winding the bags about the spindle to form a roll of bags, moving the roll of bags in a cross-machine direction along the spindle, the cross-machine direction is transverse to the machine direction, and banding the roll of bags with banding material. Any aspects, and any combination thereof, of these examples may further include one or more of the following optional features. Optionally, the spindle is a first spindle and the conveying the bags comprises conveying the bags to a first spindle or a second spindle, the winding the bags comprises winding the bags about the first spindle to form a first roll of bags and winding the bags about a second spindle to form a second roll of bags, the moving the roll of bags comprises moving the first roll of bags in the cross-machine direction and moving the second roll of bags in the cross-machine direction, and the banding the roll of bags comprises a banding the first roll of bags with banding material and banding the second roll of bags with banding material. Optionally, receiving, into an input section, a roll of the web of material, and forming seals, with a sealing section, in the web of material to thereby at least partially form the bags in the web of material, the input section and the sealing section are aligned in the machine direction. Optionally, diverting, with a diverter, the bags along a first winding path, winding the bags diverted along the first winding path around a first spindle to thereby form a first roll of bags, pivoting the diverter to thereby divert the bags along a second winding path, and winding the bags diverted along the second winding path around a second spindle to thereby form a second roll of bags. Optionally, the winder includes a spindle about which the roll of bags is wound, and the winder is configured to move the roll of bags in a cross-machine direction along the spindle such that the bander bands the roll of bags. Optionally, the spindle extends in the cross-machine direction and the winding the bags includes winding the bags in a first spindle position, and moving the roll of bags in the cross-machine direction from the first spindle position to a second spindle position and wherein the banding the roll of bags comprising banding the roll of bags in the second spindle position. Optionally, the banding the roll of bags comprises banding the roll of bags with a first banding device that applies banding material and banding another roll of bags with a second banding device that applies banding material, the second banding device is positioned vertically below the first banding device. Optionally, the spindle is a first spindle, and the winding the bags comprises winding the bags about the first spindle to form a first roll of bags and winding the bags about a second spindle to form a second roll of bags, and the banding the roll of bags comprises banding, with a first banding device, the first roll of bags in banding material and banding, with a second banding device, the second roll of bags in banding material. Optionally, the second banding device is positioned vertically below the first banding device.

In certain examples, a machine for processing a web of material into bags comprises an input section configured to receive a roll of the web of material, the input section comprising a pair of arms that are configured to engage the roll of the web of material and define an unwind axis and an unwind device configured to engage an outer perimetral surface of the roll of the web of material and rotate the roll of the web of material about the unwind axis such that the web of material is unwound. The pair of arms permits the roll of the web of material to axially shift as the unwind device rotates the roll of the web of material. Any aspects, and any combination thereof, of these examples may further include one or more of the following optional features. Optionally, a sealing section is configured to form seals in the web of material to thereby at least partially form the bags in the web of material and a winder is configured to wind the bags into rolls of bags. Optionally, the arms are configured to vertically lift the roll of the web of material. Optionally, the arms are axially movable away from each other such that the roll of the web of material is positioned between the arms and further axially movable toward each other to thereby engage with the roll of the web of material. Optionally, each arm has an axially extending projection that is inserted into the roll of the web of material. Optionally, the unwind device has a drive roller that engages the outer perimetral surface of the roll of the web of material to thereby rotate the roll of the web of material and a leg that secures the drive roller to a frame, the leg is pivotally coupled to the frame such that the leg and the drive roller pivot relative to the frame as diameter of the roll of the web of material decreases such that the drive roller maintains engagement with the roll of the web of material.

In certain examples, a method of processing a web of material to form bags comprises engaging a roll of the web of material with a pair arms that define an unwind axis, unwinding the web of material from the roll of the web of material with an unwind device that engages an outer perimetral surface of the roll of the web of material and rotates the roll of the web of material about the unwind axis, and permitting axially shifting of the roll of the web of material being engaged by the pair of arms so as to permit position adjustment of the web of material to thereby reduce undesirable weave or tension inconsistencies in the web. Any aspects, and any combination thereof, of these examples may further include one or more of the following optional features. Optionally, conveying the web of material downstream from an input section in which the web is unwound from the roll of the web, forming one or more seals in the web of material as the web of material is conveyed through a sealing section such that the bags are at least partially formed from the web of material, and/or winding the bags into a roll of bags with a winder. Optionally, lifting, with the arms, the roll of the web of material. Optionally, axially moving the arms away from each other such that the roll of the web of material is positioned between the arms and further axially moving the arms toward each other to thereby engage with the roll of the web of material. Optionally, inserting an axially extending projection of each arm into the roll of the web of material. Optionally, rotating, with a drive roller, the roll of the web of material to thereby unwind the web, wherein the drive roller engages the outer perimetral surface of the roll of the web of material to thereby rotate the roll of web of material, and pivoting, an arm coupled to the drive roller, such that the drive roller pivots and thereby follows the outer perimetral surface of the roll of material as diameter of the roll of the web of material decreases such that the drive roller maintains engagement with the roll of the web.

In certain examples, a machine for processing a web of material into bags comprises a hem forming section configured to form a hem in the web of material. The hem forming section comprises a plurality of rollers configured to convey the web of material between a first hem forming end and second hem forming end and a deflection device positioned between the first hem forming end and the second hem forming end and being configured to deflect the web of material away from a first web plane along which the web of material conveys between the first hem forming end and the deflection device to thereby increase speed of the web of material and tension in the web of material conveying such that the web of material folds and thereby forms the hem in the web of material. Any aspects, and any combination thereof, of these examples may further include one or more of the following optional features. Optionally, after the web of material conveys past the deflection device at least at portion of the web of material folds onto another portion of the web of material to thereby form the hem. Optionally, the deflection device has a deflection surface that engages the web of material. Optionally, the deflection surface extends transverse to the first web plane. Optionally, the deflection surface and the first web plane defines a deflection angle therebetween in a range of 20.0-70.0 degrees. Optionally, the deflection device is configured to separate the web of material into a first web side and a second web side, and the deflection device deflects the first web side and the second web side away from the first web plane such that hems are formed in both the first web side and the second web side. Optionally, the web of material has an edge that extends along a web edge axis, and wherein the deflection device is radially offset from the web edge axis. Optionally, the hem forming section includes a guide member configured to guide an edge of the web of material as the web of material folds and forms the hem. Optionally, the guide member is positioned downstream of the deflection device. Optionally, an input section is configured to receive a roll of the web of material, a sealing section is configured to form seals in the web of material to thereby at least partially form the bags in the web of material, and/or a winder is configured to wind the bags into rolls of bags.

In certain examples, a machine for processing a web of material into bags includes a hem forming section configured to form a hem in the web of material. The hem forming section comprising a plurality of rollers configured to convey the web of material along a first web plane and a deflection device configured to deflect the web of material away from the first web plane to thereby increase speed of the web of material and tension in the web of material such that the web of material folds and thereby forms the hem in the web of material. Any aspects, and any combination thereof, of these examples may further include one or more of the following optional features. Optionally, the web of material moves back into the first web plane after the deflection device deflects the web of material. Optionally, the deflection device has a deflection surface that engages the web of material. Optionally, the deflection surface extends transverse to the first web plane. Optionally, the deflection device is configured to separate the web of material into a first web side and a second web side, and the deflection device deflects the first web side and the second web side away from the first web plane such that hems are formed in both the first web side and the second web side. Optionally, the web of material has an edge that extends along a web edge axis, and the deflection device is radially offset from the web edge axis. Optionally, the hem forming section includes a guide member configured to guide an edge of the web of material as the web of material folds and forms the hem. Optionally, an input section is configured to receive a roll of the web of material, a sealing section is configured to form seals in the web of material to thereby at least partially form the bags in the web of material, and a winder is configured to wind the bags into rolls of bags.

In certain examples, a method of processing a web of material from which bags are formed comprises, conveying the web of material along a first web plane and deflecting the web of material, with a deflection device, away from the first web plane to thereby increase speed of the web of material and tension in the web of material such that the web of material folds and thereby forms a hem. Any aspects, and any combination thereof, of these examples may further include one or more of the following optional features. Optionally, conveying the web downstream from an input section in which the web is unwound from a roll of the web of material, forming one or more seals in the web as the web is conveyed through a sealing section such that the bags are at least partially formed in the web of material; and/or winding the bags into a roll of bags with a winder. Optionally, conveying the web of material into the first web plane after the deflection device deflects the web of material. Optionally, separating, with the deflection device, a first web side and a second web side and deflecting the first web side and the second web side away from the first web plane to thereby increase speed of the first web side and the second web side and tension in the first web side and the second web side such that the first web side and the second web side each automatically fold to thereby form hems. Optionally, the web of material has an edge that extends along a web edge axis and the deflection device is radially offset from the web edge axis. Optionally, guiding, with a guide member, an edge of the web of material as the web of material folds and forms a hem.

In certain examples, a draw tape unwind station for unwinding draw tape for bags formed from a web of material comprises a dancer system configured to receive the draw tape and further dispense the draw tape, the dancer system comprises: a frame having a first frame end and an opposite second frame end, the first frame end and the second frame end being movable relative to each other, a first set of outer rollers coupled to the first frame end, a second set of outer rollers coupled to the second frame end, a first set of inner rollers coupled to the first frame end, and a second set of inner rollers coupled to the second frame end. The first set of inner rollers and the second set of inner rollers are positioned between the first set of outer rollers and the second set of outer rollers, and the first set of inner rollers and the second set of outer rollers are configured to guide the draw tape through the dancer system before the first set of outer rollers and the second set of inner rollers to guide the draw tape. Optionally, one or more drive rollers are configured to convey the draw tape through the dancer system. Optionally, the first frame end and the opposite second frame end selectively translate toward each other. Optionally, each roller in the first set of outer rollers is aligned with a corresponding roller in the first set of inner rollers along a first roller axis, each roller in the second set of outer rollers is aligned with a corresponding roller in the second set of inner rollers along a second roller axis, and the first roller axes are parallel and offset from the second roller axes. Optionally, the dancer system comprises a first dancer side and a second dancer side such that the first dancer side is configured to receive the draw trap and dispense the draw tape. Optionally, the dancer system is configured to route the draw tape in a first dancer direction and subsequently in a second dancer direction opposite the first dancer direction.

In certain examples, a draw tape unwind station for unwinding draw tape for bags formed from a web of material comprising a dancer system having a first dancer side configured to receive and dispense the draw tape and an opposite second dancer side. The dancer system is configured to route the draw tape in a first dancer direction from the first dancer side to the second dancer side along a first serpentine path and subsequently in an opposite second dancer direction from the second dancer side to the first dancer side along a second serpentine path. Any aspects, and any combination thereof, of these examples may further include one or more of the following optional features. Optionally, the second serpentine path follows the first serpentine path. Optionally, the second serpentine path is parallel with the first serpentine path. Optionally, the second serpentine path is offset and equidistant from the first serpentine path. Optionally, the dancer system further comprises a first set of outer rollers, a second set of outer rollers spaced apart from the first set of outer rollers, a first set of inner rollers, and/or a second set of inner rollers spaced apart from the first set of inner rollers. The first set of inner rollers and the second set of inner rollers are positioned between the first set of outer rollers and the second set of outer rollers, and the dancer system is configured to route the draw tape in the first dancer direction alternately along rollers of the first set of inner rollers and rollers of the second set of outer rollers and subsequently route the draw tape in the second dancer direction alternately along rollers of the first set of outer rollers and rollers of the second set of inner rollers. Optionally, the dancer system comprises a frame having a first frame end and an opposite second frame end, the first frame end and the second frame end being movable relative to each other. The first set of outer rollers and the first set of inner rollers are coupled to first frame end and move therewith, and the second set of outer rollers and the second set of inner rollers are coupled to second frame end and move therewith. Optionally, one or more drive rollers are configured to convey the draw tape through the dancer system. Optionally, the first frame end and the opposite second frame end selectively translate toward each other. Optionally, each roller in the first set of outer rollers is aligned with a corresponding roller in the first set of inner rollers along a first roller axis, each roller in the second set of outer rollers is aligned with a corresponding roller in the second set of inner rollers along a second roller axis, and the first roller axes are parallel and offset from the second roller axes.

In certain examples, a machine for processing a web of material into bags comprises a draw tape unwind station configured to unwind draw tape for insertion in the bags, the draw tape unwind station comprising a dancer system having a first dancer side configured to receive and dispense the draw tape and an opposite second dancer side and the dancer system being configured to route the draw tape in a first dancer direction from the first dancer side to the second dancer side along a first serpentine path and subsequently in an opposite second dancer direction from the second dancer side to the first dancer side along a second serpentine path. Any aspects, and any combination thereof, of these examples may further include one or more of the following optional features. Optionally, a hem forming station is configured to form a hem of the bags in which the draw tape is inserted, a sealing section is configured to form seals in the web of material to thereby at least partially form the bags from the web of material, and/or a winder is configured to wind the bags into rolls of bags. Optionally, the second serpentine path is parallel with the first serpentine path. Optionally, the second serpentine path is offset and equidistant from the first serpentine path. Optionally, the dancer system further comprises a first set of outer rollers, a second set of outer rollers spaced apart from the first set of outer rollers, a first set of inner rollers, and/or a second set of inner rollers spaced apart from the first set of inner rollers. The first set of inner rollers and the second set of inner rollers are positioned between the first set of outer rollers and the second set of outer rollers, and the dancer system is configured to route the draw tape in the first dancer direction alternately along rollers of the first set of inner rollers and rollers of the second set of outer rollers and subsequently route the draw tape in the second dancer direction alternately along rollers of the first set of outer rollers and rollers of the second set of inner rollers. Optionally, the dancer system further comprises a frame having a first frame end and an opposite second frame end, the first frame end and the second frame end being movable relative to each other, and the first set of outer rollers and the first set of inner rollers are coupled to first frame end and move therewith and the second set of outer rollers and the second set of inner rollers are coupled to second frame end and move therewith. Optionally, one or more drive rollers is configured to convey the draw tape through the dancer system. Optionally, the first frame end and the opposite second frame end selectively translate toward each other. Optionally, each roller in the first set of outer rollers is aligned with a corresponding roller in the first set of inner rollers along a first roller axis, each roller in the second set of outer rollers is aligned with a corresponding roller in the second set of inner rollers along a second roller axis and the first roller axes are parallel and offset from the second roller axes.

In certain examples, a method of unwinding draw tape for bags formed from a web of material comprises receiving the draw tape into a first dancer side of a dancer system, routing the draw tape in a first dancer direction from the first dancer side to an opposite second dancer side and along a first serpentine path, and further routing the draw tape in an opposite second dancer direction from the second dancer side to the first dancer side along a second serpentine path. Any aspects, and any combination thereof, of these examples may further include one or more of the following optional features. Optionally, the second serpentine path is parallel with the first serpentine path. Optionally, the second serpentine path is offset and equidistant from the first serpentine path. Optionally, the dancer system further comprises routing the draw tape in the first dancer direction alternately along rollers of a first set of inner rollers and rollers of a second set of outer rollers and/or routing the draw tape in the second dancer direction alternately along rollers of a first set of outer rollers and rollers of a second set of inner rollers. Optionally, the first set of outer rollers and the first set of inner rollers are coupled to a first frame end and move therewith and wherein the second set of outer rollers and the second set of inner rollers are coupled to a second frame end and move therewith, and further comprising translating the first frame end and the second frame end away from each other to thereby permits accumulation of draw tape in the dancer system. Optionally, translating the first frame end and the second frame toward each other to thereby account for decreases in the amount of draw tape in the dancer system. Optionally, controlling with a control system, one or more actuators to move the first frame end and the second frame end relative to each other.

In certain examples, a method of forming seals in a web of material to thereby at least partially form bags from the web of material includes conveying the web of material to a first pair of seal bars, forming a seal in the web of material by moving the first pair of seal bars into cooperation with each other and the web, conveying the web of material vertically to a second pair of seal bars, and forming another seal in the web of material by moving the second pair of seal bars into cooperation with each other and the web of material. Any aspects, and any combination thereof, of these examples may further include one or more of the following optional features. Optionally, the first pair of seal bars is vertically spaced apart from the second pair of seal bars. Optionally, moving the first pair of seal bars comprises moving the first pair of seal bars with the web of material. Optionally, moving the second pair of seal bars comprises moving the second pair of seal bars with the web of material. Optionally, the first pair of seal bars linearly and/or the second pair of seal bars translate with the web of material. Optionally, the first pair of seal bars and the second pair of seal bars form alternating spaced apart seals in the web of material. Optionally, dispensing the web of material with a plurality of seals formed therein such that each seal in the plurality of seals spaced apart from each other, and the first pair of seal bars forms every other seal in the plurality of seals. Optionally, the seals formed in the web of material extending a cross-machine direction.

In certain examples, a machine for processing a web of material into bags includes a sealing section configured to form seals in the web of material to thereby at least partially form the bags from the web of material, the sealing station comprises a first pair of seal bars that are movable into cooperation with each other and the web of material to thereby form a seal in the web of material and a second pair of seal bars that are movable into cooperation with each other and the web of material to thereby form another seal in the web of material. The first pair of seal bars is vertically spaced apart from the second pair of seal bars and the web of material is vertically conveyed between the first pair of seal bars and the second pair of seal bar. Any aspects, and any combination thereof, of these examples may further include one or more of the following optional features. Optionally, the sealing station further comprising a plurality of rollers configured to convey the web of material vertically between the first pair of seal bars and the second pair of seal bars. Optionally, a hem forming station is configured to form a hem of the bags in which draw tape is inserted and/or a winder is configured to wind the bags into rolls of bags. Optionally, the first pair of seal bars is vertically spaced apart from the second pair of seal bars. Optionally, the first pair of seal bars and the second pair of seal bars is directly vertically spaced apart from each other. Optionally, the first pair of seal bars are configured to move with the web of material as the seal is formed in the web of material. Optionally, the second pair of seal bars are configured to move with the web of material as the seal is formed in the web of material. Optionally, the first pair of seal bars linearly translates with the web of material. Optionally, the second pair of seal bars linearly translates with the web of material. Optionally, the first pair of seal bars and the second pair of seal bars form alternating spaced apart seals in the web of material. Optionally, the sealing section is configured to dispense the web of material with a plurality of seals formed therein such that each seal in the plurality of seals spaced apart from each other, and the first pair of seal bars forms every other seal in the plurality of seals. Optionally, the seal formed in the web of material by the first pair of seal bars and the second pair of seal bars extend a cross-machine direction.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram.

Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A machine for processing a web of material into bags or pouches, the machine comprising:

a sealing section configured to form one or more seals in the web of material to thereby at least partially form the bags or pouches from the web of material, the sealing section includes a first pair of seal bars configured to form a seal in the web of material, wherein the first pair of seal bars includes a first seal bar that is rotated about a first axis and a second seal bar that is rotated about a second axis such that the first seal bar and the second seal bar cooperate to form the seal in the web of material;

wherein the web of material is conveyed between the first seal bar and the second seal bar; and wherein the sealing section includes a second pair of seal bars that are vertically spaced apart from the first pair of seal bars and configured to form another seal in the web of material, wherein the second pair of seal bars includes a third seal bar that is rotated about a third axis and a fourth seal bar that is rotated about a fourth axis such that the third seal bar and the fourth seal bar cooperate to form the another seal in the web of material.

2. The machine according to claim 1, wherein the first seal bar is rotated in a continuous path about the first axis and the second seal bar is rotated in a continuous path about the second axis.

3. The machine according to claim 1, wherein the sealing section further comprising a plurality of rollers configured to convey the web of material vertically between the first seal bar and the second seal bar.

4. The machine according to claim 1, further comprising:

a hem forming section configured to form a hem of the bags or pouches in which draw tape is inserted; and a winder configured to wind the bags or pouches into rolls.

5. The machine according to claim 1, wherein the first pair of seal bars is vertically spaced apart from a second pair of seal bars that are configured to form another seal in the web of material.

6. The machine according to claim 1, wherein the first pair of seal bars are configured to move with the web of material as the seal is formed in the web of material.

7. The machine according to claim 6, wherein the first pair of seal bars linearly translates with the web of material.

8. The machine according to claim 1, wherein the first pair of seal bars form alternating spaced apart seals in the web of material.

9. The machine according to claim 1, wherein the sealing section is configured to dispense the web of material with a plurality of seals formed therein such that each seal in the plurality of seals is spaced apart from each other, and wherein the first pair of seal bars forms every other seal in the plurality of seals.

10. The machine according to claim 1, wherein the seals formed in the web of material by the first pair of seal bars extend in a cross-machine direction.

11. A machine for processing a web of material into bags or pouches, the machine comprising:

a sealing section configured to form a plurality of seals in the web of material to thereby at least partially form the bags or pouches from the web of material, the sealing section includes a first pair of seal bars configured to form a seal in the web of material and a second pair of seal bars configured to form a seal in the web of material, and wherein the first pair of seal bars forms every other seal in the plurality of seals in the web of material and the second pair of seal bars forms the alternate every other seal in the plurality of seals in the web of material.

12. The machine according to claim 11, wherein the first pair of seal bars includes a first seal bar that is rotated about a first axis and a second seal bar that is rotated about a second axis such that the first seal bar and the second seal bar cooperate to form the seal in the web of material.

* * * * *